United States Patent [19]

Albert

[11] Patent Number: 5,267,296
[45] Date of Patent: Nov. 30, 1993

[54] METHOD AND APPARATUS FOR DIGITAL CONTROL OF SCANNING X-RAY IMAGING SYSTEMS

[75] Inventor: Richard D. Albert, San Ramon, Calif.

[73] Assignee: Digiray Corporation, San Ramon, Calif.

[21] Appl. No.: 959,605

[22] Filed: Oct. 13, 1992

[51] Int. Cl.$^5$ .............................................. H05G 1/52
[52] U.S. Cl. ..................................... 378/113; 378/62; 378/137
[58] Field of Search ................ 378/113, 95, 62, 137, 378/146, 10, 19

[56] References Cited

U.S. PATENT DOCUMENTS

| | | | |
|---|---|---|---|
| 3,949,229 | 4/1976 | Albert | 250/401 |
| 4,048,496 | 9/1977 | Albert | 250/272 |
| 4,144,457 | 3/1979 | Albert | 250/445 T |
| 4,147,935 | 4/1979 | Warrikhoff | 378/62 |
| 4,149,076 | 4/1979 | Albert | 250/402 |
| 4,196,351 | 4/1980 | Albert | 250/416 TV |
| 4,259,582 | 3/1981 | Albert | 250/402 |
| 4,323,779 | 4/1982 | Albert | 378/113 |
| 4,465,540 | 8/1984 | Albert | 156/252 |
| 4,730,350 | 3/1988 | Albert | 378/10 |

OTHER PUBLICATIONS

Albert et al., Proceedings of the Surface Mount International Conference & Exposition, pp. 201–211, Aug. 30, 1992.
Albert et al., "SMT Inspection: Another Choice", reprinted from Circuits Assembly, Dec. 1991.
Albert et al., 15th Annual Electronics Manufacturing Seminar Proceedings, pp. 243–251, Feb. 20, 1991.
Bond, "Reverse Geometry X-Ray Produces Clear Images", Test and Measurement World, p. 177, Sep. 1991.
Albert, "Digiray Real-Time Radiography", ASNT Real-Time Imaging III Topical, pp. 46–48, Jul. 27, 1988.
Brochure entitled "The Digiray X-Ray System", Digiray, Inc., San Ramon, Calif., distributed 1988-1989.

*Primary Examiner*—David F. Porta
*Attorney, Agent, or Firm*—Harris Zimmerman

[57] ABSTRACT

X-ray images are produced on a monitor display screen by situating the subject between a detector having a minute x-ray sensitive area and an x-ray source having an extensive anode plate on which an x-ray origin point is swept in a raster pattern similar to the raster of the display monitor. Operating parameters of the x-ray source are controlled by digital data processing circuits which enable magnification of operator selected areas of the image by reducing the size of x-ray source raster pattern and repositioning of the raster pattern on the anode plate in response to operator actuation of one or more computer input devices. In the preferred form, the system also enables image enhancements and control of image characteristics such as contrast and brightness in response to actuations of the input devices or in response to programming. X-ray exposure and image acquisition time may be reduced by operator selection of only specific areas of particular interest for high resolution scanning. In the preferred form, the apparatus can detect a particular gray level in the image data and relocate the scan to image the region where the gray level is found. This enables fixed imaging of a moving object.

43 Claims, 11 Drawing Sheets

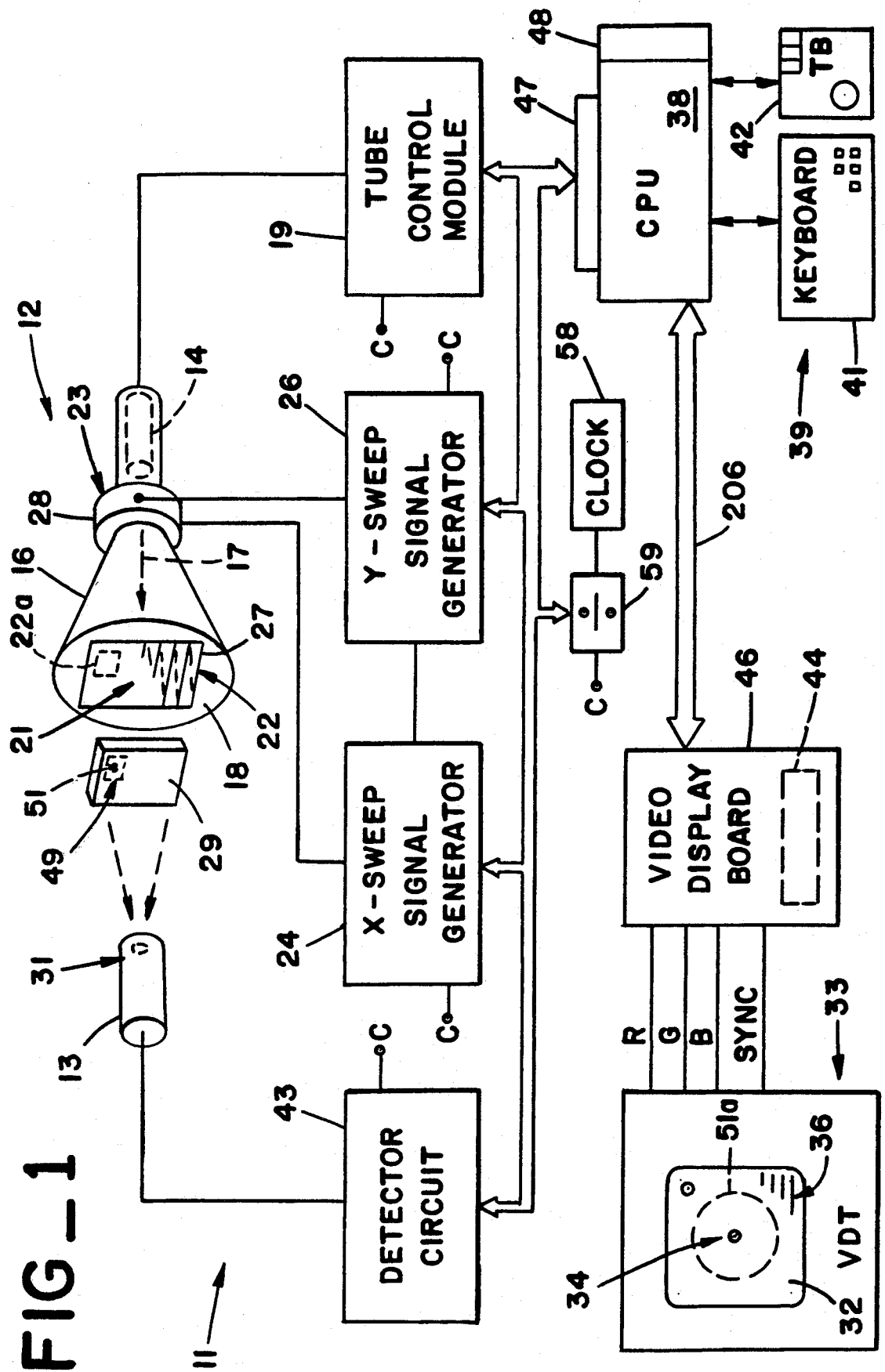
FIG_1

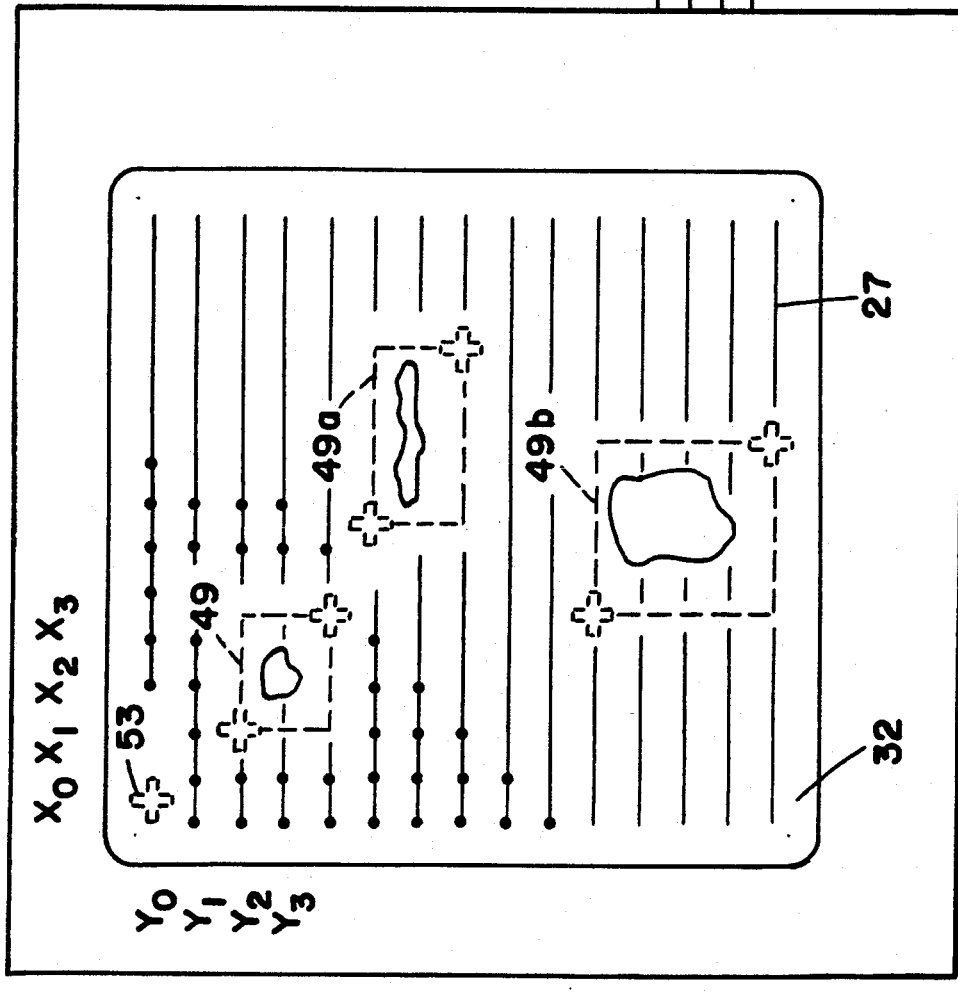
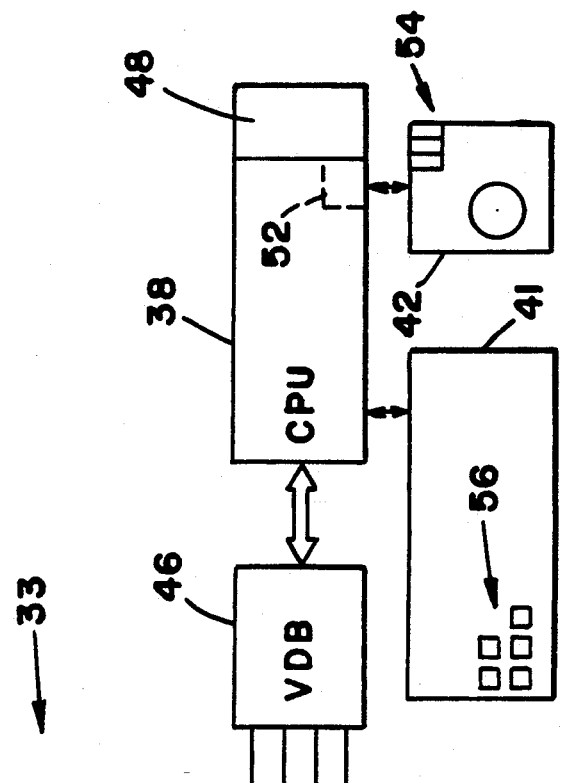
FIG_2

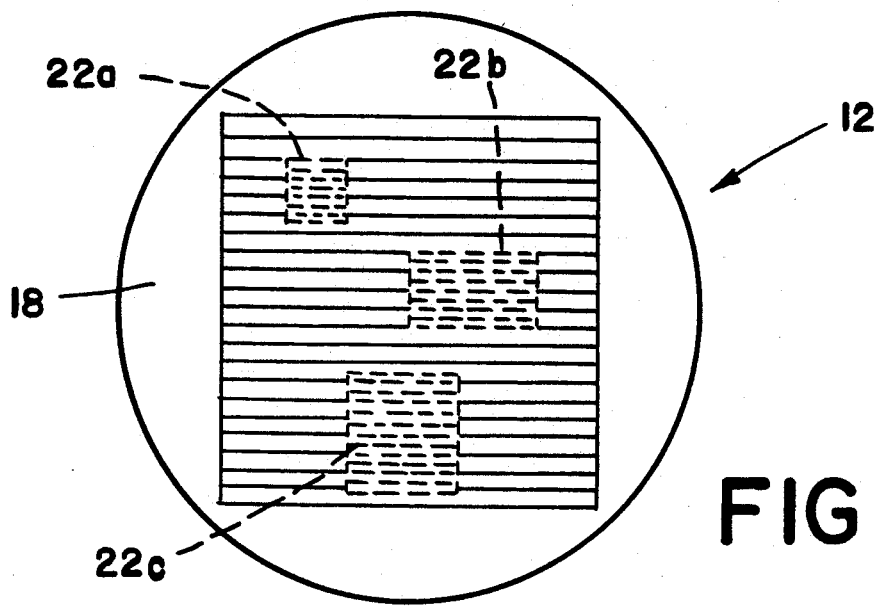
FIG_3
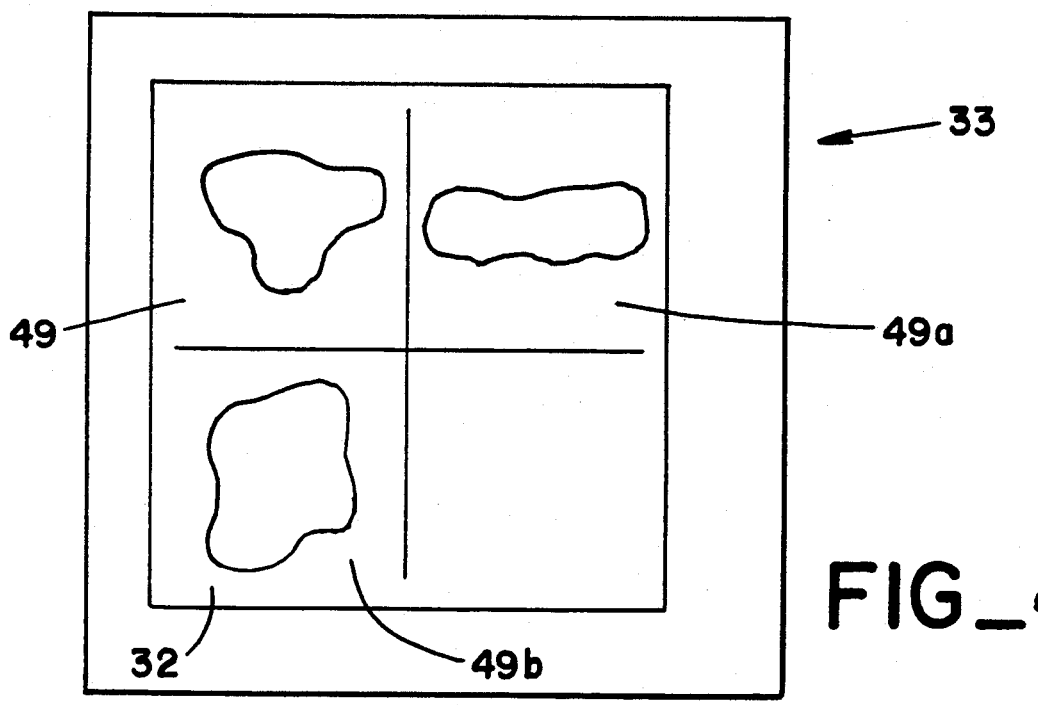
FIG_4
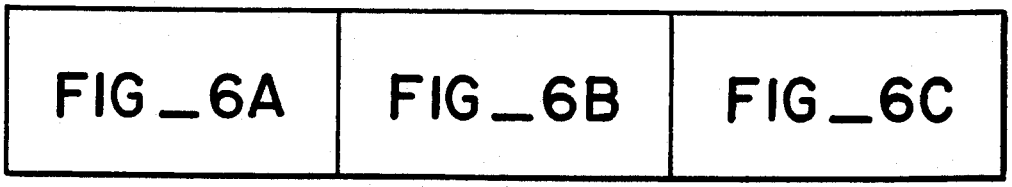
FIG_5

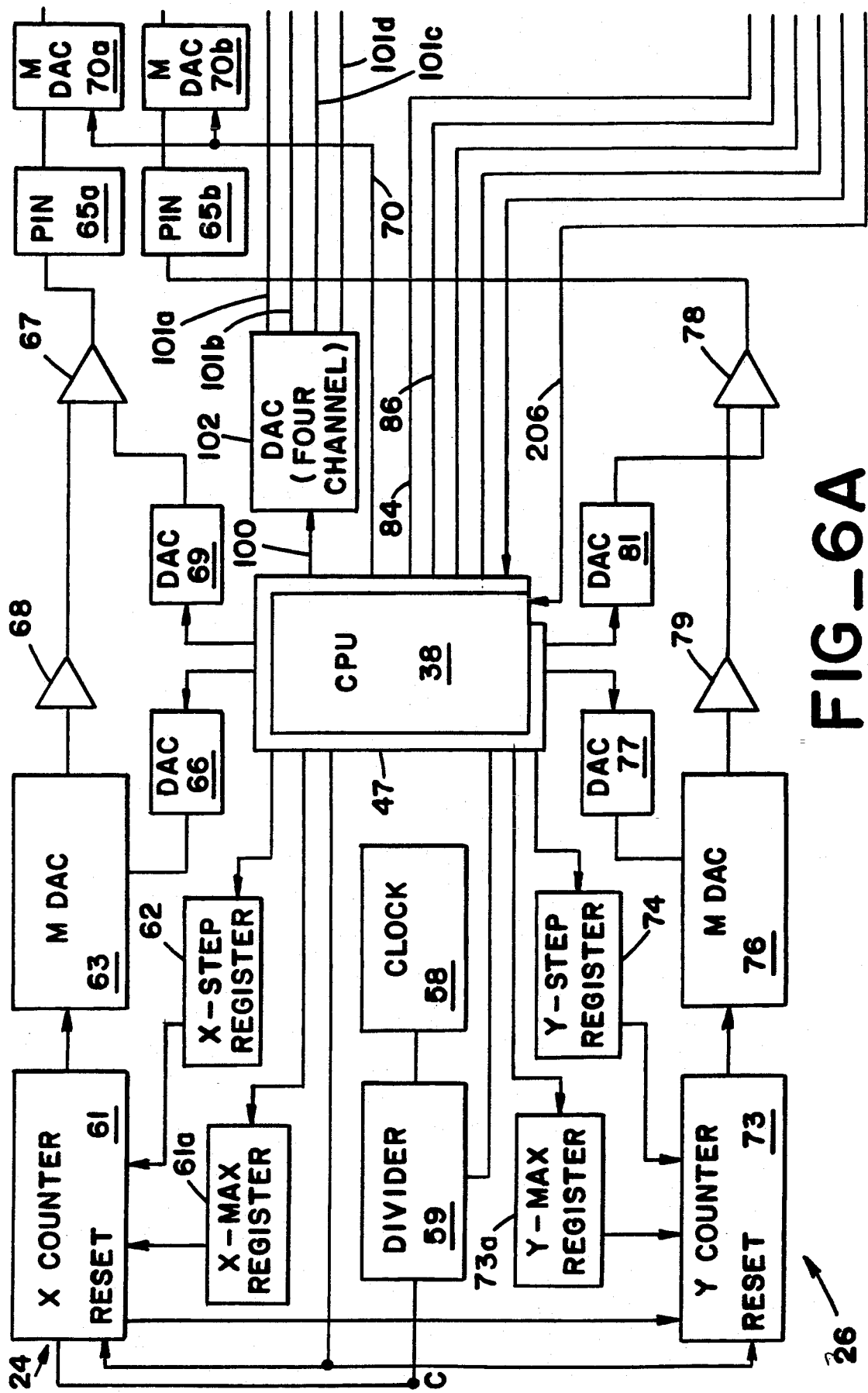
FIG_6A

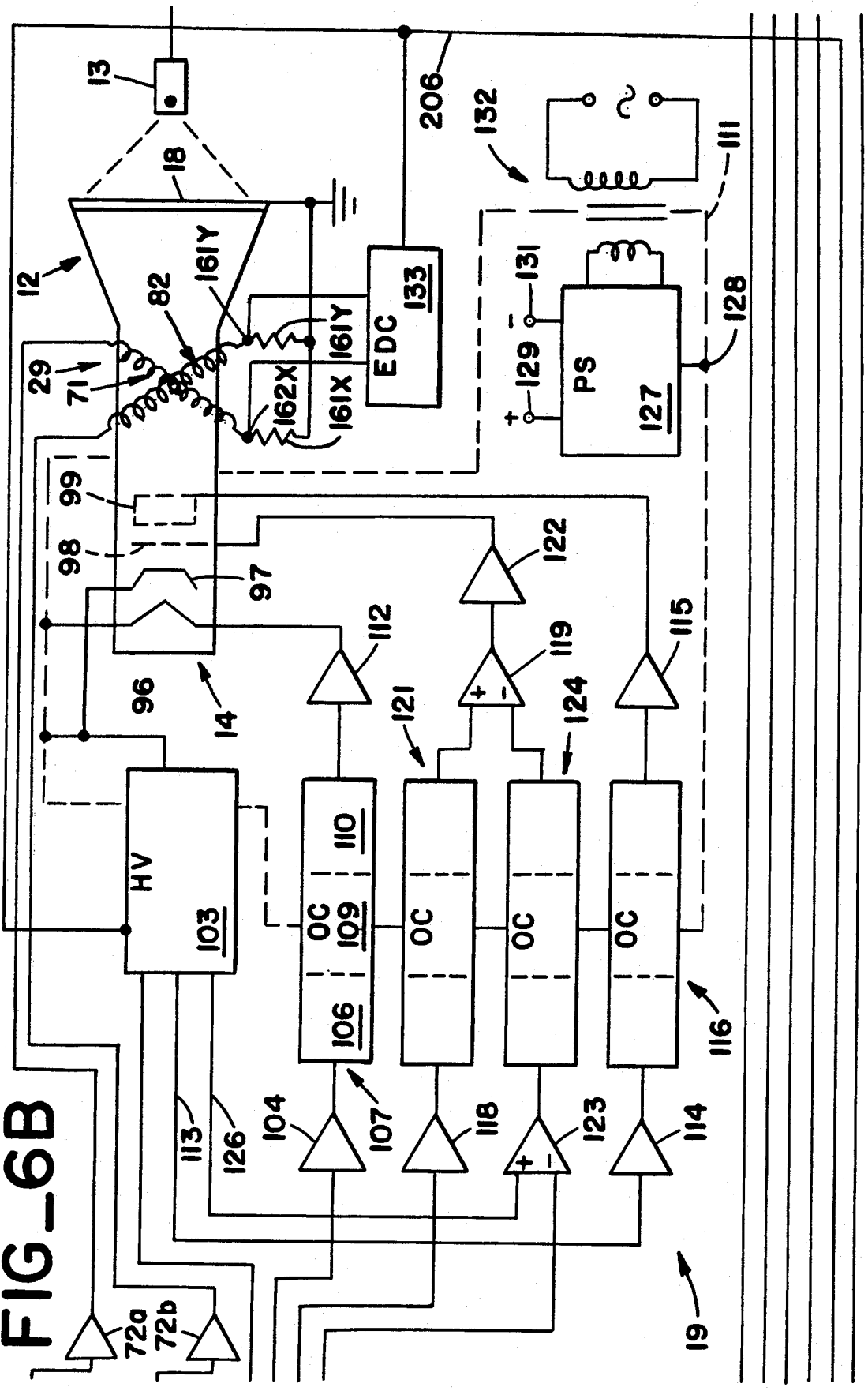
FIG_6B

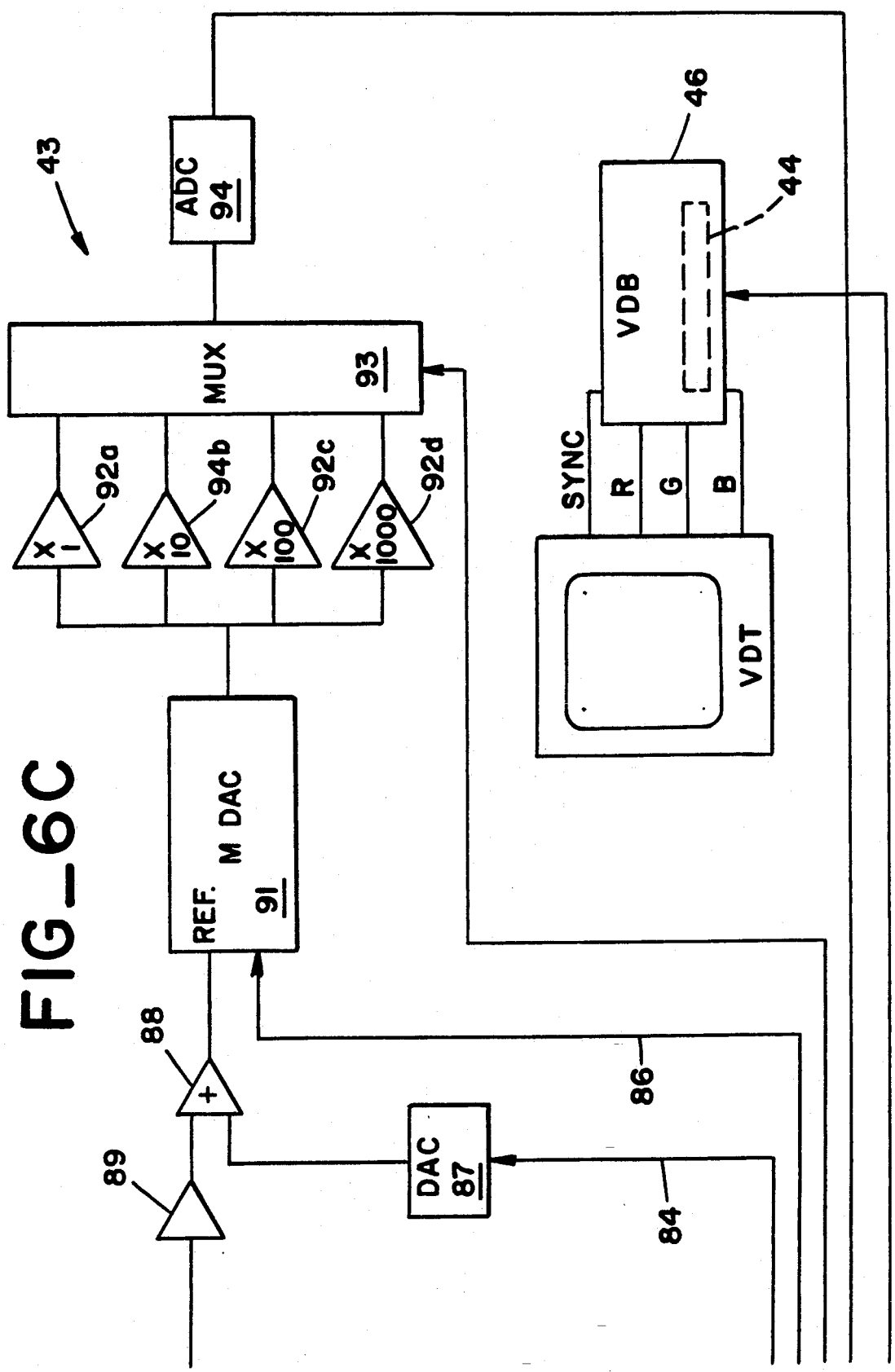

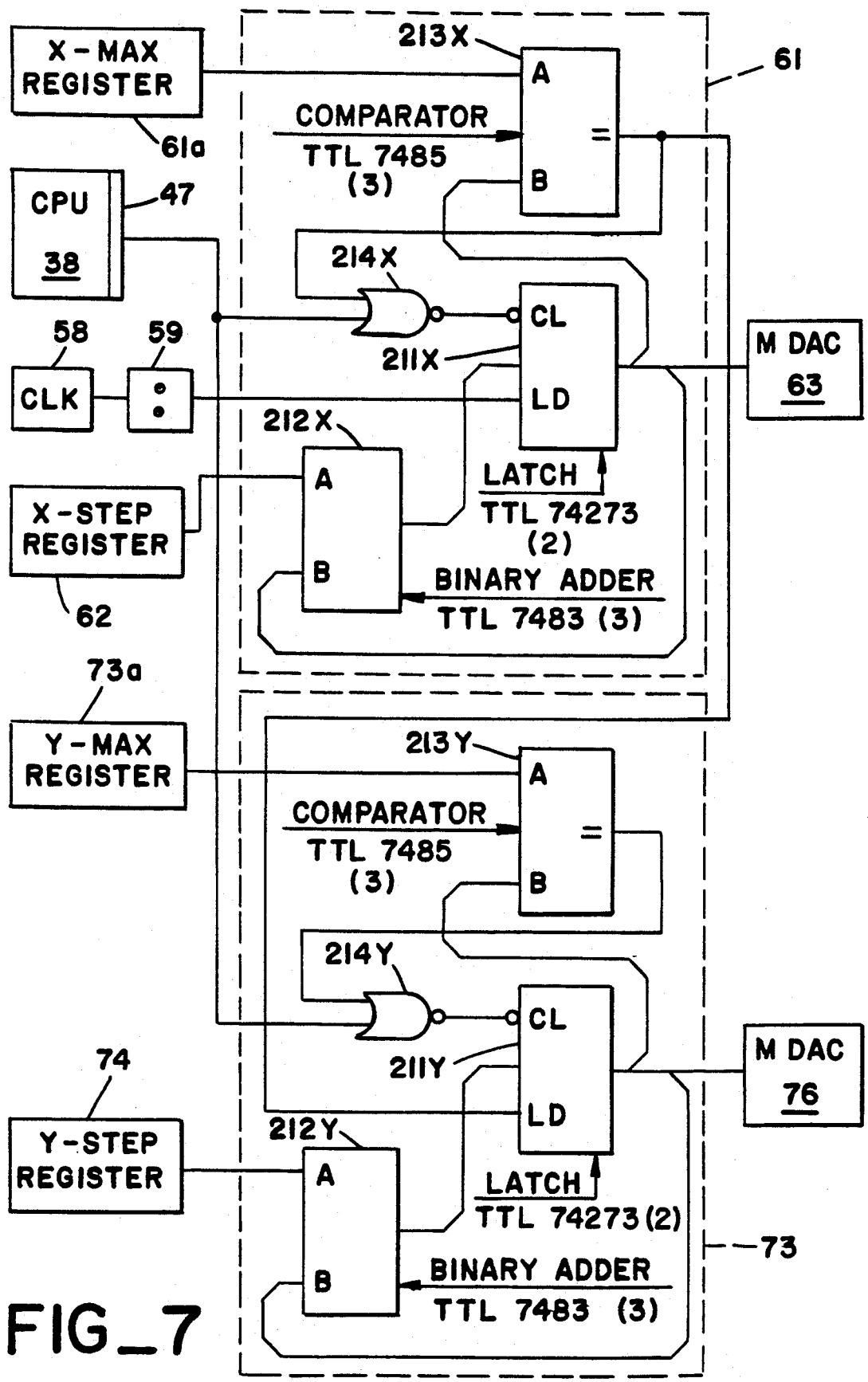
FIG_7

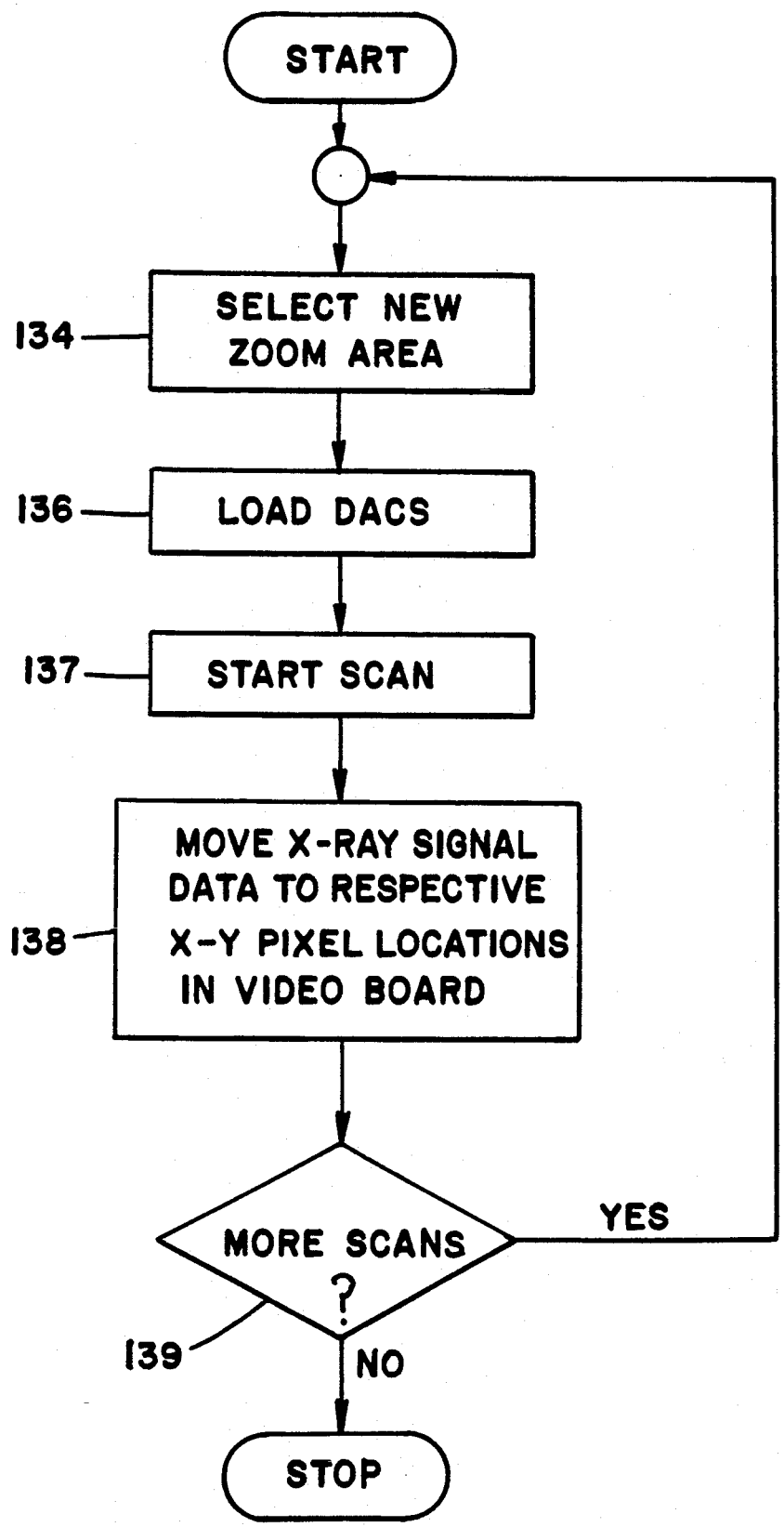
FIG_8

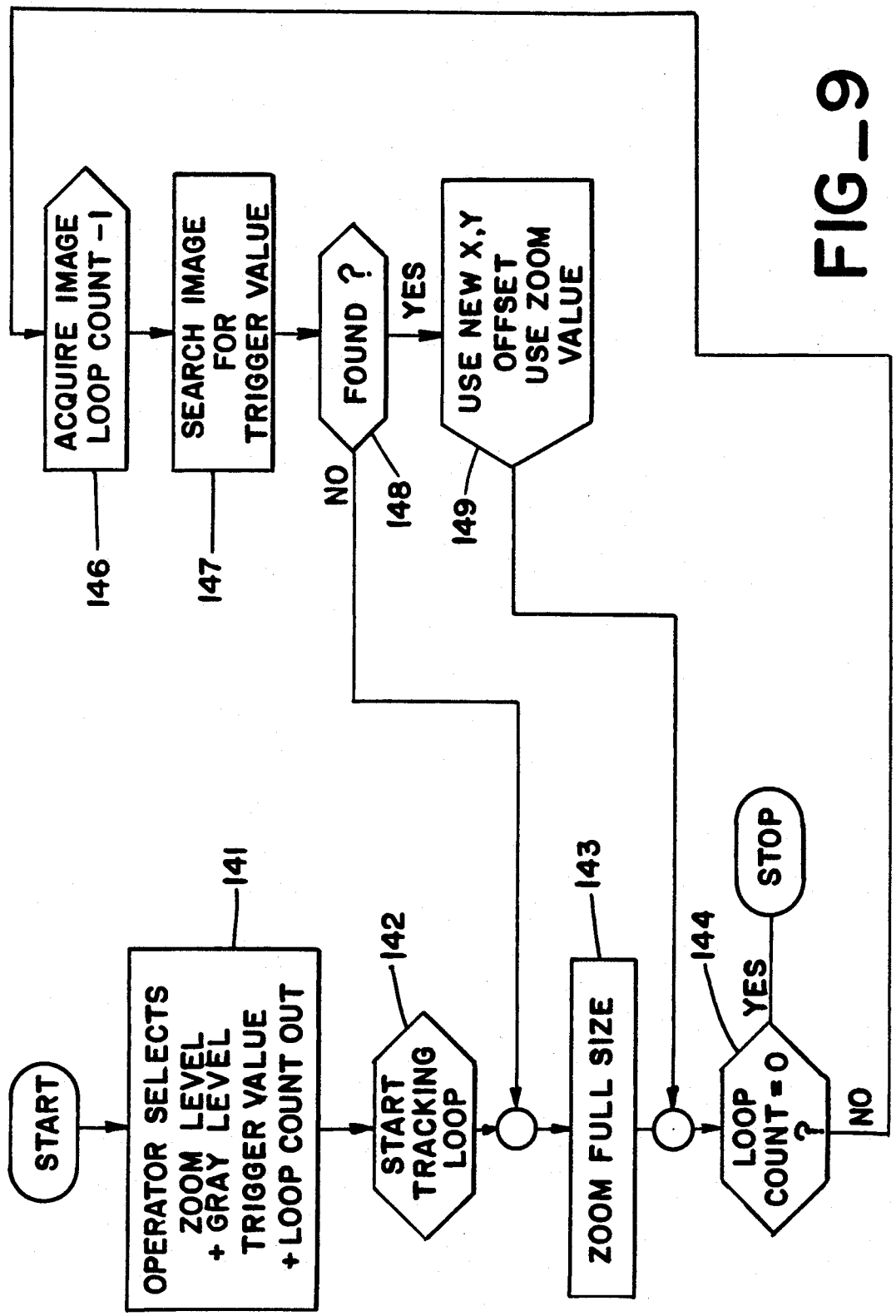
FIG_9

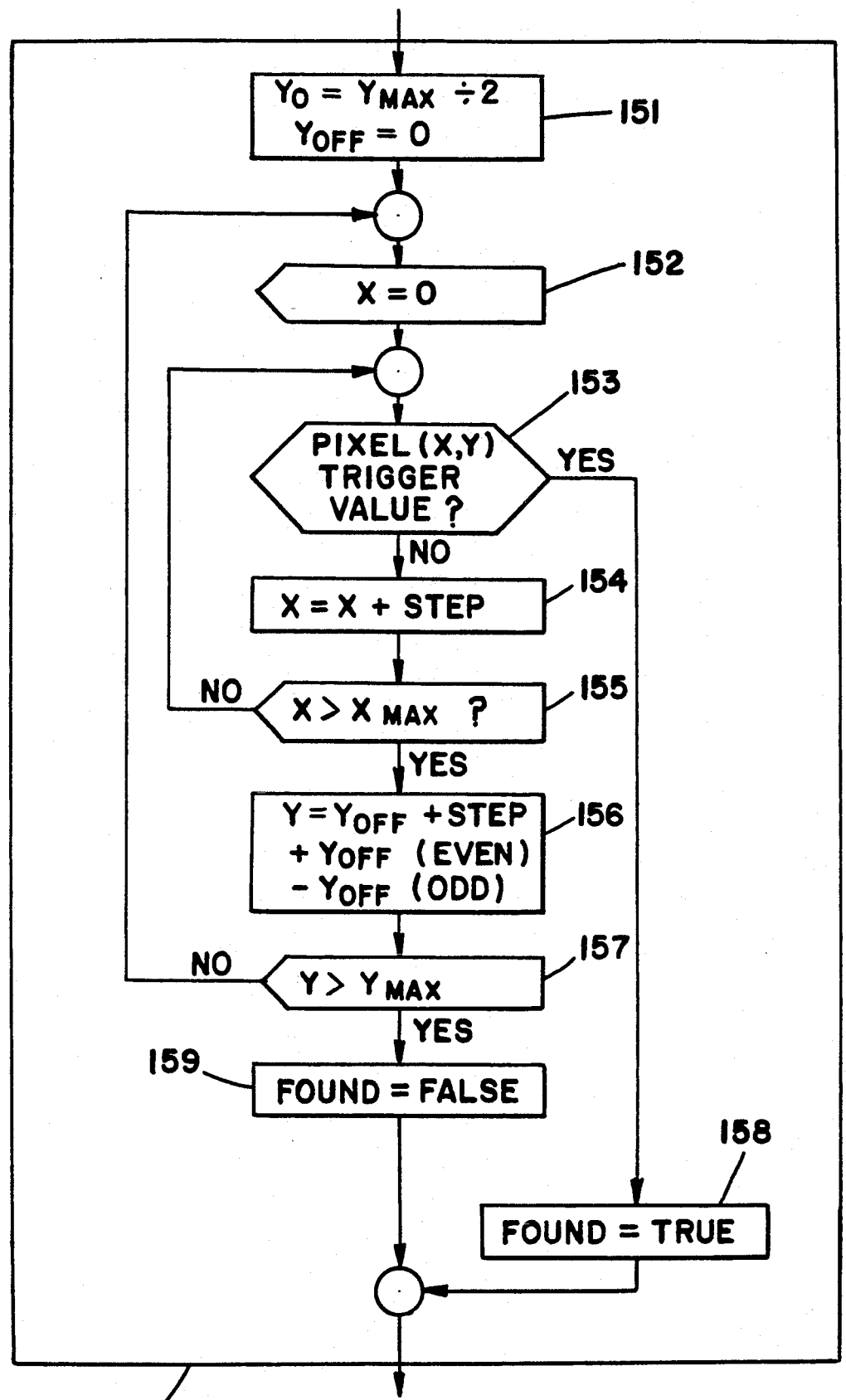
FIG_10

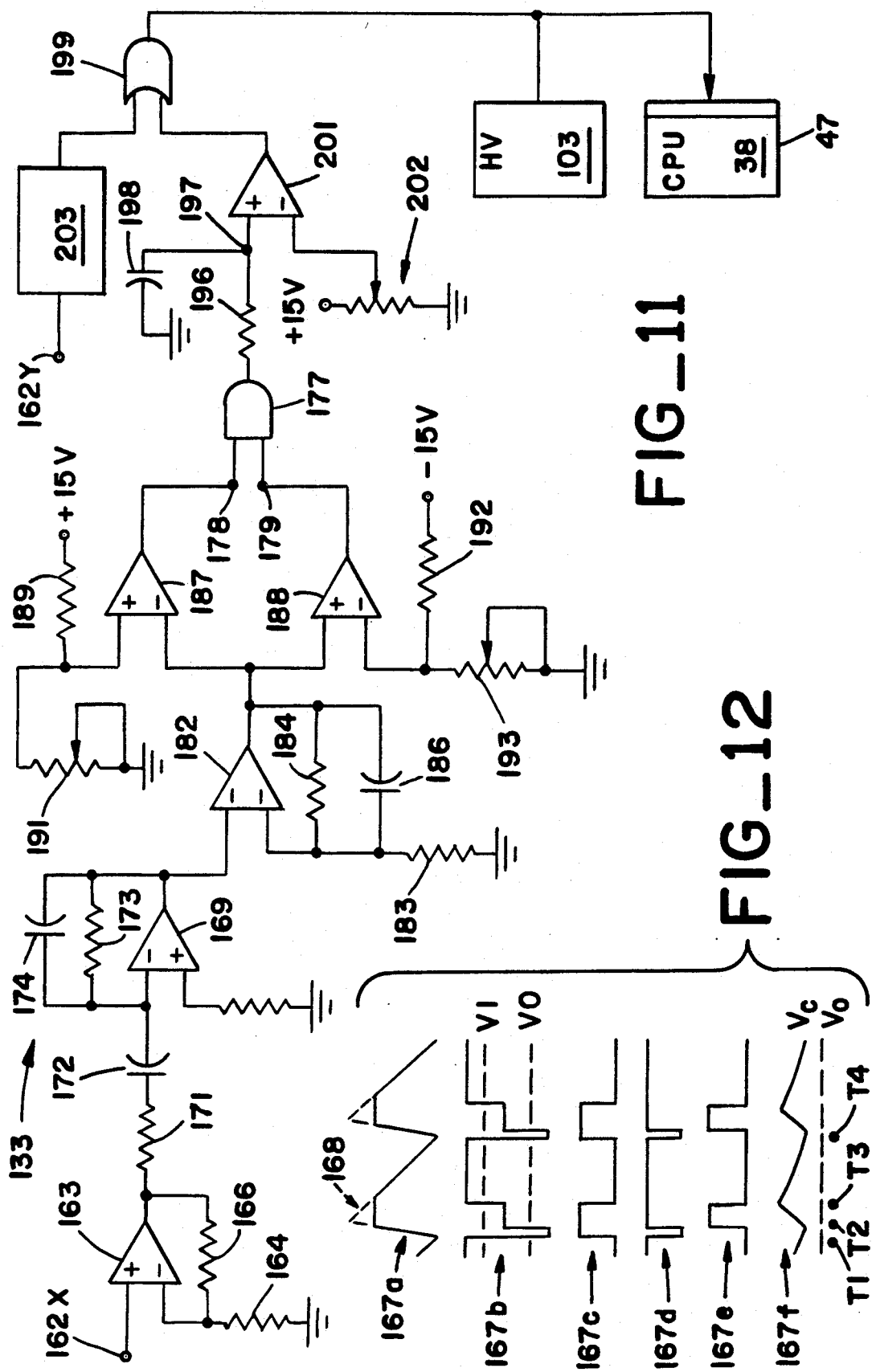
FIG_11
FIG_12

METHOD AND APPARATUS FOR DIGITAL CONTROL OF SCANNING X-RAY IMAGING SYSTEMS

TECHNICAL FIELD

This invention relates to radiography. More particularly the invention relates to scanning x-ray imaging systems in which the subject is situated between an electronic x-ray detector and an x-ray source at which a moving x-ray origin point is swept in a raster pattern and in which the image may be displayed at the screen of a display monitor.

BACKGROUND OF THE INVENTION

Use of photographic film for obtaining x-ray images has several disadvantages. The image is not immediately available because of the need to develop the film. Radiation exposure of the subject is high and exposure time is prolonged as a majority of the x-rays do not react with the film. Fluoroscopic screens enable instant viewing of an image but are otherwise subject to many of the disadvantages of film.

Efforts to resolve the problems associated with older x-ray imaging techniques have included use of an image intensifier and video camera imaging chain to generate a visible image on the screen of a display monitor. This produces a third generation image which tends to be degraded by electronic noise. The first generation image appears on a fluorescent a screen at the input of the image intensifier and the second generation image appears at another fluorescent screen at the output of the intensifier. The third generation image is produced by a video camera that views the image intensifier output. In order to improve image quality, the electronic signal generated by the image intensifier has been digitized to enable computerized image enhancement but this produces only marginal improvement.

In some more recent systems, the image intensifier system is replaced with an array of minute electronic x-ray detectors such as charge coupled devices. Data for constructing the image is read out of the array on a pixel by pixel basis to provide an image which may be displayed at the screen of a video display monitor. Primary disadvantages of these systems include high cost and complexity and an undesirably small field of view.

All of the prior x-ray imaging systems discussed above use what may be termed conventional geometry That is, the x-rays diverge from a small fixed point and are detected at a large area detector such as the film, screen or detector array. My prior U.S. Pat. No. 3,949,229 issued Apr. 6, 1976 and entitled "X-ray Scanning Method and Apparatus" discloses an advantageous imaging system having a reversed geometry. The system of that prior patent uses an x-ray source having an extensive anode plate which is raster scanned by an electron beam to provide a moving x-ray origin point. X-rays emitted from different successive locations on the large anode plate in the course of a raster scan converge at an electronic detector which has a relatively small x-ray sensitive area. A moving light origin point at the screen of a display monitor undergoes a similar raster scan and is modulated by the detector output signal to provide the x-ray image at an analog X-Y storage cathode ray tube component of the monitor.

The reversed geometry provides a number of advantages. Radiation exposure of the subject may be greatly reduced as the electronic detector responds to incoming x-rays much more efficiently than film or a fluoroscopic screen. Collimators of the type disclosed in my prior U.S. Pat. No. 4,465,540 issued Aug. 14, 1984 and entitled "Method of Manufacture of Laminate Radiation Collimator" may be used to suppress x-rays that are not directed towards the small detector and which are therefore incapable of contributing to the desired image. The system can also be relatively uncomplicated and inexpensive in comparison with other forms of x-ray scanning equipment.

The reverse geometry also enables magnification of an area of the image that is of particular interest without relative movement of the subject, x-ray source and detection means. This is accomplished by reducing the size of the raster pattern at the anode plate of the x-ray source without making a corresponding reduction in the size of the raster pattern at the image display monitor. Conventional geometry systems require repositioning of the subject and/or the source and detector in order to accomplish a similar result. Magnification without such repositioning in a conventional geometry system reduces resolution in the image.

Initiating such magnification in the reverse geometry system of prior U.S. Pat. No. 3,949,229 is a somewhat time consuming and involved operation as a series of different controls must be manually adjusted and operator coordination of the adjustments with each other is necessary. Varying other characteristics of the image and changing operating parameters of the scanning x-ray source also require operator coordination of various manual controls and can be time consuming and somewhat taxing. Analog controls of this kind do not enable a number of highly advantageous modes of operation that will hereinafter be described.

Reducing the size of the raster scan area at the x-ray source to obtain a magnified image concentrates electron beam heating at a limited area of the anode plate. Avoiding heat damage to the x-ray source requires careful attention by the operator and still more control adjustments.

My prior U.S. Pat. No. 4,259,582, issued Mar. 31, 1981 and entitled "Plural Image Signal System for Scanning X-Ray Apparatus", discloses reverse geometry scanning x-ray apparatus of the above discussed kind which as an option enables digitizing of the detector output and sweep frequency signals and digital storage of data values from which the detector output voltage and the raster scan sweep frequency voltages can be reconstructed in order to reproduce the x-ray image at a later time. The system further enables certain forms of digital processing of the data to change characteristics of the image. This includes magnification of a selected area of the image but does not provide for increased resolution or definition in the magnified region of the image. Control of the x-ray source and scan raster parameters continues to require time consuming adjustments and coordination of various analog voltage controls on the part of the operator.

The present invention is directed to overcoming one or more of the problems discussed above.

SUMMARY OF THE INVENTION

In one aspect, the invention provides x-ray imaging apparatus having an x-ray source which includes an anode plate, means for directing an electron beam to the plate to produce x-rays at an x-ray origin point on the plate, and means for traveling the x-ray origin point in a raster scanning motion within a first raster scan area on the plate in response to an x-axis sweep frequency signal and a y-axis sweep frequency signal. An x-ray detector produces a detector signal that is indicative of variations of x-ray intensity at a detection point that is spaced apart from the anode plate. A monitor has an image display screen and means for moving a visible light origin point in a raster scanning motion within a second raster scan area at the screen. The intensity of the light origin point is modulated during the course of the raster scanning motion at the second raster scan area by the variations of the detector signal which occur during the course of the raster scanning at the first raster scan area. The apparatus further includes means for producing a first sequence of digital data bytes which encode successive values indicative of variations in the magnitude of the x-sweep frequency signal that are to occur during the course of the raster scanning at the first raster area, means for producing a second sequence of digital data bytes which encode successive values indicative of variations in the magnitude of the y-sweep frequency signal that are to occur during the course of the raster scanning at the first raster area, and means for producing the x-sweep frequency signal and the y-sweep frequency signal during the course of the raster scanning at the first raster scan area by conversion of the values encoded by successive data bytes of the first and second sequences into analog signals.

In another aspect, the invention provides X-ray imaging apparatus having an x-ray source which includes an anode plate and means for directing an electron beam to the plate to produce x-rays at an x-ray origin point on the plate and means for traveling the x-ray origin point in a raster scanning motion within a first raster scan area on the plate in response to x and y axis sweep frequency signals. An x-ray detector produces a detector signal indicative of variations of x-ray intensity at a detection point that is spaced apart from the anode plate. A monitor has an image display screen and means for moving a visible light origin point in a raster scanning motion within a second raster scan area at the screen. The intensity of the light origin point is modulated by the variations of the detector signal which occur during the course of the raster scanning motion at the first raster scan area. Means are provided for producing and storing digital signals which encode the location of a selected area of the image in response to area of interest selection controls. Further components include means for reducing the size of the first raster pattern at the anode plate in response to a zoom signal and means for positioning the reduced first raster pattern at a location on the anode that corresponds to the selected location on the image display screen that is encoded by the digital signals.

In another aspect, the invention provides a method for creating a radiographic image of a subject which includes the step of scanning an electron beam in a first raster pattern on an anode plate to produce a moving x-ray origin point. X-rays are detected at a detection point situated at the opposite side of the subject from the anode plate and a detector output voltage is produced in response to the detected x-rays. Further steps include sweeping a light origin point on a display screen in a second raster pattern and varying the intensity of the light origin point at successive points in the second raster pattern in accordance with variations of the detector output voltage at corresponding points in the first raster pattern, selecting an area of the image at the display screen for magnification, encoding the location of the selected area in digital signals and initiating a zoom signal. Still further steps in the method include reducing the size of the first raster pattern in response to the zoom signal and positioning the reduced first raster pattern at a location on the anode plate that corresponds to the the location in the image that is encoded in the digital signals.

In still another aspect, the invention provides a method of obtaining a radiographic image of a subject which includes the steps of producing x-rays at an x-ray origin point on an anode plate of an x-ray tube by directing an electron beam to the plate, traveling the x-ray origin point in a raster scanning motion within a first raster scan area on the anode plate by applying an x-axis sweep frequency signal and a y-axis sweep frequency signal to the x-ray tube and detecting x-rays at a detection point situated at the opposite side of said subject from the x-ray origin point. Further steps include producing a detector signal that is indicative of variations of x-ray intensity at the detection point as the x-ray origin point moves to successive locations in the first raster scan area, producing a radiographic image by moving a visible light origin point at a display screen in a raster scanning motion within a second raster scan area at the screen and using the detector signal to produce variations of the intensity of the light origin point at successive locations in the second raster scan area. Still further steps in the method include producing a first sequence of digital data bytes which encode successive values indicative of variations in the magnitude of the x-sweep frequency signal that are to occur during the course of said raster scanning motion at the first raster scan area, producing a second sequence of digital data bytes which encode successive values indicative of variations in the magnitude of the y-sweep frequency signal that are to occur during the course of the raster scanning motion at the first raster scan area and modulating the magnitudes of the x-sweep frequency signal and the y-sweep frequency signal during the course of the raster scanning at the first raster scan area by reference to the values encoded by successive data bytes of the first and second sequences thereof.

The invention enables faster operation of reversed geometry scanning x-ray systems, simplifies the operator's control manipulations and expands the capabilities of the system with respect to producing images of different types by enabling digital data processor control of the scanning x-ray source and image characteristics. The operator may, for example, zoom in to magnify one or more areas of the image that are of particular interest by simple actuations of one or more standard computer input devices. In the preferred form of the invention, high resolution scanning of the subject can be limited to selected regions which are of interest thereby reducing scanning time and minimizing radiation exposure of the subject. Magnified high definition images of selected regions of a subject can be acquired, stored, digitally enhanced in any of various ways and then be displayed sequentially or simultaneously. In the preferred form, the system can produce an unblurred image of a moving subject by automatically shifting the location of the raster scan at the anode plate of the x-ray source as necessary to track the movement of the subject. The preferred form of the invention also automatically adjusts the voltages and currents that are applied to components of the scanning x-ray source during different modes of operation to avoid overheating of the anode component. In the preferred form, the invention enables variation of the aspect ratio or height to width ratio of the image in response to digital signals to facilitate imaging of differently shaped subjects or, in the case of a moving subject, to compensate for an image distortion which can otherwise result from the motion of the subject.

The invention, together with further aspects and advantages thereof, may be further understood by reference to the following description of the preferred embodiment and by reference to the accompanying drawings.

BRIEF DESCRIPTION OF THE DRAWINGS

FIG. 1 is in part a perspective view of a scanning x-ray source and x-ray detector and in part a block diagram showing major components of the preferred embodiment of the invention.

FIG. 2 depicts the screen of a video display monitor and certain other components of the apparatus of FIG. 1 and diagramatically depicts operations which are involved in the process of acquiring magnified high resolution images of regions of a lower resolution image that are of particular interest.

FIG. 3 depicts the face of the x-ray source of FIG. 2 at later stages in the process of acquiring high resolution images of selected areas of interest.

FIG. 4 depicts the display screen of FIG. 2 during simultaneous presentation of a plurality of the high resolution images of areas of interest.

FIG. 5 is a diagram showing how FIGS. 6A, 6B and 6C may be disposed in side by side relationship to form a single continuous circuit diagram.

FIGS. 6A, 6B and 6C are jointly a circuit diagram showing the apparatus of the preceding figures in greater detail.

FIG. 7 is a circuit diagram depicting counter components of the circuit of FIG. 6A in still greater detail.

FIG. 8 is a program flowchart of computer operations which take place during the process of obtaining and storing data for enabling display of magnified, high resolution images of areas of particular interest that have been selected in a wider angle, lower resolution image.

FIG. 9 is a program flowchart of computer operations involved in acquiring digitized image data of areas in an image at which a grey scale transition of selected magnitude occurs and which may be used to produce an unblurred image of a moving object without physical movement of the x-ray source and/or the detector.

FIG. 10 is a program flowchart of computer operations involved in automatically searching an image to locate grey scale transitions of the type that are tracked by the operations shown in FIG. 9.

FIG. 11 is a circuit diagram of a sweep frequency error detection circuit which is depicted in block form in FIG. 6B.

FIG. 12 depicts voltage variations as a function of time that occur at certain points in the circuit of FIG. 11.

DETAILED DESCRIPTION OF THE PREFERRED EMBODIMENT

Referring initially to FIG. 1 of the drawings, an x-ray imaging system 11 in accordance with this embodiment of the invention includes a scanning x-ray source or tube 12 and an x-ray detector 13 which components may be similar to those described in my hereinbefore discussed U.S. Pat. No. 3,949,229.

The scanning x-ray source 12 has an electron gun 14, situated in an evacuated envelope 16, which directs an electron beam 17 towards an electrically conductive anode plate 18 that forms the front face of the envelope. Anode plate 18 is grounded and a tube voltage supply circuit 19 applies a high negative voltage to the electron gun 14. The voltage difference accelerates electron beam 17 and the impact of the high energy electrons on anode plate 18 results in emission of x-rays at an x-ray origin point 21 situated at the point of impact of the beam on the plate.

The x-ray origin point 21 is swept in a first raster pattern 22 on anode plate 18 by beam deflection means 23 which receives beam deflection signals from an x-axis sweep frequency generator 24 and a y-axis sweep frequency generator 26. X-axis sweep frequency generator 24 produces a voltage having a sawtooth waveform that exhibits repetitive rises separated by abrupt drops while y-axis generator 26 produces a similar waveform that rises and drops at a lower frequency. Consequently, x-ray origin point 21 scans anode plate 18 along a series of substantially parallel scan lines 27 that jointly define the first raster pattern 22. As will hereinafter be described in more detail, sweep frequency generators 24 and 26 adjust the output voltages as needed to compensate for pincushion distortion and to accommodate to changes of electron beam energy.

The beam deflection means 23 in this embodiment includes a magnetic deflection yoke 28 of the known form although it is also possible to make use of known forms of electrostatic beam deflector.

X-ray detector 13 is spaced apart from the x-ray source 12 and the subject 29 which is to be imaged is situated between the source and detector. The detector 13 may be of one of the known types which has a small, radiation sensitive area 31 and which produces an output signal voltage that varies in accordance with variations of x-ray intensity at the sensitive area. The detector 13 may, for example, be a scintillation detector or small ionization detector although other forms of detector may also be used.

The x-ray image is displayed at the screen 32 of a video display monitor 33 which may be of the known type in which a light origin point 34 at the screen is scanned in a raster pattern 36 in response to x and y axis sweep frequency voltages of the hereinbefore described kind and in which the intensity of the light origin point is modulated in the course of the raster scan in response to a z-axis or intensity signal. The x-ray image may be produced by establishing a raster pattern 36 at monitor 33 that is similar to the raster pattern 22 that occurs at the x-ray source 12 and by modulating the intensity of light origin point 34 in the course of the raster scan in accordance with variations of the detector 13 output voltage that occur in the course of a raster 22 scan at the x-ray source. This produces a radiographic image as the detector output voltage at any given instant is determined by the x-ray absorbency of the region of the subject 29 that lies on a line extending from the momentary position of the x-ray origin point 21 to the relatively small x-ray sensitive area 31 of the detector 13. Thus variations of x-ray absorbency at successive stages of the scan cause corresponding variations in the brightness of the image at display screen 32.

In the original x-ray imaging systems of this general kind, the x and y sweep frequency generators were analog circuits and sweep frequency voltages corresponding to the output of the generators were simultaneously applied to the x-ray source and display monitor to synchronize the raster scans. Voltage variations at the output of the x-ray detector were also processed in analog form and were applied to the z or intensity signal terminal of the display monitor. The present invention greatly facilitates control of the system 11 and enables novel modes of operation by employing digital data processing techniques to control the beam deflection means 23, the electron gun 14 and characteristics of the image at display monitor 33 and by digitizing the detector 13 output signals. A computer central processing unit 38 and standard operator input devices may then be used to initiate different modes of operation of the system 11 and also to automatically adjust operating voltages and currents as needed to accommodate to the different modes of operation. The input devices of this particular embodiment are a keyboard 41 and track ball 42 although other known forms of operator input device may be substituted or used in conjunction with such inputs.

For example, the operator may select one or more particular areas of an initial full sized image at the display monitor screen 32 for rescanning at higher resolution and for presentation as a magnified image. The magnified images, which may have selectable sizes and ratios of height to width, may then be displayed in sequence or simultaneously. Simple input manipulations at keyboard 41 enable the operator to change the size, shape and location of the raster scan pattern 22 at the tube anode plate 18 in order to inspect different regions of the subject 29 or these parameters may be automatically varied by programming of the central processing unit 38. Resolution and scan speed at the x-ray source 12 may also be varied by the operator or in response to programming. The program of this embodiment of the invention also enables operator initiation of standard forms of image processing including colorizing of the image based on different gray scale levels in the image, edge enhancement, field flattening, stretching or compression of the image, image subtraction and histogram equalization.

A detector circuit 43 generates a sequence of serial data bytes which encode values indicative of changes of x-ray intensity at detection point 31 during the course of each raster scan at the tube 12. In one mode of operation the data bytes are transmitted to the buffer storage 44 of a video board 46 through a computer interface 47 and are stored at x-y addresses in the buffer storage that correspond to successive points in the raster scan at tube 12. Alternately, in instances where high precision image processing or high resolution scanning are to be performed, interface 47 first transmits the detector signal data bytes to the memory 48 of the central processing unit 38 and the processed data is then transmitted to buffer storage 44. The video board 46, which may be of known form, sequentially converts the stored x and y addresses and digital detector signal values to analog voltages which are transmitted to monitor 33 to cause the raster scan 36 and radiographic image display.

A magnified, high resolution image of an area 49 of the subject 29 that is of particular interest is produced by reducing the size of the raster pattern 22 at tube 12 as depicted by dashed line 22a and by shifting the location of the reduced raster pattern on anode plate 18, if necessary, to cause x-rays which travel from the reduced raster pattern to detection point 31 to pass through the area of interest 49. As the raster pattern 36 at monitor 33 remains full sized, an enlarged image of the area 49 is produced at screen 32. A relatively dense inclusion 51 in the subject 29 that appears at an off center location at screen 32 during a full sized raster scan at tube 12 appears at a more centered location 51a on the screen in the subsequent magnified image if the reduced raster pattern 22a has been shifted to be centered on the inclusion.

Referring to FIG. 2, central processing unit 38 has a cursor control circuit 52 of the known form which controls the movement of a small visible cursor symbol 53 at display screen 32 in response to the operator's manipulations of the track ball 42 or cursor controls at keyboard 41. Upon inspection of a full size image at screen 32, the operator may select a localized area 49 of interest for magnification by initially traveling cursor 53 to the upper left corner of the area 49. An initial actuation of the track ball switch 54 signals the central processor to store the x and y axis raster address of that corner in memory 48. The operator than moves cursor 53 to the lower right corner of area 49 and a second actuation of track ball switch 54 results in digital storage of the raster address of that corner.

CPU 38 interprets the second actuation of track ball switch 54 as a zoom signal and initiates a rescanning at x-ray source 12 within a reduced raster pattern 22a. Utilizing the stored area of interest raster addresses, CPU 38 determines and initiates changes in the x and y sweep frequency waveforms that are needed to confine the reduced raster pattern 22a to the portion of the original full sized raster pattern that begins at an address corresponding to the first stored raster address and ends at the address which corresponds to the second stored raster address.

Referring jointly to FIGS. 2 and 3, the reduction and relocation of the x-ray tube raster pattern enables production of a magnified, high resolution image at screen 32 in the manner previously described.

To expedite x-ray inspection of subjects that may have a number of areas 49 of particular interest, central processing unit 38 is programmed to store a plurality of sets of tube raster scan addresses which are selected by the operator in the above described manner, three such areas 49, 49a and 49b being depicted in FIG. 2. Actuation of a keyboard key 56 instructs central processing unit 38 to execute the corresponding three reduced and repositioned raster scans 22a, 22b and 22c in sequence and to store the resulting image data as three separate images that can be read out to produce video signals for transmission to the display monitor 33 in the manner previously described. The data is stored in the buffer storage 44 of video board 46 unless high precision image processing or very high resolution scanning is performed in which cases the data is temporarily stored in CPU memory 48.

By actuating different ones of the keyboard keys 56, the operator may optionally initiate a full sized display of a selected one of the areas of interest 49, 49a and 49b or a simultaneous display as shown in FIG. 4 in which each image appears at a separate quadrant of the display screen 32. Images having a resolution that is greater than the resolution of the display screen 32 are stored in CPU memory 48. Actuation of different keyboard keys 56 causes selected portions of the full image data to be moved to the video board buffer storage 44 for readout and display.

During the process of selecting the areas 49 of interest, it is preferable to sequence the selection of the individual areas in a manner which avoids scanning of a particular area of the tube anode plate 18 immediately after scanning of an adjacent area. Scanning of adjacent areas should be separated in time. This allows each scanned area of the anode plate 18 to cool before scanning of an adjacent area and thereby avoids anode damage from overheating.

The capability of limiting high resolution scanning of the subject to only selected areas of interest enables faster scanning operations and reduces radiation exposure of the subject. This is advantageous in medical, dental and industrial x-ray procedures. As one specific example, throughput in the online inspection of printed circuit board solder joints can be increased as only the portions of the boards that contain such joints require inspection.

The vertical spacing of the scan lines 27 in FIG. 2 and in the other figures and the horizontal spacing of x addresses or image pixels 57 have been exaggerated in the drawings for clarity of illustration. Such spacings determine resolution or definition in the images and, as will hereinafter be described in more detail, are adjustable and selectable by the operator or by computer programming.

FIGS. 6A, 6B and 6C, which may be disposed in end to end relationship as shown in FIG. 5 to form a single circuit diagram, show the circuits of the above described embodiment of the invention in greater detail.

Referring initially to FIG. 6A in particular, a system master clock 58 generates repetitive clock pulses which cycle and synchronize digital components of the apparatus. The clock pulses are transmitted to a divider 59 which outputs clock pulses at a selectable frequency determined by a divisor value received from central processing unit 38. The divider 59 enables selection of a raster line scan speed by the operator at the keyboard or by computer programming. In this example of the invention scan speed can be varied to complete a raster scan during a time interval which may range from 1/16 second to 8 seconds.

The x-axis sweep frequency generator 24 has a first pulse counter 61 which counts the clock pulses from divider 59 and which resets to a count of zero and begins a recount each time that a maximum count is reached. For reasons which will hereinafter become evident, a count of zero at counter 61 positions the electron beam at the left side of the raster scan area, progressively higher counts travel the beam along a horizontal scan line and the beam is at the right side of the scan area when the maximum count is reached. The counter 61 resets to a count of zero and begins a recount each time that it reaches a count equal to the maximum count. To enable a particular mode of operation which will hereinafter be described, the maximum count is preferably variable in response to operator input at the keyboard or to programming of the central processing unit. For this purpose, counter 61 may be provided with an x-max register 61a which receives the maximum count value from the central processing unit. Counter 61 increments in accordance with a step value stored in a step register 62 which value determines image resolution in the horizontal direction. The step value is received from central processing unit 38 in response to operator input or the program and is variable to enable variation of image resolution. In the present embodiment, horizontal resolution can be varied from 256 pixels to 2048 pixels.

Counter 61 produces a sequence of digital data bytes which encode successive changes in the accumulated count and which are transmitted to a digital to analog signal converter 63 which outputs a voltage that changes in accordance with the changing values encoded by successive data bytes from the counter. Thus the output of converter 63 has a sawtooth waveform which exhibits repetitive rises separated by relatively abrupt drops.

Digital to analog converter 63 is of the known multiplying type which exhibits a variable gain that depends on the magnitude of a reference voltage that is applied to one input of the converter. The degree of change in the output voltage of the converter that results from a given change in the numerical value encoded in the digital input signal is a function of the magnitude of the reference voltage. The reference voltage is received from another digital to analog converter 66 in response to a digital value transmitted from the central processing unit 38 in response to operator input from the keyboard or in accordance with programming of the unit 38. The amplitude of the output voltage from converter 63 determines the length of the raster scan lines at the x-ray source. Thus the size of the raster scan pattern at the x-ray source, in the x or horizontal direction, is reduced by reducing the reference voltage that is applied to converter 63.

To enable shifting of the position of a reduced raster scan pattern at the x-ray source in the x axis or horizontal direction, the output of the converter 63 is coupled to one input of an adding amplifier 67 through a buffer amplifier 68. In response to operator input from the keyboard or to programming, central processing unit 38 generates a pan signal in digital form which is converted to a voltage by another digital to analog converter 69 which voltage is applied to the other input of amplifier 67. Amplifier 67 functions as a summing junction and produces an output voltage which includes the varying voltage received from buffer amplifier 68 and a continuing time independent component determined by the magnitude of the voltage that is received from converter 69.

The output of amplifier 67 is applied to a pincushion correction circuit 65a which also receives the corresponding voltage from the y axis sweep frequency generator 26. Circuit 65a is a function generator which delinearizes the x-axis sweep frequency signal to correct for pincushion distortion. The correction circuit 65 may be of the known design that is widely used in television equipment and other systems having image producing cathode ray tubes.

The high voltage which is applied to the x-ray source is adjustable and is determined by a digital control signal which originates at central processing unit 38 as will hereinafter be described in more detail. In the absence of compensation, changing the high voltage at the cathode of the x-ray source will result in a change in the size of the raster pattern as the degree of electron beam deflection that takes place is in part a function of beam energy. To enable variation of the high voltage without such effects, the corrected x-sweep frequency signal from correction circuit 65a is applied to a multiplying digital to analog converter 70a which multiplies the signal voltage by a value which is computed by and received from the central processing unit 38 through a data bus 70, the value being equal to the square root of the value represented by the current high voltage control signal.

The output of converter 70a is applied to the x-axis deflection coil 71 of the electron beam deflection yoke 28 through a power amplifier 72a.

Referring jointly to FIGS. 6A and 6B, the variable component of the x sweep frequency signal causes the electron beam to repeatedly scan along the scan lines of the raster pattern while the continuing time independent component causes a displacement of the raster pattern from a centered position at the x-ray tube anode plate 18, in the x axis direction, that is determined by the magnitude of the time independent component. Thus the raster pattern can be shifted in that direction to a selected extent by varying the pan signal which is transmitted to converter 69 by the central processing unit 38.

The y axis sweep frequency generator 26 includes a second pulse counter 73 which receives an input pulse from the first pulse counter 61 each time that the first counter resets to a count of zero which resetting occurs at the completion of scanning of each line in the raster pattern. Each such input pulse increments the accumulated count by an amount determined by a step value which is transmitted to a step register 74 from the central processing unit 38 in response to operator input at the keyboard or in response to programmed instructions. The step value determines image resolution in the vertical or y direction. A count of zero positions the electron beam at the top of the raster scan area and progressively higher counts step the beam to progressively lower levels in the scan area. Second counter 73 resets to a count of zero each time that the accumulated count reaches a maximum value that is set into a y-max register 73a by the central processing unit 38 in response to operator input or programmed instructions.

The second counter 73 outputs a second sequence of digital data bytes encoding successive changes in the accumulated count. A second multiplying digital to analog converter 76 converts the values represented by successive data bytes into a stepped output voltage which progressively changes between minimum and maximum values during the course of each full raster scan or frame. The gain or degree of change of the output voltage that occurs in response to a given change in the numerical input to converter 76 is again determined by a variable reference voltage that is applied to the converter. The reference voltage is produced by another digital to analog converter 77 and has a magnitude determined by a numerical value that is transmitted to converter 77 by central processing unit 38 in response to keyboard input or the programmed instructions.

Shifting of the position of a reduced raster scan pattern on tube anode plate 18 in the y-axis or vertical direction is provided for by coupling the output of multiplying digital to analog converter 76 to one input of another adding amplifier 78 through another buffer amplifier 79. In response to keyboard input or programming, central processing unit 38 transmits a scroll signal in digital form to another digital to analog converter 81 which applies a voltage to the other input of adding amplifier 78 that has a magnitude determined by the numerical value received from the central processing unit. Thus the output voltage of amplifier 78 varies in accordance with the output voltage of multiplying converter 76 but may have a continuing, time independent component determined by the numerical value that is being set into converter 81.

The amplifier 78 output voltage is applied to the y-axis deflection coil 82 of beam deflection yoke 28 through another pincushion correction circuit 65b, multiplying digital to analog converter 70b and power amplifier 72b which components may be similar to the hereinbefore described corresponding components of the x-axis sweep frequency generator circuit 24.

The stepped progressively changing component of the y-axis sweep frequency signal causes the electron beam to scan along successive different ones of the scan lines in the raster pattern. The time independent component shifts the raster pattern away from a centered location on anode plate 18, in the vertical or y direction, by an amount determined by the magnitude of that component.

Thus the size of the raster scan pattern at the x-ray tube 11 may be varied to a selected degree in the horizontal direction and the vertical direction by varying the digital values which are applied to digital to analog converters 66 and 77. The aspect ratio or width to height ratio of the raster scan pattern can also be varied by changing the ratio of the digital values that are applied to converters 66 and 77. A reduced raster scan pattern may be displaced from a centered location on anode plate 18 in the horizontal direction or the vertical direction or both by varying the digital values applied to converters 69 and 81. Scan speed is selectable by varying the digitally encoded divisor value that is applied to divider 59. Resolution in the image in the horizontal direction and the vertical direction is selectable by varying the digital values applied to step controls 62 and 74. This enables the previously described production of magnified, high resolution images of selected areas of interest in the subject by simple keyboard manipulations or in response to programming of the central processing unit 38.

FIG. 7 depicts internal components of the first and second pulse counters 61 and 73 in this example of the invention. Within the first or x-counter 61, a digital data latch 211x receives the output of a binary adder 212x and has a load terminal which receives the clock pulses from divider 59. Thus the initial clock pulse at the start of a raster scan causes the latch 211x to store a numerical value corresponding to the value which is currently being outputted by adder 212x which value is zero at that time. Adder 212x has one input which receives the output of latch 211x and a second input which receives the value which is currently stored in the x step register 62 as previously described. Consequently, the second clock pulse causes latch 211x to replace the previously stored value with a new value that is equal the previously stored value plus an increment determined by the step register value. Thus the latch 211x successively stores progressively higher values in response to successive clock pulses which values differ by the value stored in the step register 62. The successive values that are stored by latch 211x are applied to the digital input of the previously described multiplying digital to analog converter 63.

The value which has been stored in the x-max register 61a as previously described is applied to the reference input of a digital comparator 213x. The other input receives the value which is currently stored in the latch 211x. Thus the output of comparator 213x becomes high when the value currently being stored by the latch 211x becomes equal to the value stored in the x-max register 61a. The output of comparator 213x is coupled to the clear or reset terminal of latch 211x through one input of a NOR gate 214x which inverts the output. The latch 211x in this embodiment is of the known type which resets to a count of zero when the voltage at the clear terminal goes low. Thus scanning along each horizontal line ends after a particular number of clock pulses have been received which number is determined by the value which has been set into the x-max register 61a.

The other input of NOR gate 214x is connected to the central processing unit 38 through interface 47 to enable resetting of the x-counter 61 in response to operator input at the keyboard or in response to instructions in the program.

Internal components of the second or y-counter 73 include another latch 211y, binary adder 212y, comparator 213y and NOR gate 214y. These components may be similar to those of the first counter 61 and are interconnected and operate in a similar manner except that the load terminal of latch 211y receives the output of comparator 213x of the first counter instead of receiving clock pulses, the reference input of comparator 213y receives the digital value which has been set into the y-max register 61a, the digital value stored in y-step register 74 is applied to one input of binary adder 212y instead of the x-step value and the successive values which are stored by latch 211y are applied to the previously described multiplying digital to analog converter 76 rather then to converter 63.

Thus the digital value which is outputted by counter 73 increments upwardly, by an amount determined by the value in y-step register 74, at each time that scanning of a horizontal line is completed and the counter is reset to zero after scanning of a number of horizontal lines that corresponds to the value which has been set into y-max register 73a.

In this example of the invention, the components of counters 61 and 73 are industry standard TTL integrated circuits. Latches 211x and 211y are TTL74273 8-bit latch ICs of which two are needed in each counter to accommodate to the 12 bit input values which are established by the appended program. Adders 212x and 212y in this example are each formed of three TTL7483 four bit adder ICs. Comparators 213x and 213y each include three TTL-7485 four bit comparator integrated circuits. NOR gates 214x and 214y are TTL7402 devices.

With an exception which will hereinafter be pointed out, all digital to analog converters in this example of the invention are AD DAC80 integrated circuits manufactured by Analog Devices, Norword, Mass., U.S.A. All multiplying digital to analog converters are AD7541 ICs from the same manufacturer. Clock 58 is an MX055GB2C-4.0 manufactured by CTS Corporation, Sandwich, Ill., U.S.A and divider 59 is a TTL7497. All registers in this embodiment are TTL74273 integrated circuits.

Use of a computer 38 to produce the above described digital signals which control the operating parameters of the x-ray source 12 is highly advantageous as it also enables digital image processing and programmed control of the system to effect a variety of different modes of operation. Simpler and less versatile systems may not necessarily require a computer. The digital signals for setting and varying the operating parameters of the x-ray source 12 can, in some instances, be generated directly at a digital keypad or other device of the type which produces selectable digital signals in response to operator input. In automated systems where the x-ray source 12 is intended to cycle repetitively in a predetermined manner, the digital control signals for cycling the x-ray source may be repetitively read out of a digital data storage such as magnetic tape or a disk for example.

Referring to FIGS. 6A, 6B and 6C, brightness and contrast in the displayed images may also be varied by operator actuations at the keyboard or by the programming of the central processing unit 38. For this purpose, unit 38 transmits a brightness signal to the detector circuit through a bus 84 which signal encodes a digital value indicative of the desired brightness and transmits a desired contrast signal in digital form through another bus 86. With reference to FIG. 6C in particular, components of the detector circuit 43 include a digital to analog converter 87 which receives the brightness signal from bus 84 and which applies a voltage having a magnitude determined by the signal to one input of an adding amplifier 88. The other input of amplifer 88 receives the output signal from the x-ray detector 13 through a preamplifier 89. Amplifier 88 adds the brightness signal voltage to the preamplified detector output voltage. Thus the average value of the detector signal at the output of amplifier 88 can be adjusted by varying the brightness signal.

The detector signal at the output of preamplifier 89 is negative in this particular example of the invention and has a range of 0 to $-10$ volts. Detector circuits providing other ranges and positive signals can also be used if the ranges of preamplifier 89 and digital to analog converter 87 are matched to the circuit.

The contrast control signal from bus 86 is received by a multiplying digital to analog converter 91 and the detector signal voltage from amplifier 88 is applied to converter 91 as the reference voltage that determines the multiplying factor of the converter. Thus the output voltage from converter 91 varies in accordance with variations of the detector signal and is amplified, the degree of amplification or gain being adjustable by varying the contrast control signal. Higher amplification increases contrast in the image enabling better perception of slight differences in density between adjoining regions of the subject. Lower amplification and less contrast may be preferable where pronounced density differences are present such as in medical x-rays which depict both bony structures and soft tissue.

Multiplying digital to analog converter 91 multiplies the voltage received from amplifier 88 by a fraction in the range from 0 to 1 that is determined by the digital input from bus 86. To provide further amplification, the output of converter 91 is connected to the inputs of each of four voltage amplifiers 92a, 92b, 92c and 92d which have progressively greater gains. The output of each amplifier 92a, 92b, 92c and 92d is coupled to a separate input of a multiplexer 93 (an AD7502 manufactured by Analog Devices) which enables the central processing unit 38 to route the detector output signal through any selected one of the amplifiers depending on the degree of contrast that has been selected by the operator or by the program. The output of multiplexer 93 is converted to a sequence of image data bytes which encode density variations in the subject at successive stages of the scan.

In the above described detector circuit 43, multiplying digital to analog converter 91 functions as a fine gain control while amplifiers 92 and multiplexer 93 operate as a coarse gain control. The circuit 43 operates in accordance with the following equation:

$$V_o = C \times (V_i + B) \times n/255$$

where $V_o$ is the voltage at the output of multiplexer 93;

C is the coarse gain provided by selection of one of the amplifiers 92 and which in this example can be 1, 10, 100 or 1000;

$V_i$ is the voltage applied to one input of adding amplifier 88 by preamplifier 89;

B is the voltage applied to the other input of adding amplifier 88 by converter 84.

n is the digital value applied to digital to analog converter 91 through bus 86 and which in the present embodiment may be any integer between 0 and 255 to select the fine component of the gain.

Using the above specific parameters, which are presented for purposes of example and may be varied in other embodiments, the circuit 43 functions as a video amplifier with a continuous dynamic range of 0.1 to 1000.

The variations of the output voltage of multiplexer 93 are encoded in a serial sequence of image data bytes by an analog to digital converter 94. The digitized data are transmitted through the interface 47 where the bytes are packaged and, in one mode of operation, sent to the buffer storage 44 of video board 46 for storage at successive x-y addresses in response to successive clock pulses from the divider 59 of FIG. 6A. The image at display monitor 33 is created by reading out the stored data bytes from successive addresses in sequence.

The video board 46 may be of the known type which produces a standard television signal format such as RS-170 (as used for home television sets) or RS-343 (which provides greater resolution). In this example of the invention, the board 46 is a PCVISION-Plus Display Board manufactured by Imaging Technology, Inc., Woburn, Mass., U.S.A. Such a video board 46 provides a signal to the monitor 33 which encodes the horizontal and vertical sync and also provides an intensity signal voltage which varies in accordance with the values encoded by successive ones of the data bytes. If psuedocolor is used, such boards 46 also transmit three signals that vary in accordance with the red, green and blue values encoded by the data bytes as translated by a built in color lookup table (LUT). The data is transmitted to monitor 33 and is read out independently of any data transfers by the computer to and from the buffer storage 44 of the video board 46.

Thus a second raster scan is established at the display monitor screen that is similar in configuration to the first raster scan at the x-ray source 12 but not necessarily of the same size. The luminosity of successive points or pixels in the second raster scan varies in accordance with the values encoded by successive ones of the image data bytes and thus the monitor 33 displays the desired radiographic image.

In an alternate mode of operation which can be initiated at the keyboard, the central processing unit 38 does not transmit the image data directly to video board 46. With reference to FIGS. 6A and 6C in particular, the digitized serial image data bytes from analog to digital converter 94 are stored at successive x-y addresses in the CPU memory 48. This enables operator selection of any of several forms of digital data processing to alter characteristics of the image prior to transfer of the data to video board 46 for display in the previously described manner.

Specific forms of standard image data processing which are enabled by the program listing which accompanies this specification include colorization based on gray levels, field flattening, edge enhancement, image subtraction, histogram equalization and stretching or compression of contrast in the image. The program can be extended to enable still other types of digital data processing if desired.

In the preferred form of the invention and as implemented in the appended program listing, the central processing unit 38 can be used for automatic control of image brightness and contrast in order to obtain images of uniform quality. With reference to the previously given equation which governs the operation of the detector circuit 43, unit 38 initially sets the brightness or offset factor B at zero, the coarse gain factor C at one or unity gain and the factor n at the maximum value which is 255 in this example by applying the corresponding digital values to converter 87, multiplexer 93 and converter 91. At the end of the first raster scan, which is done at the lowest resolution and the greatest scan speed to minimize radiation exposure, the highest and lowest image data byte values are identified. The central processing unit 38 then readjusts the digital values that are applied to converter 87, multiplexer 93 and converter 91 to cause a detector signal voltage corresponding to the highest identified image data byte value to produce the maximum output available at analog to digital converter 94 and to cause a detector signal voltage corresponding to the lowest identified byte value to produce the minimum output at the converter 94. This autoranging process maximizes contrast in the image and is repeated to provide continual fine tuning of brightness and contrast.

Referring to FIGS. 6B in particular, components of the electron gun 14 of x-ray tube 12 include a cathode heating filament 96, an electron emissive cathode 97, a control grid 98 for varying electron beam current and a focusing grid 99 for causing the beam to impact the tube anode plate 18 at a single minute point at any given time. Referring jointly to FIGS. 6A and 6B, in order to control tube voltages and currents in response to operator selection at the keyboard or in response to instructions in the program, central processing unit 38 generates four sets of digital signals which are respectively encoded to identify the desired magnitudes of the high voltage at cathode 97, filament 96 current, control grid 98 voltage and electron beam current. The x-ray machine I/O board, interface 47, transmits the signals to a digital to analog converter 102 through a control data bus 100. At converter 102 each set of signals is converted to an analog voltage of corresponding magnitude and applied to a separate one of four output channels 101a, 101b, 101c and 101d of the converter. In the present example, the four channel converter 102 is an AD390 manufactured by Analog Devices.

Referring in particular to FIG. 6B which depicts the tube control module 19, the cathode voltage signal from converter output channel 101a is applied to the input of a high voltage supply 103 where it is amplified and transmitted to the cathode 97. The present example of the invention utilizes an RMP 125N300X1941 High Voltage Supply manufactured by Spellman Co., Plainview, N.Y., U.S.A.

The voltage from converter output 101b that determines filament current is amplified by amplifier 104 and applied to the input stage 106 of a first optical coupler 107. Optical coupler 107 may be of the known form having an input stage 106 that produces light having a frequency proportional to the amplitude of the input voltage and a light transmissive fiber optic intermediate stage 109 through which the optical signal is transmitted to an output stage 110 where it is reconverted to a voltage having the magnitude identified by the light frequency.

The high voltage regions of the apparatus are situated within a conductive metal enclosure, indicated by dashed line 111 in FIG. 6B, which is insulated from external structures and which is electrically coupled to the output of high voltage supply 103. The enclosure 111 serves as a virtual chassis ground for electrical components that are within the high voltage region. Optical coupler 107 and the other optical couplers to be described enable the transmission of control signals into the high voltage region by means that do not create a conductive path for direct current between the high and low voltage regions of the system. In the present example of the inventions stages 106, 109 and 110 of the optical couplers such as 107 are respectively an MFO-E76 Opto Emitter, an ESKA SH4001 Opto Cable and an MFOD71 Opto Detector manufactured by Motorola, Inc., Austin, Tex., U.S.A.

The output voltage of optical coupler 107 is applied to a power amplifier 112 and the tube filament 96 is connected between the output of the amplifier and enclosure 111. Thus the filament 96 is heated by a current having a magnitude that is determined by the control signal voltage at the output of coupler 107.

The focusing grid 99 voltage that is needed to focus the electron beam at anode plate 18 is dependent on the voltage difference between cathode 97 and the grounded anode plate. The focusing grid 99 voltage should be increased a proportionate amount when cathode voltage is increased and should be reduced when the cathode voltage is lowered. This is accomplished automatically in the present embodiment. High voltage supply 103 is of the type which has a first monitoring output line 113 that provides a relatively low monitoring signal voltage that is proportional to the high voltage that is currently being delivered by the supply. The monitoring signal voltage is amplified at a low voltage region amplifier 114 that is coupled to the input of a high voltage region amplifier 115 through another optical coupler 116. The output of amplifier 115 is connected to the focusing grid 99. Thus variation of the high voltage which is being applied to the x-ray tube 12, for the purpose of varying x-ray energy, is automatically accompanied by a voltage change at grid 99 that maintains beam focus at anode plate 18.

Control grid 98 regulates electron beam current. A control grid 98 voltage that is sufficiently negative relative to the voltage at cathode 97 suppresses the electron beam. Shifting the control grid voltage in the positive direction progressively increases electron beam current and therefore x-ray production. Increases in the high voltage at cathode 97 also act to increase beam current independently of the control grid 98 voltage. The present system automatically compensates for changes in cathode 97 voltage in order to maintain the beam current which has been selected by the operator at the keyboard or by instructions in the program.

For this purpose, the control grid voltage control signal from converter 102 output 101c (FIG. 6A) is amplified at amplifier 118 and applied to the positive input of a differential amplifier 119 through another optical coupler 121. The output of differential amplifier 119 is coupled to the control grid 98 through a voltage amplifier 122. The control signal which is applied to the positive input of differential amplifier 119 has a negative magnitude when the electron beam is to be suppressed and fixes a maximum control grid voltage when the electron beam is to be generated. Variation of control grid voltage between these extremes, to maintain the beam current that has been called for by the operator or by the program, is effected by varying the voltage that is applied to the negative input of differential amplifier 119 which voltage is subtracted from the voltage at the positive input by the amplifier.

In particular, the beam current signal from converter 102 output 101d (FIG. 6A) is applied to the negative input of another differential amplifier 123 which has an output coupled to the negative input of differential amplifier 119 through another optical coupler 124. Thus amplifier 119 applies a voltage to control grid 98 that is less than the above discussed maximum value by an amount determined by the beam current control signal which is received at the negative input of the amplifier.

Differential amplifier 123 enables automatic maintenance of the selected beam current when the high voltage at cathode 97 is changed. The high voltage supply 103 has a second monitoring signal line 126 that provides a voltage that is proportional to the current which the supply provides to the x-ray tube 12 and which is therefore proportional to electron beam current. The current monitoring line 126 is connected to the positive input of differential amplifier 123. Thus an increase in beam current brought about by an increase in the high voltage increases the output voltage from amplifier 123. This reduces the output voltage of amplifier 119 and therefore the control grid voltage since the amplifier 119 subtracts the voltage at its negative input from the voltage at its positive input. For similar reasons, an incremental decrease in beam current resulting from reduction of the high voltage causes an increase in control grid voltage that restores the beam current to the magnitude called for by the current control signal.

Operating power for the electronic components within the high voltage enclosure 111 is provided by a D.C. power supply 127 having a chassis ground connection 128 to the enclosure and positive and negative output terminals 129 and 131 respectively. Alternating current for energizing the power supply 127 is transmitted into the high voltage region through an isolation transformer 132.

Referring jointly to FIGS. 6A and 6B, malfunction of the x-sweep frequency generator 24 portion of the circuit or the y-sweep frequency generator portion 26 or both could cause tube damage in the absence of corrective measures. If the electron beam is not scanning regularly or evenly or scans too slowly, a localized area of anode plate 18 could be overheated. The previously described high voltage supply 103 is of a type which ceases to generate high voltage in response to receipt of a D.C. control signal. The control signal in the present embodiment is produced by an error detector 133 which monitors the currents that are transmitted to beam deflection yoke 28 and which applies the disabling control signal to the high voltage supply 103 if either current is absent or of insufficient magnitude to avoid tube damage. Error detector 133 will be hereinafter described in more detail.

Referring again to FIG. 1, reduction of the size of the raster pattern at x-ray source 12 as depicted at 22a acts to concentrate the heating effect of the electron beam 17 at a reduced area of anode plate 18. Anode damage from overheating is prevented by utilizing the previously described digital controls to reduce electron beam current as the size of the raster scan pattern is reduced and preferably to a degree that is at least approximately proportional to the size of the raster scan pattern area reduction. This is accomplished automatically in the present embodiment by instructions contained in the program.

The program listing which is appended hereto enables operator initiation of each of the modes of operation described above by input from the keyboard 41 and also enables each of the described automatic control functions that involve digital control signals.

FIG. 8 is a flowchart diagram which facilitates understanding of the programmed procedure for acquiring magnified high resolution images of areas in a full sized image that have been selected as being of particular interest, such as the areas 49, 49a and 49b as shown in FIG. 2.

With reference to block 134 of FIG. 8, image data for each area of interest 49, 49a and 49b are acquired and stored during separate raster scans at the x-ray source 12. The area may be selected by the operator at the beginning of each image acquisition or may be entered into a table of scan sequences to be executed by the central processing unit 38. If the vertical size of the scan is set equal to the horizontal size, a square area will be imaged. Rectangular areas having other vertical to horizontal aspect ratios may also be selected.

With reference to block 136, the four digital to analog converters 66, 69, 77 and 81 are then loaded from the central processing unit 38 to establish the pan (horizontal shift of the raster scan), scroll (vertical shift of the raster scan), zoom (magnification) for the first area of interest scan and a divisor is provided to the clock output divider 59 from the central processing unit 38 to establish scan speed. With reference to block 137, the scan is then started. With reference to block 138, the image data from the detector signal is copied to respective locations or addresses in the video display board buffer storage 44 as the raster scan proceeds. With reference to block 139, the scanning sequence stops at the end of the raster scan if no more area scans have been requested. Otherwise, the sequence returns to block 134 and the process continues looping until all requested area scans are completed at block 139.

One example of the use of area of interest scanning is in the inspection of solder joints in printed circuit boards. Only the areas of the board which contain the devices that have solder joints need be inspected. Their locations can be entered into a table of addresses to be stored and accessed by the computer.

In an alternate mode of operation, which is implemented by the appended program and made possible by the x-max and y-max registers 61a and 71a, one or more areas of interest are selected in an original image that may be obtained at high scanning speed. Thereafter, only the areas of interest are periodically rescanned at slower speeds for such purposes as image averaging or to detect motion while other portions of the image remain as originally acquired. This enables viewing of high clarity and updated depictions of the areas of interest against a background of the original image without rescannings of the entire image.

The areas are selected from an original image in the same manner as described above. Referring to block 136 of FIG. 8 and to FIG. 6A, The digital to analog converters 69 and 81 are then loaded from the central processing unit 38 in the previously described manner to establish the pan (horizontal shift of the raster scan) and scroll (vertical shift of the raster scan). In addition, x-max register 61a and y-max register 73a are loaded to establish the horizontal pixel count and vertical pixel count. The values stored in the step resisters 62 and 74 and in digital to analog converters 66 and 67 (the zoom registers) are left unchanged. Thus rescannings of the selected areas of interest have the same pixel spacing, resolution and aspect ratio as the original image and thus exactly overlay the original image on the display terminal screen.

In some usages of the apparatus 11 it is desirable to define the area of interest 49 by entering a set of densities or gray levels that appear in the initial full sized image. In medical or dental x-rays, for example, the relatively dense bone structures or teeth may be the subject of interest rather than adjacent soft tissue.

In this procedure, which is implemented by the appended program listing, the operator enters a selected gray level and a selected zoom value for an area of interest scan at the keyboard 41. The central processing unit 38 then does a full sized raster scan and analyzes the stored image data to locate an image pixel value that meets the entered gray level criterion. At this point, the pan and scroll values for rescanning the area that surrounds the raster address of the located pixel value, at the entered zoom value, are generated by the central processing unit 38 and a zoomed image is obtained in the previously described manner. An alternate procedure, which could be substituted into the program if desired, is to analyze the incoming serial image data during the initial full sized scan and then terminate the initial scan immediately when a pixel meeting the entered gray level criterion is detected. This would, on the average, speed the procedure and reduce radiation exposure of the subject in instances where there is only one area of interest that meets the gray level criteria.

The capability of making virtually instant changes in the operating parameters of the x-ray tube 12 together with the above described capability of identifying predetermined gray levels in the image data enables tracking of a moving area of interest 49 by the system. This can facilitate a variety of x-ray imaging operations. For example blurring of medical and dental x-rays by patient motion is a common problem. As another example, the medical procedure called electrophysiology involves movement of catheters to various locations within the human heart to monitor electrical signals associated with activities of the cardiac muscle. In this procedure, it is important to know the locations of the catheter sensors at all times as they are collecting vital data used for diagnosing the patients disease. Another application is monitor the flow of contrast media which has been injected into an artery during an angiographic procedure. The location information obtained during these operations can be stored for later analysis.

Another example of use of this type of area of interest scanning is the locating of clots in a blood vessel relative to the location of a catheter. A moving catheter can be tracked by using its gray level to define a first area of interest and the blood clot location gray level can be used to define a second area of interest. Only those two areas of interest are scanned thereby increasing speed and reducing radiation exposure of the subject.

The tracking procedure, which is implemented by the appended program listing, is depicted in the flowchart diagrams of FIGS. 9 and 10. With reference to block 141, the operator selects and enters the gray level criterion and the value for the zoom area that is to be imaged around the first location at which that gray level is encountered in the image data during an initial scan. The operator also enters a loop count value that determines the number of times that the search for the gray level will be repeated if the gray level has not been found during the prior searches. As indicated at block 142, the tracking process is then started and at block 143 the raster area is zoomed to full size. At the next block 144 the central processing unit checks to see if the loop count currently has a value greater than zero and in that event proceeds to block 146. If the loop count is zero, the tracking procedure is terminated.

With reference to block 146, the initial full sized image is acquired and the loop count is reduced by a count of one. At the next block 147 the search for the trigger gray level value is begun. If the trigger value is not found, the next block 148 selects the path back to block 143 and the process is repeated until the trigger gray level value is detected or until the loop count has been reduced to zero.

Upon detection of the gray level value, block 148 selects the path to block 149 at which raster size is reduced in accordance with the operator entered instruction and the raster scan area is shifted at the anode plate to be centered at the x and y axis location at which the trigger gray level was detected. The program then returns to block 144 and a new image is acquired. The program continues to loop and repetitively acquire new images until the loop count has been reduced to zero at block 144. If scanning repetition rate is sufficiently rapid, such as 16 raster scans per second for example, the image of a moving object at the display screen appears stationary.

Many different procedures may be used to perform the search, at block 147, for the operator entered gray levels of interest. The procedure of the present example is depicted in the flowchart of FIG. 10 and performs a center to outside search. Referring to block 151, the first search begins at the raster scan line $y_o$ where $y_o$ is the center of the search region defined by the operator selected zoom area ($y_o=Y_{max}/2$). The first offset or vertical displacement value for the raster scan ($y_{off}$) is 0. As indicated at block 152, the first x pixel is at x=0. With reference to block 153, the first pixel gray level is sampled and if it is less than the gray level trigger value the next pixel at x=x+step is sampled at block 154. The process repeats until either the trigger value is found at block 154 or x is greater than $x_{max}$ at block 155. In the latter case the y value becomes y=$y_{off}$+step at block 156. If y is less than $y_{max}$ at block 157 the path returns to block 152 and the process repeats until either the trigger gray level value is found at block 158 or y becomes greater than $y_{max}$. If the latter occurs than the trigger value hasd not been found as indicated at block 159. This corresponds to the situation at block 148 of FIG. 9 and the tracking loop repeats at block 143 of FIG. 9.

Imaging of a moving object in the above described manner can cause an apparent elongation of the object in the image, the elongation being in the direction of the motion and being proportional to the velocity of the object. The effect is more pronounced when the object moves in the y-axis direction due to the lower frequency of the y sweep signal relative to the x sweep signal. This distortion may be eliminated by using the previously described aspect ratio controls to reduce the aspect ratio of the raster scan area at the x-ray source in the direction of the object movement and by an amount proportional to object velocity.

A further advantage of selectable gray level triggering is reduction of x-ray dosage as radiation is concentrated at areas of interest and is not wasted on high resolution imaging of areas that are not of interest.

Referring again to FIG. 6B, a low value resistor 161x is connected in series relationship with the x-axis beam deflection coil 71 and a similar resistor 161y is in series relationship with the y-axis beam deflection coil 82. The voltage drops across resistors 161x and 161y vary in accordance with variations of the x and y sweep frequency signals and provide x and y sweep frequency monitoring signals to the sweep frequency error detection circuit 133 at terminals 162x and 162y respectively.

A suitable detailed circuit for the error detection circuit 133 is depicted in FIG. 11. As previously described, the high voltage supply 103 is of a type which turns off in response to a D.C. signal which will be herein termed the sweep error signal. Circuit 133 applies the error signal to the high voltage supply in response to an absence of either or both of the and y sweep frequency signals or to irregularities in the waveforms of the sweep signals thereby preventing heat damage to the anode plate of the x-ray source and also preventing acquiring of distorted images. The circuit 133 also prevents acquisition of erroneous image data from an abnormal raster scanning.

For this purpose, the x sweep frequency monitoring signal is amplified by connecting the previously described terminal 162x to the positive or non-inverting input of an operational amplifier 163 which amplifier has a negative or inverting input connected to ground through a resistor 164 and which has a feedback resistor 166 that determines the gain. Referring to FIG. 12, waveform 167a depicts the variation of the x-sweep monitoring signal voltage as a function of time and for purposes of illustration is shown as a defective sweep signal which is to be detected by the error detection circuit. In particular, the defective waveform 167a of this example has flattened or truncated peaks 168.

The output of amplifier 163 is coupled to the inverting input of a second amplifier 169 through a resistor 171 and capacitor 172 which are connected in series. A resistor 173 and parallel capacitor 174 provide a feedback circuit for amplifier 169 and the non-inverting input of the amplifier is connected to ground through another resistor 176. Capacitor 172 causes amplifier 169 to operate as a differentiator. Thus, as shown at waveform 167b in FIG. 12, the output voltage from amplifier 169 varies as a function of the rate of change of the output voltage from amplifier 163.

Referring jointly to FIGS. 11 and 12, the differeniated waveform 167b drops from a high level to a low level during the relative brief retrace intervals T1 to T2 and reverts to the high level during the following line scan interval T2 to T4 except that in the present example the flattened peak 168 causes the differentiated waveform to dwell at an intermediate level for a period T2 to T3 before returning to the high level. This dwell forms a window in the waveform that is detected by circuit 133.

The window detection portion of the circuit includes an AND gate 177 of the known form which has first and second inputs 178 and 179 and at which the output voltage is at a high state when high state voltages are present at both inputs and drops to a low value if the voltage at either input is low. The output voltage from differentiating amplifier 169 is applied to the non-inverting input of another amplifier 182 which has an inverting input connected to ground through a resistor 183 and a feedback circuit defined by a resistor 184 and parallel capacitor 186. The output of amplifier 182 is applied to the negative input of a first comparator amplifier 187 and to the positive input of a second comparator amplifier 188. The output of the first comparator 187 is connected to first input 178 of the AND gate 177 and the output of the second comparator 188 connects to the second AND gate input 179. Amplifier 182 functions to adjust the amplitude range of the differentiated waveform 167b to match the range of comparators 187 and 188.

Comparator 187 functions to detect whether the output from amplifier 182 is above or below a particular level indicated by dashed line V1 which is superimposed on waveform 167b in FIG. 12. The second comparator 188 detects whether the amplifier 182 output is above or below a lower level indicated by dashed line V0 in the drawing. The levels V1 and V0 are preferably selectable to enable selection of the degree of sensitivity of the circuit to sweep signal irregularities.

For this purpose, a resistor 189 and potentiometer 191 are connected in series relationship between the D.C. power supply (not shown) and ground and the junction between the two is connected to the reference voltage input of first comparator 187. Thus the reference voltage and therefore the voltage level V1 can be varied by adjustment of the potentiometer 191. Another resistor 192 and potentiometer 193 are connected in series between the power supply and ground to provide a selectable reference voltage to the second comparator 188 to enable variation of voltage level V0. The power supply applies +15 volts to resistor 189 and −15 volts to resistor 192 in this example although other values may be appropriate in other systems.

First comparator 187 compares the differentiated waveform 167b, as transmitted through amplifier 182, with the selected reference voltage at the positive input of the comparator and the output of the comparator is low during periods when the waveform voltage is equal to or exceeds the reference voltage and is high when the waveform voltage is lower than the reference voltage. Thus, as depicted at waveform 167c, the output of comparator 187 is high during the retrace period T1 to T2 and continues to be high during the following period T2 to T3 during which the irregularity 168 is present in the sweep signal. The comparator 187 output reverts to a low state during the following period T3 to T4.

As depicted at waveform 167d, the output of the second comparator 188 goes low during the retrace period T1 to T2 and is high at other times. Consequently, as depicted at waveform 167e, the output of AND gate 177 goes high during the periods T2 to T3 and is otherwise low as both comparator outputs are simultaneously high only during those periods.

In the absence of a sweep signal irregularity such as flattened peak 168, the output of AND gate 177 remains continuously low as the output of first comparator 187 goes high only during the retrace periods T1 to T2 and the output of the second comparator 188 goes high only during the intervening periods T2 to T4. Thus the presence of cyclical voltage pulses at the output of the gate 177, as depicted in waveform 167e, is indicative of an irregularity in the x-sweep frequency signal. In the total absence of the sweep signal, the output of the gate 177 becomes continuously high.

The output of AND gate 177 is connected to ground through a resistor 196, a circuit junction 197 and a capacitor 198. As depicted in waveform 167f, the output pulses from gate 177 that are indicative of sweep error charge capacitor 198. Normal leakage causes the charge to decrease somewhat during the intervals T3 to T4 when the gate 177 is disabled but the recurring pulses maintain the charge at an elevated level.

Another comparator 201 monitors capacitor 198 and responds to charging of the capacitor by outputting the error signal which disables the high voltage supply 103. This suppresses the electron beam in the x-ray source and stops x-ray generation.

For the foregoing purpose, the positive input of comparator 201 is connected to capacitor 198 at circuit junction 197. A selectable reference voltage is applied to the negative input of comparator 201 through another potentiometer 202 which enables adjustment of the level of charge that is required to trigger the comparator. The output of comparator 201 is applied to the high voltage supply 103 through one input of an OR gate 199 when the comparator senses that the voltage on capacitor 198 equals or exceeds the selected reference voltage that is received from potentiometer 202.

The y sweep frequency error detection circuit 203 is connected between the previously described terminal 162y and the other input of OR gate 199 and is not shown in detail as it may be similar to the above described x-sweep frequency error detection circuit except insofar as it cycles at the slower y sweep frequency.

The sweep error detection circuit 133 disabling high voltage supply 103 when necessary independently of the central processing unit 38 and the programming. Preferably, the error signals at the output of OR gate 199 are also transmitted to CPU 38. In accordance with the appended program, the central processing unit 38 responds to an error signal by turning off the sweep frequency signals, filament current, and control grid and focussing grid voltages at the x-ray source through the hereinbefore described control components. This also enables display of a sweep frequency error warning at the operator's display terminal.

While the invention has been described with respect to a particular embodiment for purposes of example, many modifications and variations are possible and it is not intended to limit the invention except as defined in the following claims.

Digiray.C                                          (C)opyright 1992 Digiray, Inc.

```
/*********************************************************************
 ***                                                                ***
 ***      APPENDIX TO UNITED STATES PATENT APPLICATION OF           ***
 ***      RICHARD D. ALBERT  AND DAVID L. REYNA  ENTITLED           ***
 ***      "METHOD AND  APPARATUS  FOR DIGITAL  CONTROL OF           ***
 ***      SCANNING X-RAY IMAGING SYSTEMS".                          ***
 ***                                                                ***
 ***              (C)opyright 1992 Digiray, Inc.                    ***
 ***                                                                ***
 ***                       Digiray.C                                ***
 ***                       ---------                                ***
 ***                                                                ***
 *********************************************************************/

/*********************************************************************
 ***                                                                ***
 ***   The following help table documents the program features,     ***
 ***   both functional and technical.  There is help text for       ***
 ***   each command 'a' to 'z' from the main menu, and overall      ***
 ***   information listed with the '?' help command.                ***
 ***                                                                ***
 *********************************************************************/ static char *help_tbl[] =
{
"-COMMAND (?)                                                      ",
"    Help : this online help is provided to explain the  function  ",
"of the commands of this program. Further technical  information   ",
"can be found in the program listing.                              ",
"                                                                  ",
"1) ABOUT THE PROGRAM                                              ",
"                                                                  ",
"    This  program  is intended to exercise the concepts  of  the  ",
"patent  as  fully yet as clearly as possible.  It has  an  online ",
"'help'  command  that describes each of program commands,  and  a ",
"'simulation' mode that can be used if the x-ray machine  hardware ",
"is  not present or not fully working. The various parts  of  the  ",
"software are grouped by name and by data structures, and the  I/O ",
"ports  are  identified  with the corresponding hardware  of  the  ",
"patent.                                                           ",
"    All  variables  are presented in their natural  units,  with  ",
"tube co-ordinates display in inches.                              ",
"                                                                  ",
"    This program was compiled using Microsoft (tm) C 6.0 compil-  ",
"er.  It was built using the following commands :                  ",
"                                                                  ",
"        cl   /AL /WO /Ze /Od /c digiray.c                         ",
"        link /CP:0xffff /NOI /SE:0x80 /ST:0x800 digiray.obj;      ",
"                                                                  ",
"                                                                  ",
"2) ABOUT THE HOST COMPUTER                                        ",
"                                                                  ",
"    These  are  the minimum system requirements.  The  expanded   ",
"memory  is used to demonstrate image averaging; if not present a  ",
"lower  quality display averaging is substituted.  If the  track-  ",
"ball/mouse is not present, the keyboard can also be a substitute. ",
"If  the x-ray machine I/O board is not present, the  program can  ",
```

```
"simulate it for purposes of demonstrating the program.
"
"       a)   PC-AT computer or compatible
"       b)   Monochrome Monitor
"       c)   512 Mb system memory
"       d)   PCVISION-Plus Display Board (512x512) from
"            Imaging Technology Inc., Woburn MA
"       e)   512 Mb expanded memory LIM EMS 3.2           (opt.)
"       f)   Microsoft (tm) mouse plus mouse.com driver   (opt.)
"            or compatible trackball device.
"       g)   X-ray Machine I/O board
"
"
"3) ABOUT THE IMAGE DISPLAY
"
"     The PCVISION-plus is a 512 by 512 display board.  It can
"display 256 by 256 by using internal pan, scroll, and zoom regis-
"ters.  Its display buffer is accessible in 64K pages,  the page
"frame by default is at A000:0000 on the AT.
"     Any  display  board of similar or greater qualities  can  be
"used  instead by replacing the display control code  area,  since
"the rest of the code accesses display buffer lines via a returned
"pointer.  The only assumption made by the software is that  image
"data  buffer pointer points to the entire line (for  the  current
"resolution) in the actual frame buffer.
"
"4) ABOUT THE X-RAY HARDWARE
"
"     The software assumes that there is an x-ray I/O board  that
"is  mapped as a series of word sized ports at addresses 0x380  to
"03af.   Each port is connected to a device defined in the  patent
"figures.  Each digital device is assumed to be 12 bits wide (with
"a value of 0 to 4095), unless otherwise indicated.
"     This board and the x-ray data it returns can be simulated by
"this program.
"
"     The  system  is assumed to have (a) a 100  KV  high  voltage
"supply,  (b)  2 mA of high voltage current available,  and  (c) a
"tube  with  an  area of 8 by 8 square inches.   These  and  other
"constants can be changed by the relevant define statement.
"
"
"COMMAND (a)
"     Resolution of X-ray : This sets the basic resolution of  the
"x-ray  scan: that is the number of pixels wide and the number  of
"lines high in the acquired image.  If the image display's resolu-
"tion  is different from the x-ray resolution at the beginning  of
"an  acquire session, the display is changed to the x-ray  resolu-
"tion.
"     The default value is 256 by 256.
"
"COMMAND (b)
"     Speed : The selected speed for the scan time sets the divid-
"er  value for the master acquire scan clock, with  this  internal
"divisor  value ranging from 1 (2^0) to 128 (2^7).  The scan  time
"shown assumes a one megahertz (1 Mhz) master clock (and a comput-
"er able to keep up with the input data rate).
"     The default value is one 256 by 256 scan per second.
"
"COMMAND (c)
```

"       High Voltage : this value sets the high voltage control sent
"to the HV supply. The square root of this voltage is sent to the
"pin-cushion compensation circuit. The full range of the supply
"is assumed to be 100 KV. The maximum high voltage can be set in
"the protection menu if the user is doing highly zoomed acquires,
"for example .
"       The default value is 0 KV.
"
"~COMMAND (d)
"       Current : this is the user's desired high voltage current.
"The x-ray machine is set to the lesser value between this re-
"quested current and the maximum allowed current value calculated
"by the zoom/current protection parameter (and the active zoom
"setting).
"       The default value is 0 mA.
"
"~COMMAND (e)
"       Filament : this is the filament voltage. Its range is
"assumed to be 0 to 10 volts. The default value is 0 volts.
"
"~COMMAND (f)
"       Focus : this is the focus voltage. Its range is assumed to
"be 0 to 10 volts. The default value is 0 volts.
"
"~COMMAND (g)
"       Scan Mode : This option selects the basic method of acquir-
"ing x-rays. This dictates the zoom method, zoom sequence, and/or
"the data amplifier manipulation per scan.
"
"       A)   ZOOM Setting : This is the basic method. It acquires a
"single image at the current x-ray resolution zoomed as defined by
"the zoom setting (command 'J'). The default zoom size is times
"one (no zoom).
"
"       B)   TABLE OF ZOOMS : this does a sequence of zoomed ac-
"quires based on the zoom table (command 'K'). Each image is
"acquired at the current x-ray resolution size. A preferred use
"is to (1) scan a full sized image, (2) select a number of arti-
"facts for close up zooms, and then (3) acquire these areas of
"interest using this table of zooms. The default table is a
"sequence of three scans with increasing zoom.
"
"       C)   TABLE OF AREAS : this does a sequence of area acquires
"based on the area table (command 'L'). This sets the horizontal
"and vertical pixel count of the acquired area while leaving the
"scan sizes unchanged. The new data then overlays a background
"image. A preferred use is to (1) scan a full sized image, (2)
"select a number of areas for continual fast update, and then (3)
"acquire these areas of interest using this table of areas. The
"default table is a sequence of three separate areas.
"
"       D)   TRACKING : this method tracks a moving object of a
"given grey level around the tube face. On the first scan, a full
"non-zoomed image is acquired. The image is then scanned for the
"trigger pixel value. This position becomes the next scan's
"center, and the scan is zoomed using the default zoom box size
"from command 'J'. If at any time the object is not found, the
"subsequent image will be again scan the full tube face.
"       Note that scan areas are always adjusted to remain on the
"tube face. The scan size takes precedence, meaning that the X and Y offset registers are adjusted as needed so that the scan
area never goes off the tube's edge.

The simulation mode creates a solid square moving clockwise about the tube's center at a distance of two inches in sixteen (16) steps. A useful exercise is to (1) track with no zoom to see the clockwise motion, and (2) increase the default zoom size on subsequent tracking acquires until the object moves too far to continually stay within each scan. The threshold zoom size for this is about times five (5).

E) TRACKING VALUE : this is the pixel value used in the tracking search. It is preset to the value 192.

In simulation the x-ray data is automatically set to values below 128, any trigger value above 128 will uniquely be found since the simulated box is drawn at a value two greater than the trigger value.

F) DATA RANGING : this is used to automatically adjust the image data amplifier so that each subsequent scan uses the entire data value range. The first image is set to times one (x 1.00) with no offset (0.0). At the end of the scans, for amplifier is reset to these values for user convenience.

Simulation mode provides a random narrow range data 'signal' to allow the amplifier to show its operation.

G) HISTOGRAM : this will show the full histogram table based on the last acquired image.

--COMMAND (h)

Average Count : this number sets the number of times the image is averaged before being displayed. Image averaging by default happens in the computer memory (via EMM); only the result is displayed. If there is no memory, a simple weighted average using the image display is employed. An average count of one causes the image data to be displayed directly.

The default is 1 (no averaging).

--COMMAND (i)

Loop Count : this will repeat the selected acquire method a set amount of times. It is useful for (1) setting number of tracking acquires, (2) the number of area updates, and (3) the number of times the data ranging will acquire and enhance the input data. The default minimum value for data ranging and tracking is 4 and 16 steps respectively.

The default is 1 loop.

--COMMAND (j)

Zoom : this sets the default scan zoom size. The first option presets the scan to full size (no zoom). The second allows the user to set a zoom size using the trackball/mouse or the keyboard. The third option displays the current zoom box parameters. This zoom produces am image that has the horizontal and the vertical pixel count equal to the x-ray resolution count, therefore it is constrained to be square. This zoom magnitude is also used by the tracking acquire method.

The default zoom size is times one (no zoom, no offset).

--COMMAND (k)

Edit Zoom Table : The user can (1) add new zooms to the table using the trackball/mouse, (2) reset the table to empty, or "(3) view the zoom table parameters. Zooms produce images that "have the horizontal and the vertical pixel count equal to the x-ray resolution count, therefore all zoom areas are constrained to be square. The minimum zoom size is enforced.

The default table is a sequence of three scans with increasing zoom.

"COMMAND (1)

Edit Area Table : The user can (1) add new update areas to the table using the trackball/mouse, (2) reset the table to empty, or (3) view the area table parameters. Areas can have any horizontal and the vertical pixel count less than the x-ray resolution count, therefore all areas are rectangles. The minimum zoom size is enforced.

The default table is a sequence of three separate areas.

"COMMAND (m)

Histogram : the image data histogram is useful for analyzing the data input range and distribution, and is of course used for the data-ranging acquire method. The user can select (1) no histogram computation (for the fastest images with no time overhead), (2) full histogram (every pixel is sampled), or (3) quick histogram (every fourth pixel is sampled) for a fast histogram approximation (which is the default).

"COMMAND (n)

Aspect Ratio : this sets the aspect ratio of the horizontal pixel spacing relative to the vertical pixel spacing. The default value is one to one (1:1); for standard TV monitors it would be equal to 1.33 to one (4:3). For a vertically upward moving object, the aspect ratio can be used to cancel the effects of motion. The faster the motion the greater the aspect ratio resulting in a properly fore-shortened vertical sweep size.

"COMMAND (o)

Display Destination : by default, each newly acquired image is overlaid on the screen at upper left corner if at 256 display resolution, or the whole screen for 512 display resolution. Alternatively, the user can chose for 256 resolution images each new image to be placed in different corners of the 512 display, allowing simultaneous viewing of consecutive images. This is compatible with all the acquire methods of command 'G'.

"COMMAND (p)

Display Resolution : the visible pixel resolution of the display monitor, and can be 256 or 512 for the provided monitor. Note that on most 512 line 4:3 aspect ratio monitors only the top 480 lines are visible.

"COMMAND (q)

Display Frame : in 256 display resolution, the are four corners or 'frames' in which images can be placed. There is only one 'frame' for 512, that being the whole screen. See also command 'O'.

"COMMAND (r)

Gain : This controls the contrast of the x-ray image data by setting the internal course and fine gain parameters in the image data amplifier. It can be from 0.1 (divide by 10) to 1000.0

"(multiply by 1000) or any value in between. This can be set
"automatically by the data-ranging acquire method. The default
"value is times one (1.0).

"-COMMAND (s)
"    Offset : This controls the brightness of the x-ray image
"data by setting offset parameter in the image data amplifier.
"Increasing the offset increases the brightness. It is expressed
"in percent of the full offset range, and can be from zero percent
"to 100 percent. This can be set automatically by the data-ranging
"acquire method. The default is no brightness compensation (zero
"percent offset).

"-COMMAND (t)
"    Current/Zoom Protection : this parameter controls how the
"maximum allowed high voltage current is limited with increased
"scan zoom. If equal to zero, the zoom has no affect. If equal
"to 1.0, the current will drop to zero as the scan size decreases
"to zero. If equal to 2.0, the current will drop to zero as the
"scan size decreases to one half (zoom equals times 2). This
"maximum current control only takes affect when the user's re-
"quested current exceeds this maximum current for the current
"active zoom size.

"-COMMAND (u)
"    Minimum Zoom : this sets the smallest allowable zoom size,
"used to prevent localized tube overheating.

"-COMMAND (v)
"    Maximum High Voltage : this number can be used to set a
"maximum allowed high voltage that is less than the full range of
"the supply. The user may use this for setting a maximum high
"voltage when doing a lot of highly zoomed imaging.

"-COMMAND (w)
"    Simulation : this feature allows the user to experiment with
"this program in the absence of a working x-ray machine or to test
"the program concepts. There are various levels and types of
"simulation provided. Also provided is a moving target object
"when the tracking acquire method is active.
"    The software defaults to a simulated machine with full range
"x-ray data values with noise added.

"    A) NO SIMULATION : this is when the x-ray machine is fully
"operational. All other modes imply that there is no machine.
"    B) DATA FULL : this will simulate image data covering the
"full 8 bit (0 to 255) range. This is the default mode.
"    C) DATA HALF : this will simulate image data covering the
"lower half of the data range (0 to 127, to leave room for track-
"ing data values for example).
"    D) RANDOM FULL : this will simulate image data at a random
"offset and a random peak-to-peak contrast.
"    E) RANDOM NARROW : this will simulate image data at a
"random offset and a very narrow random peak-to-peak range (useful
"for the data-ranging acquire method).
"    F) NOISE : for both real and simulated machines, the
"program can add a random semi-periodic noise signal to the image
"acquire data to test averaging. The default is for noise on.
"    G) DEBUG : for technical users who wish to view internal
"variables and tables while testing this program. Default is off.

```
"¯COMMAND (x)
"    Acquire : this will commence an acquire session using the ",
"set values and parameters. A key press can be used to interrupt ",
"the acquire process. An information status screen will show the ",
"current progress of the acquire session.                        ",
"                                                                ",
"¯COMMAND (y)                                                    ",
"    Display Claar : this will clear the full display screen to  ",
"black.                                                          ",
"                                                                ",
"¯COMMAND (z)                                                    ",
"    Quit : leave the program and return to DOS.                 ",

".COMMAND (-,-)",
};

/******************************************************************
***                     Implementation                          ***
******************************************************************/ include <stdio.h>
include <stdlib.h>
#include <ctype.h>
#include <string.h>
#include <conio.h>
#include <dos.h>
#include <process.h>
#include <memory.h>
#include <fcntl.h>
#include <math.h>
#include <io.h>
#include <sys\types.h>
include <sys\stat.h> define uint     unsigned int
define uchar    unsigned char
define ulong    unsigned long define FALSE          0
define TRUE           1
#define CR             0x0d
#define ESC            0x1b
#define Mouse_Left     0x00
#define Mouse_Center   0x02
#define Mouse_Right    0x01

/* PC-AT Graphic Characters for the histogram display */
#define HSTDSP_4    0xdb         /* Solid Block */
#define HSTDSP_3    0xb2         /* Dark  block */
#define HSTDSP_2    0xb1         /* Light block */
#define HSTDSP_1    0xb0         /* Faint Block */
#define HSTDSP_0    0x2d         /* Dash, for zero */

/* Ranges for the x-ray hardware components */
#define TUBE_SIZE    8.00        /* 8 inches */
#define DAC_MAX      4095.00     /* 12-bit DAC's */
#define HV_MAX       100.00      /* 100 KV  */
#define CUR_MAX      2.00        /*  2 mA   */
```

```
#define FOC_MAX          10.00                   /* 10 Volts */
#define FIL_MAX          10.00                   /* 10 Volts */

/* AT-I/O word addresses for the x-ray I/O board : interface 47    */
#define XRAY_CLK         0x0380                  /* Divider    59    0 to 4095  */
#define XRAY_HV          0x0382                  /* BUS 100 to 101a    "        */
#define XRAY_FIL         0x0384                  /* BUS 100 to 101b    "        */
#define XRAY_FOC         0x0386                  /* BUS 100 to 101c    "        */
#define XRAY_CUR         0x0388                  /* BUS 100 to 101d    "        */
#define XRAY_XSTEP       0x038a                  /* REG        62      "        */
#define XRAY_XSIZE       0x038c                  /* DAC        66      "        */
#define XRAY_XOFF        0x038e                  /* DAC        69      "        */
#define XRAY_XMAXCNT     0x0390                  /* REG        61a     "        */
#define XRAY_YSTEP       0x0392                  /* DAC        74      "        */
#define XRAY_YSIZE       0x0394                  /* DAC        77      "        */
#define XRAY_YOFF        0x0396                  /* DAC        81      "        */
#define XRAY_YMAXCNT     0x0398                  /* REG        73a     "        */
#define XRAY_SQRTHV      0x039a                  /* BUS        70      "        */
#define XRAY_DATOFF      0x039c                  /* BUS        84      "        */
#define XRAY_DATSIZ      0x039e                  /* BUS        85    0 to 4095  */
#define XRAY_DATMUL      0x03a0                  /* MUX        93    0 to    3  */
#define XRAY_DATA        0x03a2                  /* 8 bit data from ADC 94      */
#define XRAY_STAT        0x03a4                  /* 8 bit status register       */
#define XRAY_RESET       0x03a6                  /* A write resets counters 61,73 */

/* Bit flags from the XRAY_STAT register plus internal error flags */
#define ERR_NONE         0x00                    /* No flags set                */
#define STAT_READY       0x01                    /* Data byte ready  from ADC 94 */
#define ERR_SWEEP        0x02                    /* Sweep failure flag from EDC 133 */
#define ERR_EMPTY        0x40                    /* No areas in zoom/area tbl   */
define ERR_INTR         0x80                    /* user keyboard interrupt     */ define XRAY_ON          0x81                    /* Enable current for x-ray image */
define XRAY_OFF         0x82                    /* Current to zero between acquires */
#define XRAY_STATUS      0x83                    /* Test x-ray status           */
#define XRAY_BOUND       0x84                    /* Enforce bounds on variables */

/* The machine simulation status */
#define SIM_OFF          0x01                    /* Full x-ray machine I/O      */
#define SIM_DATAFULL     0x02                    /* return full   range data ramp */
#define SIM_DATAHALF     0x03                    /* return half   range data ramp */
#define SIM_DATARNDF     0x04                    /* random full   range data ramp */
#define SIM_DATARNDN     0x05                    /* random narrow range data ramp */

/* Type/method of x-ray scanning */
#define ACQMOD_ZOOM      0x01                    /* normal single scan with zoom */
#define ACQMOD_ZMTBL     0x02                    /* use a  zoom table sequence  */
#define ACQMOD_ARATBL    0x03                    /* use an area table sequence  */
#define ACQMOD_TRACK     0x04                    /* track a data value, zoom on found */
define ACQMOD_RANGE     0x05                    /* autogain the (narrow) data range */ define TRK_STEPSIZE     0x06                    /* Tracking sampling step size */

/* PC-VISION-plus I/O registers : Video Display Board 46 */
#define PCONTROL         0x0340                  /* Control : enable, 64K mapping */
#define PCLUTC           0x0341                  /* Color LUT control           */
#define PCLUTA           0x0342                  /* Color LUT address           */
#define PCLUTD           0x0343                  /* Color LUT data              */
#define PCPAN            0x0346                  /* Display pan    register     */
#define PCSCR            0x0347                  /* Display scroll register     */
#define PC_ADDR          0xa0000000L             /* default memory address of display */
```

```c
/* destination on display of acquired images */
#define DSPMOD_CORNER    0x01            /* simultaeous images in corners  */
define DSPMOD_FRAME1    0x02            /* all images placed in frame 1   */ define MEM_ADDR        0xe0000000L      /* default memory address of EMM  */ struct DispRec
{       int     res;                     /* display resolution 256,512.    */
        int     pan;                     /* pan        0 to 511            */
        int     scroll;                  /* scroll     0 to 511            */
        int     frame;                   /* frame      1 to  4             */
        int     maxframe;                /* maximum frames for DSPMOD_CORNER */
        int     hoff;                    /* hort off for area+frame acquire */
        int     voff;                    /* vert off for area+frame acquire */
};

struct XrayRec
{
        int     res;                     /* acquire resolution 256,512     */
        int     clock;                   /* divider value 0 to 7           */
        float   hv;                      /* high voltage  0 to 100.0 KV    */
        float   current;                 /* requested current  0 to 2.0 mA */
        float   max_cur;                 /* max current from zoom protection */
        float   tru_cur;                 /* minimum of above two values    */
        float   filament;                /* filament voltage  0 to 10.0 V  */
        float   focus;                   /* filament voltage  0 to 10.0 V  */
        int     status;                  /* current error status flags     */ int     xstep;                   /* x counter step size  0 to 4095 */
        int     xsize;                   /* x zoom size                    */
        int     xoff ;                   /* x pan                          */
        int     ystep;                   /* y counter step size            */
        int     ysize;                   /* y zoom size                    */
        int     yoff ;                   /* y scroll                       */ int     dataoff;                 /* data DAC offset                */
        int     datasize;                /* data  fine  gain               */
        int     datamul;                 /* data course gain               */ int     xcnt ;                   /* x pixel count   1 to 512       */
        int     ycnt ;                   /* y pixel count   1 to 512       */
        float   gain;                    /* data gain       0.1 to 1000.0  */
        float   offset;                  /* data offset     0% to 100%     */ float   aspect;                  /* aspect ratio    0.5 to 2.0     */
};

struct AcqRec
{       int     mode;                    /* method of acquire              */
        int     dest;                    /* display frame destination      */
        int     loopcnt;                 /* loop - count                   */
        int     avecnt;                  /* average count                  */
        int     trackx;                  /* tracked x location   0 to 4095 */
        int     tracky;                  /* tracked x location   0 to 4095 */
        uchar   trkval;                  /* tracking data value  0 to 255  */
        int     low;                     /* histogram lowest value 0 to 255 */
        int     high;                    /* histogram lowest value 0 to 255 */
        int     hist_step;               /* histogram sample step size     */
};
```

```
struct TblRec
{       int     x1,y1;                          /* an area/zoom upper left  corner   */
        int     x2,y2;                          /* an area/zoom lower right corner   */
};

struct MemRec
{       int     ok;                             /* expanded memory is available      */
        int     emmpage;                        /* page number                       */
        int     emmcnt;                         /* number of pages                   */
        int     emmhandle;                      /* access handle number              */
};

struct SafeRec
{       float   zmcur;                          /* zoom/current scaler               */
        float   minzoom;                        /* minimum zoom size (inches)        */
        float   maxkv;                          /* maximum kv                        */
};

define SIM_NCOUNT 1000 struct SimRec
{       int mode;                               /* level of simulation               */
        int do_noise;                           /* simulate noise flag               */
        int gain[      256];                    /* quick 'gained' data table         */
        int data[      256];                    /* quick source  data table          */
        int noise[SIM_NCOUNT];                  /* quick 'random' noise table        */
        int dptr;                               /* data table pointer                */
        int nptr;                               /* noise table pointer               */
        int dataoff;                            /* random data offset                */
        int datarng;                            /* random data range                 */
};

/*************************************************************
***                 Global Variables                       ***
*************************************************************/ define TBL_MAX 10 static struct DispRec disp;
static struct XrayRec xray;
static struct AcqRec  acq;
static struct MemRec  mem;
static struct TblRec  box,zoom;
static struct SafeRec safe;
static struct SimRec  sim;

static long    hist_tbl[256];                   /* histogram full    table           */
static long    hist_dsp[ 16];                   /* histogram display table           */
static char    hist_str[ 17];                   /* histogram display string          */ static int     zoommax = 3;                     /* count of zooms table              */
static struct TblRec   zoomtbl[TBL_MAX] =
{       { 500, 500,3500,3500},
        { 600, 600,2500,2500},
        { 700, 700,2000,2000}
};
```

```c
static int      areamax = 3;              /* count of areas table          */
static struct TblRec  areatbl[TBL_MAX] =
{       { 512, 768,1600,1500},
        {2560,1530,3500,3000},
        {1024,2200,2070,3500}
};

static int      verbose=FALSE;            /* available user testing flag   */ static void cursor(int h,int v);          /* forward declaration of functions */
static char getcmnd(void);
static int mouse_key(void);
static void mouse_move(int *xoff,int *yoff);
static uchar *disp_point(int pixh,int pixv);

/***********************************************************
 ***              Help Menu                              ***
 ***********************************************************/ char hlpstr[] =
"========= Help ==================================================";

static void help(char topic)
{       char helpstr[40];
        int ptr,repeat,found,line;
        printf("\n%s\n",hlpstr);
        ptr = 0;
        line = 1;
        sprintf(helpstr,".COMMAND (%c)",topic);

/* Find Topic Section */
        do      {repeat = TRUE;
                if (help_tbl[ptr]==NULL)
                        {repeat = FALSE;
                         found  = FALSE;
                        }
                   else if (strncmp(help_tbl[ptr],helpstr,11)==0)
                        {repeat = FALSE;
                         found  = TRUE;
                        }
                ptr++;
                } while (repeat);

/* Display Topic Section */
        if (found) while (strncmp(help_tbl[ptr],".COMMAND",8)!=0)
                {printf(" %-10s\n",help_tbl[ptr++]);
                 line++;
                 if (line >= 20)
                        {printf("...More...");  getch(); printf("\r");
                         line = 1;
                        }
                }
            else printf("Subject <%c> Not Found\n",topic);

printf("%s\n",hlpstr);
        printf("Press any key "); getcmnd();
        printf("\n");
}
```

```
/***************************************************************
***                  Simulation Routines                      ***
***                                                           ***
***     These routines will simulate x-ray data.  Look        ***
***     up data tables are generated prior to each            ***
***     acquire session for fast data values, scaled          ***
***     appropriately.  Also, a clockwise moving              ***
***     box on the tube face is simulated for tracking.       ***
***                                                           ***
***************************************************************/

/* init a random noise table */
static void sim_init(void)
{       int i,val;

sim.dptr = 0;
        sim.nptr = 0;
        srand(1);
        for (i=0;i<SIM_NCOUNT;i++)
                {val = rand() % 256;
                 sim.noise[i] = (val-128) / 16;
                 }
}

/* reset data look up table ramp */
static void sim_datareset(void)
{       int    i,d;
        float value;

/* setup x-ray input data table */
        for (i=0,d=0;i<256;i++)
            {sim.data[i] = sim.dataoff + d;
             if (++d > sim.datarng) d = 0;
             }

/* setup data amplifier lookup table */
        for (i=0;i<256;i++)
                {value = ((float) i) - (xray.offset * (255.0/100.0));
                 value = value * xray.gain;

if (value <   0.0) value=  0.0;
                 if (value > 255.0) value=255.0;
                 sim.gain[i] = (uchar) value;
                 } if (verbose)
                {cursor(1,1);
                 printf("======== Data Amplifier Table ===================\n");
                 for (i=0;i<256;i++)
                        {if ((i % 16)==0) printf("   \n%2x) ",i);
                         printf("%2x ",sim.gain[i]);
                         }
                 printf("\n  X-ray Simulated Data ramp is %d to %d\n",
                         sim.dataoff,sim.datarng);

printf("Press any key "); getcmnd();
                 printf("\n");
                 }
}
```

```c
/* reset tables for new acquire session */
static void sim_reset(void)
{       int     i,d;

sim.dptr=0;

if (sim.mode==SIM_DATAFULL)
                {sim.dataoff =   0;
                 sim.datarng = 255;
                 sim_datareset();
                }
           else if (sim.mode==SIM_DATAHALF)
                {sim.dataoff =   0;
                 sim.datarng = 127;
                 sim_datareset();
                }
           else if ((sim.mode==SIM_DATARNDF) || (sim.mode==SIM_DATARNDN))
                {
                 sim.dataoff = rand() % 256;
                 sim.datarng = rand() % 256;

if (sim.mode==SIM_DATARNDN) sim.datarng /= 16;
                 if (sim.datarng < 4) sim.datarng = 4;
                 if ((sim.dataoff + sim.datarng) > 255)
                        sim.dataoff = 255 - sim.datarng;

sim_datareset();
                }

} static int simtrk_tbl[] =
{       /* x,y */
        2048,1024,      /* (4.00",2.00") = 12:00 O'Clock */
        2440,1102,      /*               = 12:45 O'Clock */
        2772,1324,      /*               =  1:30 O'Clock */
        2994,1656,      /*               =  2:15 O'Clock */
        3072,2048,      /* (6.00",4.00") =  3:00 O'Clock */
        2994,2440,      /*               =  3:45 O'Clock */
        2772,2772,      /*               =  4:30 O'Clock */
        2440,2994,      /*               =  5:15 O'Clock */
        2048,3072,      /* (4.00",6.00") =  6:00 O'Clock */
        1656,2994,      /*               =  6:45 O'Clock */
        1324,2722,      /*               =  7:30 O'Clock */
        1102,2440,      /*               =  8:15 O'Clock */
        1024,2048,      /* (2.00",4.00") =  9:00 O'Clock */
        1102,1656,      /*               =  9:45 O'Clock */
        1324,1324,      /*               = 10:30 O'Clock */
        1656,1102,      /*               = 11:15 O'Clock */
};

/* Simulate a moving block, place at relative display location, based */
/* on the current zoom and pan (block may end up off screen)          */
static void sim_track(int loopcnt)
{       long    simh,simv,h,v;
        float   simx,simy;
        char    *pixptr;

loopcnt = loopcnt % 16;

simx  = (float) simtrk_tbl[(loopcnt*2)   ];
```

```
            simx -= (float) xray.xoff;
            simx *= ((float) xray.xcnt) / ((float) xray.xsize);
            simh = (long) simx;

simy =  (float) simtrk_tbl[(loopcnt*2)+1];
            simy -= (float) xray.yoff;
            simy *= ((float) xray.ycnt) / ((float) xray.ysize);
            simv = (long) simy;

if ((simh >= xray.res) || (simh <= -16) ||
                (simv >= xray.res) || (simv <= -16)  ) return;

if (simh < 0) simh=0; if (simv < 0) simv=0;
            for (v=simv;v<(simv+16);v++)
                for (h=simh;h<(simh+16);h++)
                    {pixptr = disp_point(h+disp.hoff,v+disp.voff);
                     *pixptr = acq.trkval + 0x02;
                    }
}

/************************************************************
 ***                    Subroutines                       ***
 ************************************************************/ static void swap(int *a,int *b)
{       int tmp;
        tmp = *a; *a = *b; *b = tmp;
} uint float2hex(float val, float valmax)
{       return( (uint) ((val / valmax) * 256.0) );
} static char getcmnd(void)
{       char cmnd;

printf(" => ");
        if (mouse_key()) cmnd = CR;
                else cmnd = (char) getche();
        printf("\n");

cmnd = tolower(cmnd);
        return(cmnd);
}

/* standard PC-BIOS call to set cursor co-ordinates */
static void cursor(int h,int v)
{       union REGS inregs, outregs;

inregs.h.ah = 0x02;
        inregs.h.dh = (unsigned char) (v-1);
        inregs.h.dl = (unsigned char) (h-1);
        inregs.h.bh = (unsigned char)    0;
        int86(0x10,&inregs,&outregs);
} static char aclk[]=
"1/16_ 1/8_ 1/4_ 1/2_ 1.0_ 2.0_ 4.0_ 8.0_16.0_32.0_64.0_ 128_ 256_ 512_1024_";
```

```c
/* return scan speed based on clock divider and acquire resolution */
static char *spd2str(int clock)
{       int     i,idx;

idx=(clock & 0x07);
        switch (xray.res)
            {case 256  : idx+=0; break;
             case 512  : idx+=2; break;
             } idx *= 5;
        aclk[idx+4] = '\0';
        return(&aclk[idx]);
} static float hex2inch(int hexval)
{       float ret;

ret = ((float) hexval) * (TUBE_SIZE/4095.0);
        return(ret);
} static float hex2zoom(int hexval)
{       float ret;

ret = ((float) hexval) * (TUBE_SIZE/4095.0);
        if (ret>0.0) ret = TUBE_SIZE / ret;
            else ret = 0.0;

return(ret);
}

/***********************************************************
 ***                Setup Memory                         ***
 ***                                                     ***
 *** These routines access standard LIM 3.2 expanded     ***
 *** memory, if present.  The mem_point routine          ***
 *** provides easy program access.  The memory is        ***
 *** released at the programs end.                       ***
 ***                                                     ***
 ***********************************************************/

/* access EMM driver, request EMM memory and handle */
static void mem_init(void)
{       int     fd;
        union REGS   inregs, outregs;

mem.ok = FALSE;

fd=open("EMMXXXX0",O_RDONLY);
        if (fd == -1)
            {printf("EMM Driver Missing <%x> \a",errno);
             return;
             } else close(fd);

inregs.h.ah = 0x40;
        int86(0x67,&inregs,&outregs);
        if (outregs.h.ah != 0x00)
            {printf("EMM Hardware Missing <%x> \a",outregs.h.ah & 0xff);
             return;
             }
```

```c
        inregs.h.ah = 0x41;
        int86(0x67,&inregs,&outregs);
        if (outregs.h.ah != 0x00)
            {printf("EMM Seg Get Error<%x> \a\n",outregs.h.ah & 0xff);
            return;
            } else mem.emmpage=outregs.x.bx;

inregs.h.ah = 0x42;
        int86(0x67,&inregs,&outregs);
        mem.emmcnt = outregs.x.bx;

inregs.h.ah = 0x43;
        inregs.x.bx = 0x20;   /* 16 pages = 256K = 512 x 512 x 2 */
        int86(0x67,&inregs,&outregs);
        if (outregs.h.ah != 0x00)
                {printf("EMM Pages Used Up \a\n");
                return;
                } mem.emmhandle = outregs.x.dx;
        mem.ok        = TRUE;
}

/* resturn EMM memory to computer */
static void mem_uninit(void)
{       union REGS   inregs, outregs;

inregs.h.ah = 0x45;
        inregs.x.dx = mem.emmhandle;
        int86(0x67,&inregs,&outregs);
        if (outregs.h.ah != 0x00)
            {printf("EMM De-Allocation Error<%x> \a",outregs.h.ah & 0xff);
            }
}
/* return pointer to the mapped EMM memory at image address h,v */
uint *mem_point(int h,int v)
{       long  offset;
        uint  mempag_16k,*memptr;
        union REGS   inregs, outregs;

offset = (((long) v) <<  9) + ((long) h);
        offset *= 2L;

mempag_16k = (unsigned int) (offset >> 14);
        offset     = offset & 0x03fffL;

inregs.h.ah = 0x44;
        inregs.h.al =    0;
        inregs.x.bx = (unsigned char) mempag_16k;
        inregs.x.dx = mem.emmhandle;
        int86(0x67,&inregs,&outregs);
        if (outregs.h.ah != 0x00)
                {printf("EMM Couldn't read Page @<%x>:<%x> \a\n",
                        mempag_16k,outregs.h.ah & 0xff);
                } memptr = (uint *) (offset + MEM_ADDR);
        return(memptr);
}
```

```
/***********************************************************
 ***              Mouse/Trackball                        ***
 ***                                                     ***
 *** This routine communicates with a standard mouse     ***
 *** driver via INT 33.  The mouse's x/y movements       ***
 *** are reported to the rest of the program.            ***
 ***                                                     ***
 ***********************************************************/ define mse_x   0x40
define mse_y   0x40 static void track_init(void)
{       int x,y;
        union REGS  inregs, outregs;

/* First Test */
        inregs.x.ax=0x00; int86(0x33,&inregs,&outregs);
        /* Second test */
        if (outregs.x.ax==0x00)
                {system("mouse");
                inregs.x.ax=0x00;
                int86(0x33,&inregs,&outregs);
                } if (outregs.x.ax==0x00)
                {printf("Trackball not found\n");
                }
            else {
                inregs.x.ax=0x07;      inregs.x.cx=0x00;
                inregs.x.dx=mse_x*2;   int86(0x33,&inregs,&outregs);

inregs.x.ax=0x08;      inregs.x.cx=0x00;
                inregs.x.dx=mse_y*2;   int86(0x33,&inregs,&outregs);

inregs.x.ax=15  ;      inregs.x.cx=0x01;
                inregs.x.dx=0x01;      int86(0x33,&inregs,&outregs);

inregs.x.ax=11;        int86(0x33,&inregs,&outregs);
                mouse_move(&x,&y);
                }

}

/* return mouse x,y movements */
static void mouse_move(int *xoff,int *yoff)
{       union    REGS inregs,outregs;

inregs.x.ax=11;
        int86(0x33,&inregs,&outregs);
        *xoff = outregs.x.cx; *yoff = outregs.x.dx;

}

/* return status of left mouse key */
static int mouse_key(void)
{       int   down_cnt;
        union REGS inregs,outregs;
```

```
        inregs.x.ax=0x05;
        inregs.x.bx= Mouse_Left;
        int86(0x33,&inregs,&outregs);
        down_cnt = outregs.x.bx;

return(down_cnt != 0);
}
```

```
/***********************************************************
***                  Setup Display                       ***
***                                                      ***
***   This section interacts with the installed          ***
***   video display board. It is responcible             ***
***   for the display's (1) initialization, (2) the      ***
***   display frame buffers pan, scroll, and zoom        ***
***   if used, and (3) managing the memory mapped        ***
***   display buffer. If another controller is           ***
***   used, this is the only section that need be        ***
***   changed.                                           ***
***                                                      ***
***********************************************************/

/* computer offset, max frame for given resolution and frame number */
static void disp_offset(int frame,int res)
{
        if (res == 512)
                {disp.maxframe =   1;
                 disp.hoff     =   0;
                 disp.voff     =   0;
                }
            else if (res==256) switch (disp.frame)
                {case 1 : disp.maxframe =   4;
                          disp.hoff     =   0;
                          disp.voff     =   0;
                          break;
                 case 2 : disp.maxframe =   4;
                          disp.hoff     = 256;
                          disp.voff     =   0;
                          break;
                 case 3 : disp.maxframe =   4;
                          disp.hoff     =   0;
                          disp.voff     = 256;
                          break;
                 case 4 : disp.maxframe =   4;
                          disp.hoff     = 256;
                          disp.voff     = 256;
                          break;
                }

}

/* update display controller with current values */
static void disp_setup(void)
{       int pan,scroll,con;

disp_offset(disp.frame,disp.res);
        disp.pan       =   disp.hoff;
        disp.scroll    =   disp.voff;
```

```c
        /*** set Resolution ***/
        switch (disp.res)
            {case 256 : con = inp(PCONTROL) & 0xfe;
                        outp(PCONTROL + 0,con+0x01);
                        break;
             case 512 : con = inp(PCONTROL) & 0xfe;
                        outp(PCONTROL + 0,con+0x00);
                        break;
            }

/*** set Pan & Scroll ***/
        pan    = disp.pan/8;
        scroll = disp.scroll/2;
        outp(PCPAN,pan);
        outp(PCSCR,scroll);
} void disp_init(void)
{       int clrlut,camlut,i;

outp(PCONTROL + 0,0x16);          /* enable, map 64K page 0  */
        outp(PCONTROL + 1,0x00);          /* LUT table 0             */
        outp(PCONTROL + 4,0x00);          /* no camera               */
        outp(PCONTROL + 5,0x00);          /* no camera               */
        outp(PCONTROL + 6,0x00);          /* pan = 0                 */
        outp(PCONTROL + 7,0x00);          /* scroll = 0              */
        outp(PCONTROL + 8,0x40);          /* X-data mode ,no masking */
        outp(PCONTROL + 9,0x00);          /* no pixel masking        */
        outp(PCONTROL +10,0x00);          /* no pixel masking        */ for (clrlut=3;clrlut>=0;clrlut--)        /* set color LUTs to grey */
            for (camlut=7;camlut>=0;camlut--)   / camera LUT init /
               {outp(PCLUTC,(camlut<<5)+(camlut<<2)+clrlut);
                for (i=0;i<256;i++)
                     {outp(PCLUTA,i);
                      outp(PCLUTD,i);
                     }
               }
        outp(PCLUTC,0x00);

disp.res      =       512;
        disp.frame    =       0;
        disp.maxframe =       1;
        disp_setup();
}

/* return pointer to the mapped display memory at image address h,v */
static uchar *disp_point(int pixh,int pixv)
{       int  con,page,h,v;
        long pptr;
        char *pixptr;

con  = inp(PCONTROL) & 0x1f;
        page = pixv / 128;
        outp(PCONTROL,(page << 5) | con);
        pptr = (((long)(pixv & 0x7f)) << 9) + (long)(pixh & 0x1ff);
        pixptr = (char *) (pptr + PC_ADDR);

return(pixptr);
}

/* clear display screen to black */
```

```c
static void disp_clear(void)
{       int   v;
        char *pixptr;

for (v=0;v<512;v++)
                {pixptr = disp_point(0,v);
                memset(pixptr,0x00,512);
                }
}

/************************************************************
 ***                   Setup Areas                        ***
 ***                                                      ***
 ***   These routines are used to enter and display       ***
 ***   area/zoom boxes.  They use the current             ***
 ***   resolution of the display to scale up to the       ***
 ***   tube co-ordinates.  A mouse is ideally used        ***
 ***   to select the box corners.                         ***
 ***                                                      ***
 ************************************************************/

/* Draw a vertical or horizontal line by inverting pixels */
static void disp_line(int h1,int v1,int h2,int v2)
{       int  h,v;
        long hlong,vlong,nlong,dlong;
        char *pixptr;

if (v1==v2)
                {if (h1>h2) swap(&h1,&h2);
                for (h=h1;h<h2;h++)
                        {pixptr = disp_point(h,v1);
                        *pixptr++ ^= 0x80;
                        }
                }
        else {if (v1>v2) swap(&v1,&v2);
                for (v=v1;v<v2;v++)
                        {pixptr = disp_point(h1,v);
                        *pixptr++ ^= 0x80;
                        }
                }
}

/* Draw a box */
static void disp_box(int x1,int y1,int x2,int y2)
{       disp_line(x1,y1,x1  ,y2-1);
        disp_line(x1,y2,x2-1,y2  );
        disp_line(x2,y2,x2  ,y1+1);
        disp_line(x2,y1,x1+1,y1  );
}

/* Draw a cross for the display cursor */
static void disp_cross(int x,int y)

{       disp_line(x-8,y  ,x+8,y  );
        disp_line(x  ,y-8,x  ,y+8);
}

/* enforce box limits for onscreen, minimum sizes, squareness */
static void check_box(int do_box,int is_square,int minsize)
{       int  hsize,vsize,zsize,dispmax;
```

```c
        if (do_box) dispmax = disp.res-minsize;
             else dispmax = disp.res-       1;

if         (box.x2< box.x1) box.x2=box.x1;
           else if (box.x2>dispmax) box.x2=dispmax;
        if         (box.y2< box.y1) box.y2=box.y1;
           else if (box.y2>dispmax) box.y2=dispmax;

if (do_box && is_square)
              {hsize  = abs(box.x2-box.x1);
               vsize  = abs(box.y2-box.y1);
               zsize  = min(hsize,vsize);
               if (zsize<minsize) zsize = minsize;
               box.x2 = box.x1 + zsize;
               box.y2 = box.y1 + zsize;
               }
        if (do_box && !is_square)
              {hsize  = abs(box.x2-box.x1);
               vsize  = abs(box.y2-box.y1);
               if (hsize<minsize) box.x2 = box.x1 + minsize;
               if (vsize<minsize) box.y2 = box.y1 + minsize;
               }
}

/* Move the display cursor, 'rubber band' any selecting box */
static char scan_box(int do_box,int is_square,int minsize)
{      int  xoff,yoff,scale,i;
       char cmnd;

check_box(do_box,is_square,minsize);
       scale = 4096 / disp.res;

disp_cross(box.x2,box.y2);
       if (do_box) disp_box(box.x1,box.y1,box.x2,box.y2);

do     {mouse_move(&xoff,&yoff);
               if (mouse_key())      cmnd = CR;
                  else if (kbhit())  cmnd = (char) getch();
                  else               cmnd = '\0';

switch (cmnd)
                     {case 'u' : yoff = -10;   cmnd = '\0';
                                 if (is_square) xoff = -10;
                                 break;
                      case 'd' : yoff =  10;   cmnd = '\0';
                                 if (is_square) xoff =  10;
                                 break;
                      case 'l' : xoff = -10;   cmnd = '\0';
                                 if (is_square) yoff = -10;
                                 break;
                      case 'r' : xoff =  10;   cmnd = '\0';
                                 if (is_square) yoff =  10;
                                 break;
                      } if (xoff!=0 || yoff!=0)
                     {disp_cross(box.x2,box.y2);
                      if (do_box) disp_box(box.x1,box.y1,box.x2,box.y2);
```

```
                    box.x2 += xoff;
                    box.y2 += yoff;
                    check_box(do_box,is_square,minsize);

if (do_box) disp_box(box.x1,box.y1,box.x2,box.y2);
                    disp_cross(box.x2,box.y2);
                    } printf(" (%6.2f\",%6.2f\")",hex2inch(box.x2 * scale),
                                        hex2inch(box.y2 * scale));
            if (do_box)
                    {printf(" = x%6.2f",hex2zoom((box.x2-box.x1) * scale));
                    for (i=0;i<10;i++) printf("\b");
                    }
            for (i=0;i<18;i++) printf("\b");

} while (cmnd=='\0');

disp_cross(box.x2,box.y2);
    if (do_box) disp_box(box.x1,box.y1,box.x2,box.y2);

return(cmnd);
} define Box_TL 0x01             /* Selecting box's Top    Left  */
define Box_BR 0x02             /* Selecting box's Bottom Right */

/* Select the box (for area/zoom) corners */
static int select_box(int is_square)
{       int     ret,mode,repeat,scale,minsize;
        char    cmnd;

mode       = Box_TL;
        repeat     = TRUE;
        scale      = 4096 / disp.res;
        minsize    = ((int) (safe.minzoom * (4095.0/TUBE_SIZE))) / scale;
        box.x1 = 0x00; box.y1 = 0x00;
        box.x2 = 0x40; box.y2 = 0x40;

printf("\n\n=================================================\n");
        printf(" Use mouse or keyboard keys to move display cursor, \n");
        printf(" and the return key or left mouse key to select the \n");
        printf(" the location.\n");
        printf("    <U> : Up       <D> : Down     <Return> Select\n");
        printf("    <L> : Left     <R> : Right    (or left mouse)\n");
        printf("    <Q> : Quit                                  \n");

printf("\n-Select Upper Left Corner");

do      {cmnd = scan_box((mode==Box_BR),is_square,minsize);

if (cmnd=='x')
                        {ret    = FALSE;
                         repeat = FALSE;
                        }
                else if (cmnd==CR) switch (mode)
                        {case Box_TL : box.x1=box.x2; box.y1=box.y2;
                                       mode     = Box_BR;
                                       disp_cross(box.x1,box.y1);
                                       box.x2   += 0x10;
```

```
                            box.y2    += 0x10;
                            printf("\n-Select Bottom Right Corner");
                            break;
             case Box_BR : disp_cross(box.x1,box.y1);
                            mode     = 0x00;
                            if (box.x2 < box.x1)
                                swap(&(box.x1),&(box.x2));
                            if (box.y2 < box.y1)
                                swap(&(box.y1),&(box.y2));
                            repeat   = FALSE;
                            ret      = TRUE;
                            break;
             }
        } while (repeat);

if (mode==Box_BR) disp_cross(box.x1,box.y1);

printf("\n");

scale = 4096 / disp.res;
    box.x1 *= scale;
    box.y1 *= scale;
    box.x2 *= scale;
    box.y2 *= scale;

return(ret);
}

/*************************************************************
 ***                                                       ***
 ***           Menus - Zoom Tables                         ***
 ***                                                       ***
 ***   These routines use the above box routines to        ***
 ***   maintain the zoom, zoom table, and area table.      ***
 ***       select 0 : the standard zoom box                ***
 ***       select 1 : the table of zooms                   ***
 ***       select 2 : the table of areas                   ***
 ***                                                       ***
 *************************************************************/

/* Display the zoom/area table(s) values (in inches) */
static void dsp_table(int select)
{       int   tblnum;

if (select==0)
           {printf("        :   x1      y1      x2      y2 \n");
            printf("------------------------------------------\n");
            printf(" Zoom : (%4.2f\",%4.2f\",%4.2f\",%4.2f\")\n",
                hex2inch(zoom.x1),
                hex2inch(zoom.y1),
                hex2inch(zoom.x2),
                hex2inch(zoom.y2)
                );
            printf("\n");
           } if (select==1)
           {printf(" Zoom :   x1      y1      x2      y2 \n");
            printf("------------------------------------------\n");

for (tblnum=0;tblnum<zoommax;tblnum++)
                printf(" [%2d] : (%4.2f\",%4.2f\",%4.2f\",%4.2f\")\n",
                    tblnum+1,
```

```
                        hex2inch(zoomtbl[tblnum].x1),
                        hex2inch(zoomtbl[tblnum].y1),
                        hex2inch(zoomtbl[tblnum].x2),
                        hex2inch(zoomtbl[tblnum].y2)
                        );
            printf("\nThere are %d table entries\n\n",zoommax);
            } if (select==2)
            {printf(" Area :    x1     y1     x2     y2 \n");
            printf("-------------------------------------\n");
            for (tblnum=0;tblnum<areamax;tblnum++)
                    printf(" [%2d] : (%4.2f\",%4.2f\",%4.2f\",%4.2f\")\n",
                        tblnum+1,
                        hex2inch(areatbl[tblnum].x1),
                        hex2inch(areatbl[tblnum].y1),
                        hex2inch(areatbl[tblnum].x2),
                        hex2inch(areatbl[tblnum].y2)
                        );
            printf("\nThere are %d table entries\n\n",areamax);
            }

}

/* show on display the zoom/area tables graphically */
static void grph_table(int select)
{       int tblnum,scale;

scale = 4096 / disp.res;

if (select == 0)
            disp_box(zoom.x1 / scale,zoom.y1 / scale,
                     zoom.x2 / scale,zoom.y2 / scale );

if (select == 1) for (tblnum=0;tblnum<zoommax;tblnum++)
            disp_box(zoomtbl[tblnum].x1 / scale,
                     zoomtbl[tblnum].y1 / scale,
                     zoomtbl[tblnum].x2 / scale,
                     zoomtbl[tblnum].y2 / scale );

if (select == 2) for (tblnum=0;tblnum<areamax;tblnum++)
            disp_box(areatbl[tblnum].x1 / scale,
                     areatbl[tblnum].y1 / scale,
                     areatbl[tblnum].x2 / scale,
                     areatbl[tblnum].y2 / scale );

}

/* manage a zoom/area table, zooms are forced square */
static void menu_table(int mode)
{       int  repeat;
        char cmnd,str[40];

repeat = TRUE;

grph_table(mode);
        do      {
                printf("\n=== %s Menu ================================\n"
                        ,(mode == 1) ? "Zoom":"Area");
```

```
                printf("<A>dd    to Table : Add new zoom box to List      \n");
                printf("<D>isplay Table : Display zoom table in inches\n");
                printf("<C>ear    Table : Clear the zoom table           \n");
                printf("<?>       Help  : Basic Help Information         \n");
                printf("<Q>uit          : Return to main menu            \n");
                cmnd = getcmnd();

switch (cmnd)
                    {
                    case 'a' : if ((mode==1) && ((zoommax+1) >= TBL_MAX))
                                       break;

if ((mode==2) && ((areamax+1) >= TBL_MAX))
                                       break;

if (select_box(mode==1))
                                       {grph_table(mode);
                                        if (mode == 1)
                                               {zoomtbl[zoommax].x1 = box.x1;
                                                zoomtbl[zoommax].y1 = box.y1;
                                                zoomtbl[zoommax].x2 = box.x2;
                                                zoomtbl[zoommax].y2 = box.y2;
                                                zoommax++;
                                                }
                                        else {areatbl[areamax].x1 = box.x1;
                                              areatbl[areamax].y1 = box.y1;
                                              areatbl[areamax].x2 = box.x2;
                                              areatbl[areamax].y2 = box.y2;
                                              areamax++;
                                              }
                                        grph_table(mode);
                                        }
                               break;
                    case 'd' : dsp_table(mode);
                               break;
                    case 'c' : grph_table(mode);
                               if (mode==1) zoommax = 0;
                                       else areamax = 0;
                               break;
                    case '?' : help( (mode==1) ? 'k':'l'); break;
                    case 'q' : repeat = FALSE; break;
                    }
                } while (repeat);

grph_table(mode);
} static void table_init()
{
        zoom.x1 =    0;
        zoom.y1 =    0;
        zoom.x2 = 4095;
        zoom.y2 = 4095;

}

/************************************************************
***                   Setup X-ray                         ***
***                                                       ***
*** These routines do the communication to the x-ray     ***
```

```
        *** I/O board if present.  They also enforce limits  ***
        *** and protections, report x-ray status.             ***
        ***    The x-ray machine leaves the HV current at     ***
        *** zero between acquire sessions for safety.         ***

***                                                             ***
******************************************************/

/* output current settings to x-ray machine */
static void xray_setup(void)
{       float hsize,vsize,gain;

/* enforce current limiting with zoom */
        xray.max_cur = (4095.0 - ((float) xray.xsize)) / 4095.0;
        xray.max_cur = CUR_MAX * xray.max_cur;
        xray.max_cur = CUR_MAX - (xray.max_cur * safe.zmcur);
        if         (xray.max_cur <     0.0) xray.max_cur =     0.0;
           else if (xray.max_cur > CUR_MAX) xray.max_cur = CUR_MAX;
        xray.tru_cur = min(float2hex(xray.max_cur ,CUR_MAX),
                           float2hex(xray.current ,CUR_MAX));

/* enforce aspect ratio */
        hsize = (float) xray.xsize;
        vsize = hsize / xray.aspect;
        xray.ysize = (uint) hsize;

/* calulate digital settings from user gain/offset */
        if         (xray.gain<  1.0) {xray.datamul=0x00;gain=xray.gain        ;}
          else if  (xray.gain< 10.0) {xray.datamul=0x01;gain=xray.gain/  10.0;}
          else if  (xray.gain<100.0) {xray.datamul=0x02;gain=xray.gain/ 100.0;}
          else                       {xray.datamul=0x03;gain=xray.gain/1000.0;}
        xray.datasize = (uint) (gain         * 4095.0);
        xray.dataoff  = (uint) (xray.offset * (4095.0/100.0));

/* no outputs if simulation is on */
        if (sim.mode!=SIM_OFF)
              {xray.status = 0x00;
               return;
               } outpw(XRAY_CLK     ,xray.clock      );
        outpw(XRAY_HV      ,float2hex(xray.hv       ,HV_MAX));
        outpw(XRAY_FIL     ,float2hex(xray.filament,FIL_MAX));
        outpw(XRAY_FOC     ,float2hex(xray.focus    ,FOC_MAX));
        outpw(XRAY_CUR     ,0x00            );
        outpw(XRAY_SQRTHV  ,float2hex(sqrt(xray.hv),HV_MAX));

outpw(XRAY_XSTEP   ,xray.xstep      );
        outpw(XRAY_XSIZE   ,xray.xsize      );
        outpw(XRAY_XOFF    ,xray.xoff       );
        outpw(XRAY_XMAXCNT,(xray.xcnt-1)*xray.xstep);

outpw(XRAY_YSTEP   ,xray.ystep      );
        outpw(XRAY_YSIZE   ,xray.ysize      );
        outpw(XRAY_YOFF    ,xray.yoff       );
        outpw(XRAY_YMAXCNT,(xray.ycnt-1)*xray.ystep);
        outpw(XRAY_DATOFF  ,xray.dataoff   );
        outpw(XRAY_DATSIZ  ,xray.datasize);
        outpw(XRAY_DATMUL  ,xray.datamul   );

xray.status = inpw(XRAY_STAT);
```

```
/* x-ray countrol service routines */
static int xray_cmnd(int cmnd)
{   int ret;

ret = 0x00;

switch (cmnd)
        {case XRAY_RESET : /* new acquire session, reset counters/simulation */
                           acq.trackx = 0;
                           acq.tracky = 0;
                           sim_reset();
                           if (sim.mode==SIM_OFF) outp(XRAY_RESET,0x00);
                           break;
         case XRAY_ON    : /* turn on current */
                           if (sim.mode==SIM_OFF) outpw(XRAY_CUR,
                                   float2hex(xray.tru_cur ,CUR_MAX));
                           break;
         case XRAY_OFF   : /* turn off current */
                           if (sim.mode==SIM_OFF) outpw(XRAY_CUR,0x00);
                           break;
         case XRAY_BOUND : /* enforce zoom/amplifier boundaries */
                           if (xray.xoff < 0) xray.xoff = 0;
                           if ((xray.xoff+xray.xsize)>4096)
                               xray.xoff = 4096 - xray.xsize;
                           if (xray.yoff < 0) xray.yoff = 0;
                           if ((xray.yoff+xray.ysize)>4096)
                               xray.yoff = 4096 - xray.ysize;

if (xray.gain   <    0.1) xray.gain   =    0.1;
                           if (xray.gain   > 1000.0) xray.gain   = 1000.0;
                           if (xray.offset <    0.0) xray.offset =    0.0;
                           if (xray.offset >  100.0) xray.offset =  100.0;
                           break;
         case XRAY_STATUS: /* request machine status */
                           if (sim.mode==SIM_OFF)
                                   xray.status = inp(XRAY_STAT);
                              else xray.status = 0x00;

if (kbhit()) {getch(); xray.status |= ERR_INTR;}
                           ret = xray.status;
                           break;
        } return(ret);
}

/* set x-ray register values with new zoom settings */
static void xray_zoom(int xoff,int yoff,int xsiz,int ysiz,int xcnt,int ycnt)
{
        xray.xstep      = 4096/xray.res;
        xray.xsize      = xsiz;
        xray.xoff       = xoff;
        xray.xcnt       = xcnt;

xray.ystep      = 4096/xray.res;
        xray.ysize      = ysiz;
        xray.yoff       = yoff;
        xray.ycnt       = ycnt;
```

```
            xray_cmnd(XRAY_BOUND);
            xray_setup();
} static void xray_init()
{
        xray.res        =   256;
        xray.clock      = 0x04;
        xray.hv         =   0.0;
        xray.current    =   0.0;
        xray.filament   =   0.0;
        xray.focus      =   0.0;
        xray.max_cur    =   0.0;
        xray.tru_cur    =   0.0;
        xray.status     = 0x00;

xray.xstep      =    16;
        xray.xsize      =  4095;
        xray.xoff       =     0;
        xray.xcnt       =   256;

xray.ystep      =    16;
        xray.ysize      =  4095;
        xray.yoff       =     0;
        xray.ycnt       =   256;

xray.dataoff    = 0x00;
        xray.datasize   = 0xff;
        xray.datamul    = 0x00;

xray.aspect     =  1.00;
        xray.gain       =  1.00;
        xray.offset     =  0.00;

acq.mode        =   ACQMOD_ZOOM;
        acq.loopcnt     =         3;
        acq.avecnt      =         1;
        acq.trkval      =      0xc0;
        acq.trackx      =         0;
        acq.tracky      =         0;
        acq.hist_step   =         4;
        acq.dest        = DSPMOD_FRAME1;

sim.mode        =  SIM_DATAFULL;
        sim.do_noise    =      TRUE;
        safe.zmcur      =       0.0;
        safe.minzoom    =       1.0;
        safe.maxkv      =    HV_MAX;

xray_setup();
}

/***********************************************************
 ***                                                     ***
 ***              Acquire DATA                           ***
 ***                                                     ***
 ***                                                     ***
 ***   Acquire data values from x-ray machine.  The      ***
 ***   data is simluated if requested, noise added       ***
 ***   if desired.  If no EMM memory is present,         ***
 ***   a simple display buffer averaging is substi-      ***
 ***   tuted.                                            ***
 ***                                                     ***
 ***********************************************************/
```

```c
/* read or simulated data values, add noise, enforce range limits */
uchar acquire_pixel()
{       int   pixel;

if (sim.mode==SIM_OFF)
            {while ((inp(XRAY_STATUS) & STAT_READY) == 0x00) /* wait */;
             pixel = inp(XRAY_DATA) & 0x0ff;

if (sim.do_noise)
                {pixel += sim.noise[sim.nptr++];
                 if (pixel <   0) pixel= 0;
                 if (pixel > 255) pixel=255;
                 if (sim.nptr >= SIM_NCOUNT) sim.nptr  = 0;
                 }
             }
        else {pixel = sim.data[sim.dptr++];
              if (sim.do_noise) pixel += sim.noise[sim.nptr++];

if (pixel <   0) pixel= 0;
              if (pixel > 255) pixel=255;

pixel = sim.gain[pixel];

if (sim.dptr >=        256) sim.dptr = 0;
              if (sim.nptr >= SIM_NCOUNT) sim.nptr = 0;
              }
                return((uchar)pixel);
}

/* move data directly to display */
static void acquire_dspscn(void)
{       int    v,h;
        uchar  pix,*pixptr;

for (v=0;v<xray.ycnt;v++)
                {pixptr = disp_point(0+disp.hoff,v+disp.voff);
                 for (h=0;h<xray.xcnt;h++)
                        {pix = acquire_pixel();
                         *pixptr++ = pix;
                         }
                 }
}

/* average data in memory, divide down, then display */
void acquire_memave(uint avecnt)
{       uint   a,h,v;
        uchar  pix ,*pixptr;
        uint   pixel,*memptr;

cursor( 9, 6); printf("%2d",1);
        /* use first scan to set initial values */
        for (v=0;v<xray.ycnt;v++)
                {memptr = mem_point(0,v);
                 for (h=0;h<xray.xcnt;h++)
                        {pix = acquire_pixel();
                         *memptr  = (uint) pix;
                         memptr++;
                         }
                 }
```

```
/* later scans add to previous contents */
for (a=1;a<avecnt;a++)
    {cursor( 9, 6); printf("%2d",a+1);
     for (v=0;v<xray.ycnt;v++)
        {memptr = mem_point(0,v);
         for (h=0;h<xray.xcnt;h++)
            {pix = acquire_pixel();
             *memptr += (uint) pix;
             memptr++;
            }
        }
    }

/* divided down and display */
for (v=0;v<xray.ycnt;v++)
    {pixptr = disp_point(0+disp.hoff,v+disp.voff);
     memptr =  mem_point(0,v);
     for (h=0;h<xray.xcnt;h++)
        {pixel    = *memptr;
         pixel   /= acq.avecnt;
         *pixptr  = (uchar) pixel;

pixptr++; memptr++;
        }
    }
}

/* simple version of memory average using a weighted average */
void acquire_dspave(uint avecnt)
{       int     a,v,h;
        uchar   pix,pix1;
        uchar   *pixptr;
        int     pixel;

if (mem.ok)
            {acquire_memave(avecnt);
             return;
            } acquire_dspscn();

for (a=1;a<avecnt;a++)
            {cursor( 9, 6); printf("%2d",a+1);
             for (v=0;v<xray.ycnt;v++)
                {pixptr = disp_point(0+disp.hoff,v+disp.voff);
                 for (h=0;h<xray.xcnt;h++)
                    {pix      = acquire_pixel();
                     pixel    = (int) *pixptr;
                     *pixptr++ = (uchar) ( ((((int) pix) * 7)/8)+(pixel/8));
                    }
                }
            }
}
```

```
/***********************************************************
***                 Acquire Data Ranging                 ***
***                                                       ***
***     Given the image's histogram, the min and max     ***
***  values are identified, and the data amplifier        ***
***  is re-scaled automatically to gain the data to       ***
***  full range.                                          ***
***       If simulation is on, a new corresponding        ***
***  fast data lookup table is generated.                 ***
***                                                       ***
***********************************************************/ static void datn_range(int loopcnt)
{       int     i,midval;
        float   new_dgn,new_doff,old_gain,old_offset;
        old_gain   = xray.gain;
        old_offset = xray.offset;

for (i=0;(hist_tbl[i]==0L) && (i<256);) i++;
        if (i <   8) acq.low  =   0; else acq.low  = i-8;

for (i=255;(hist_tbl[i]==0L) && (i>0);) i--;
        if (i > 248) acq.high = 255; else acq.high = i+8;

midval    = ((acq.high - acq.low) / 2) - 128;
        new_doff  = ((float) acq.low) * (100.0/255.0);
        new_doff /= xray.gain  ;
        new_doff += xray.offset;

new_dgn   = xray.gain;
        new_dgn  /= ((float) (acq.high - acq.low)) / 256.0;

xray.gain   = new_dgn;
        xray.offset = new_doff;

xray_cmnd(XRAY_BOUND);
        xray_setup();
        if (sim.mode!=SIM_OFF) sim_datareset();

cursor(1,14);
        printf("                 -- Data-- ----- Old ------ ----- New ------\n");
        printf("Data-Range : Low High   Gain    Offset    Gain    Offset \n");
        printf("------------ ---- ---- -------- -------- -------- -------\n");
        cursor(1,17+(loopcnt % 4));
        printf("[%2d]       : %3d %3d |%6.2fx %5.2f%% |%6.2fx %5.2f%%",
               loopcnt+1,acq.low,acq.high,
               old_gain ,old_offset,
               xray.gain,xray.offset);
        cursor(1,17+(loopcnt % 4)+1);
        printf("%79s","");
}

/***********************************************************
***                 Acquire Tracking                     ***
***                                                       ***
***     These routines will find an object of a          ***
***  selected value on the display, convert that          ***
***  address if found to the tube co-ordinates, and       ***
***  automatically reset the pan and zoom so that         ***
***  the next scan will center on that position.          ***
***                                                       ***
***********************************************************/
```

```c
/* scan the display for trigger value in an inside to outside pattern */
static int do_find(int step,int *h,int *v)
{       int     i,j,k,x,y,half;
        uchar *pixptr;
        half = (step / 2) | 0x01;
        step = (half * 2);

for (i=xray.res/2,k=0;k<(xray.res-step);i = (k & 0x01) ? i+k:i-k)
            {y = i;
             x = step + ((k & 0x02) ? half:0);
             for (j= (step*2);j<(xray.res-step);j += step,x += step)
                    {pixptr = disp_point(x+disp.hoff,y+disp.voff);
                     if (acq.trkval < *pixptr)
                            {*h = j; *v = i;
                             /* show old,new target hit location */
                             if (sim.mode!=SIM_OFF)
                                {disp_cross(1+xray.res/2,1+xray.res/2);
                                 disp_cross(x+disp.hoff,y+disp.voff);
                                }
                             return(TRUE);
                            }
                     /* display search progress if simulation */
                     if (sim.mode!=SIM_OFF) *pixptr = 0xff;
                     }
             k += half;
             }

*h = 0;
        *v = 0;
        return(FALSE);
}

/* if find is succsessful, re-calculate sweep pan and zoom, else full scan */
static int trk_find(int loopcnt)
{       int     h,v,ok,scale,i,scan_size;
        float   xpos,ypos;

ok = do_find(TRK_STEPSIZE,&h,&v);

if (ok)
             {scale = 4096 / disp.res;

xpos  = ((float) h) / ((float) xray.xcnt);
              xpos *= ((float) xray.xsize);
              acq.trackx = xray.xoff + ((int) xpos);

ypos  = ((float) v) / ((float) xray.ycnt);
              ypos *= ((float) xray.ysize);
              acq.tracky = xray.yoff + ((int) ypos);

xray.xoff  = acq.trackx - ((zoom.x2-zoom.x1)/2);
              xray.xsize = zoom.x2-zoom.x1;
              xray.yoff  = acq.tracky - ((zoom.y2-zoom.y1)/2);
              xray.ysize = zoom.y2-zoom.y1;
              xray_zoom(xray.xoff ,xray.yoff ,
                        xray.xsize,xray.ysize,
                        xray.res  ,xray.res   );
              }
         else {acq.tracky = 0;
               acq.tracky = 0;
```

```
            xray_zoom(0,0,4095,4095,xray.res,xray.res);
            h = 0; v = 0;
            } cursor(1,15);
    printf("Tracking   Found    X       Y       Xoff    Yoff    Zoom \n");
    printf("---------- -----  ------  ------  ------  ------  ------\n");
    cursor(1,17+(loopcnt % 4));
    printf("[%2d]      : %3s  %5.2f\" %5.2f\" %5.2f\" %5.2f\" %5.2fx",
         loopcnt+1,(ok) ? "Yes": "No",
         hex2inch(acq.trackx),hex2inch(acq.tracky),
         hex2inch(xray.xoff ),hex2inch(xray.yoff ),
         hex2zoom(xray.xsize)
         );
    cursor(1,17+(loopcnt % 4)+1);
    printf("%79s","");
    return(ok);
}

/************************************************************
 ***                                                      ***
 ***            Acquire Histogram                         ***
 ***                                                      ***
 ***   Compute a histogram of the display.  A step        ***
 ***   size can be set greater for one for a faster       ***
 ***   approximation, of zero for no histogram.           ***
 ***   A summary character string is generated for        ***
 ***   the users monitor.                                 ***
 ***                                                      ***
 ************************************************************/

/* scan image, computer histogram */
static void hist_scan(void)
{       uint h,v,pixel,i,j;
        ulong ave,ave1,ave2,ave3,qcksum,cnt;
        uchar *pixptr;

if (acq.hist_step==0)
             {hist_str[0]='\0';
              return;
              } for (pixel=0;pixel<256;pixel++) hist_tbl[pixel]=0L;
        for (pixel=0;pixel< 16;pixel++) hist_dsp[pixel]=0L;

for (v=0,ave=0L,cnt=0L;v<xray.ycnt;v+=acq.hist_step)
              {pixptr = disp_point(0+disp.hoff,v+disp.voff);
```

Digiray.c

```
              for (h=0;h<xray.xcnt;h+=acq.hist_step)
                  {pixel = ((int) acquire_pixel()) & 0xOff;
                   hist_tbl[pixel     ] += 1L;
                   hist_dsp[pixel >> 4] += 1L;
                   ave += (long) pixel;
                   cnt += 1L;
                   }
              } ave /= cnt;
```

```
            ave1 = ave/2;
            ave2 = ave  ;
            ave3 = ave*2;

for (i=0;i<16;i++)
                    {if ((hist_dsp[i]<16L) && (hist_dsp[i]>0L))
                            hist_dsp[i] = 1L;
                     else hist_dsp[i] /= 16L;

if         (hist_dsp[i] > ave3) hist_str[i] = HSTDSP_4;
                        else if (hist_dsp[i] > ave2) hist_str[i] = HSTDSP_3;
                        else if (hist_dsp[i] > ave1) hist_str[i] = HSTDSP_2;
                        else if (hist_dsp[i] >   0L) hist_str[i] = HSTDSP_1;
                        else                         hist_str[i] = HSTDSP_0;
                     }
            hist_str[16]='\0';
    } static void hist_list(void)
{       int  i;

printf("\n======== Histogram Table ===============================\n");
        for (i=0;i<256;i++)
                {if ((i % 8)==0) printf("   \n%2x) ",i);

printf("%8ld ",hist_tbl[i]);
                 } printf("\n\n");
        printf("Hit Any key "); getcmnd();
        printf("\n\n");
}

/**********************************************************
 ***                                                    ***
 ***            Acquire Main Loop                       ***
 ***                                                    ***
 ***    These routines manage the acquire loop.  The    ***
 ***    status is displayed for the user.               ***
 ***                                                    ***
 **********************************************************/

/* set up next area/zoom, image frame destination, and update user screen */
static void acquire_preset(int loopcnt,int areacnt)
{       int scale,maxframe;
        struct TblRec *zm;

switch (acq.dest)
                {case DSPMOD_FRAME1 : disp.res   = xray.res;
                                      disp.frame = 1;
                                      disp_setup();
                                      break;
                 case DSPMOD_CORNER : disp_offset(1,xray.res);
                                      maxframe   = disp.maxframe;
                                      disp.res   = 512;
                                      disp_setup();
                                      disp.frame = (loopcnt % maxframe)+1;
                                      disp_offset(disp.frame,256);
                                      break;
                 }
```

```c
switch (acq.mode)
   {case ACQMOD_ZOOM   : xray_zoom(zoom.x1,zoom.y1,
                                   zoom.x2-zoom.x1,
                                   zoom.y2-zoom.y1,
                                   xray.res,xray.res);
                         break;
    case ACQMOD_ZMTBL   : zm = &zoomtbl[areacnt];
                          xray_zoom(zm->x1 , zm->y1,
                                    zm->x2 - zm->x1,
                                    zm->y2 - zm->y1,
                                    xray.res,xray.res);
                          break;
    case ACQMOD_ARATBL : scale       = 4096/xray.res;
                         disp.hoff += areatbl[areacnt].x1/scale;
                         disp.voff += areatbl[areacnt].y1/scale;

zm = &areatbl[areacnt];
                         xray_zoom(zm->x1   , zm->y1,
                                   xray.res*scale,xray.res*scale,
                                   (zm->x2 - zm->x1)/scale,
                                   (zm->y2 - zm->y1)/scale
                                   );

break;
    case ACQMOD_TRACK  : if (loopcnt==0)
                             {acq.tracky = 0;
                              acq.tracky = 0;
                              xray_zoom(0,0,4095,4095,
                                        xray.res,xray.res);
                             }
                         break;
    case ACQMOD_RANGE  : xray_zoom(0,0,4095,4095,xray.res,xray.res);
                         break;
   }
cursor( 9, 4); printf("%2d",loopcnt+1);
cursor( 9, 5); printf("%2d",areacnt+1);
cursor( 9, 6); printf("%2d",           1);
cursor(22, 4); printf("%5.2f\"",hex2inch(xray.xoff));
cursor(22, 5); printf("%5.2f\"",hex2inch(xray.yoff));
cursor(22, 6);
printf("%5.2fx",hex2zoom(xray.xsize));
cursor(22, 7);
printf("%5.2fx",hex2zoom(xray.ysize));
cursor(38, 4); printf("%3d",xray.res);
cursor(38, 5); printf("%3d",xray.xcnt);
cursor(38, 6); printf("%3d",xray.ycnt);
cursor(38, 7); printf("%3d",disp.frame);
cursor(52, 4); printf("%7.2f",xray.gain);
cursor(52, 5); printf("%7.2f",xray.offset);
cursor(52, 6);
printf("%7.2f",((float)xray.datasize)/4095.0);
cursor(52, 7);
switch (xray.datamul)
    {case 0 : printf("     x1"); break;
     case 1 : printf("    x10"); break;
     case 2 : printf("   x100"); break;
     case 3 : printf("  x1000"); break;
    }
}
```

```c
/* post scan analysis for histogram, tracking, and data ranging */
static void acquire_post(int loopcnt,int areacnt)
{
        hist_scan();
        cursor(15, 9); printf("%16s",hist_str);

switch (acq.mode)
            {case ACQMOD_TRACK  : if (sim.mode!=SIM_OFF) sim_track(loopcnt);
                                  trk_find(loopcnt);
                                  xray_cmnd(XRAY_BOUND);
                                  cursor(44, 9);
                                  printf("%5.2f\"",hex2inch(acq.trackx));
                                  cursor(51, 9);
                                  printf("%5.2f\"",hex2inch(acq.tracky));
                                  break;
             case ACQMOD_RANGE  : data_range(loopcnt);
                                  cursor(44, 9);
                                  printf("%6d",acq.low);
                                  cursor(51, 9);
                                  printf("%6d",acq.high);
                                  break;
            }
}
/* main acquire loop and control */
static void go_acquire(void)
{       int  i,loop_cnt,area_cnt,area_max,ave_max,loop_max,is_error,old_sim;

old_sim  = sim.mode;
        loop_max = acq.loopcnt;
        is_error = ERR_NONE;

for (i=0;i<25;i++) printf("\n");
        cursor(1,1);
        printf("=== ACQUIRE ==========================================\n");
        printf(" Loop           Zoom              Resolution    Data Gain      \n");
        printf("-----------    ---------------    -------------    -------------------\n");
        printf(" Loop = xx     Xoff = 12.34'     Res  = 512    Gain   =  1.00\n");
        printf(" Area = xx     Yoff = 12.34'     Xcnt = 512    Offset =  0.00\n");
        printf(" Ave  = xx     Xsize = 1.00x     Ycnt = 512    Fine   =  1234\n");
        printf("               Ysize = 1.00x     Frame=   1    Course =  1234\n");
        printf("\n");
        printf(" Histogram = [----------------]    Track = (12.34',12.34') \n");
        printf("             0        128       255                         \n");
        printf("=====================================================\n");

switch (acq.mode)
            {case ACQMOD_TRACK  : ave_max      = 1;
                                  area_max     = 1;
                                  acq.trackx   = 0;
                                  acq.tracky   = 0;
                                  cursor(35, 9);
                                  printf("Track = (     ,     )");

if (loop_max < 16) loop_max = 16;
                                  if (sim.mode!=SIM_OFF)
                                      {sim.mode = SIM_DATAHALF;
                                       cursor( 1,13);
                                       printf(" <<< Substituting ");
                                       printf("Half Range Data >>>");
                                      }
```

```
                                    break;
            case ACQMOD_RANGE  : ave_max    = 1;
                                 area_max   = 1;
                                 xray.gain  = 1.0;
                                 xray.offset = 0.0;
                                 cursor(35, 9);
                                 printf("Range = (       ,       )");

if (loop_max < 4) loop_max = 4;
                                 if (sim.mode!=SIM_OFF)
                                     {sim.mode = SIM_DATARNDN;
                                      cursor( 1,13);
                                      printf(" <<< Substituting ");
                                      printf("Narrow Random Data >>>");
                                     }
                                 break;
            case ACQMOD_ZMTBL  : area_max = zoommax;
                                 if (area_max==0) is_error |= ERR_EMPTY;
                                 ave_max  = acq.avecnt;
                                 cursor(35, 9);
                                 printf("                          ");
                                 break;
            case ACQMOD_ARATBL : area_max = areamax;
                                 if (area_max==0) is_error |= ERR_EMPTY;
                                 ave_max  = acq.avecnt;
                                 cursor(35, 9);
                                 printf("                          ");
                                 break;
            default            : area_max =       1;
                                 ave_max  = acq.avecnt;
                                 cursor(35, 9);
                                 printf("                          ");
                                 break;
            } xray_setup();
    xray_cmnd(XRAY_RESET);
    xray_cmnd(XRAY_ON);
    sim.mode = old_sim;
    if (is_error) goto acq_quit;

for (loop_cnt=0;loop_cnt<loop_max;loop_cnt++)
        for (area_cnt=0;area_cnt<area_max;area_cnt++)
            {
            is_error = xray_cmnd(XRAY_STATUS);
            if (is_error) goto acq_quit;

acquire_preset(loop_cnt,area_cnt);

if (ave_max==1) acquire_dspscn();
                    else acquire_dspave(ave_max);

acquire_post(loop_cnt,area_cnt);
            } acq_quit:

xray_cmnd(XRAY_OFF);
    xray_zoom(zoom.x1,zoom.y1, zoom.x2-zoom.x1,
              zoom.y2-zoom.y1, xray.res,xray.res);
```

```
    if (acq.mode == ACQMOD_RANGE) {xray.gain = 1.0; xray.offset = 0.0;} disp.frame = 1; disp_setup();
    cursor(1,22);

if (is_error)
        {printf("<<< X-Ray scan has been Interrupted >>>\a\n");
    if (is_error & ERR_EMPTY) printf(" > Area/Zoom Table is empty\n");
    if (is_error & ERR_INTR ) printf(" > User Interrupt\n");
    if (is_error & ERR_SWEEP) printf(" > Raster Failure\n");
    printf("\n");
    } printf("Hit Any key "); getcmnd();
    printf("\n\n");
}

/************************************************************
 ***                   Main Menu                          ***
 ***                                                      ***
 ************************************************************/

/* Image of the Main Menu : */
/*
 /======================================================================\
 |            Digiray.C  :  (C)opyright 1992 Digiray, Inc.              |
 |=== Xray Parameters ================= Display Parameters ==========   |
 |  a) Resolution       =    512   Pix |  p) Resolution    =   512  Pix |
 |  b) Speed            =   1/16   Sec |  q) Frame         =    1       |
 |  c) High Voltage     = 100.00   Kv  |=== Data Parameters =========== |
 |  d) Current          =   1.24   mA  |  r) Gain          = 100.99 *   |
 |  e) Filament         =   5.50   Volts|  s) Offset       =  13.00 %   |
 |  f) Focus            =   5.50   Volts|=== Protection Parameters ==== |
 |=== Acquire Parameters =============  |  t) Current:zoom =   1.00 C:Z |
 |  g) Scan Mode        =  Full Tube   |     -max current- <=  2.00 mA |
 |  h) Average Count    =    1         |  u) Minimum zoom  =   1.00 Inch|
 |  i) Loop    Count    =    1         |  v) Maximum KV    = 100.00 KV  |
 |  j) Zoom             =   5.50 x     |  w) Simulation    =   OFF      |
 |  k) Edit Zoom table  =    2 zooms   |=== Commands ================== |
 |  l) Edit Area table  =    3 areas   |  x) Acquire Image              |
 |  m) Histogram        =  Quick       |  y) Clear   Display            |
 |  n) Aspect Ratio     =   1.00 H:V   |  z) Quit to DOS                |
 |  o) Display Dest     = to Frame 1   |  ?) Help                       |
 \======================================================================/
*/

/* display the main menu and current settings,selections */
static void display_main(void)
{       char simstr[20],arastr[20],dspstr[20],hststr[20];

switch (acq.dest)
        {case DSPMOD_CORNER : strcpy(dspstr,"All Corners"); break;
         case DSPMOD_FRAME1 : strcpy(dspstr," to Frame 1"); break;
        } switch (sim.mode)
        {case SIM_OFF      : strcpy(simstr,"Off");       break;
         case SIM_DATAFULL : strcpy(simstr,"Data Full"); break;
         case SIM_DATAHALF : strcpy(simstr,"Data Half"); break;
```

```c
            case SIM_DATARNDF  : strcpy(simstr,"Random Full"); break;
            case SIM_DATARNDN  : strcpy(simstr,"Random Fine"); break;
            } switch (acq.hist_step)
            {case 0            : strcpy(hststr,"Off");   break;
             case 1            : strcpy(hststr,"Full");  break;
             default           : strcpy(hststr,"Quick"); break;
            } switch (acq.mode)
            {case ACQMOD_ZOOM  : strcpy(arastr,"Zoom Setting");   break;
             case ACQMOD_ZMTBL : strcpy(arastr,"Table of Zooms"); break;
             case ACQMOD_ARATBL: strcpy(arastr,"Table of Areas"); break;
             case ACQMOD_TRACK : strcpy(arastr,"Tracking");       break;
             case ACQMOD_RANGE : strcpy(arastr,"Range Data");     break;
            } printf("\n\n");
printf("/=======================================");
printf("=========================\\ \n");
printf("|                    Digiray.C  :   (C)opy");
printf("right 1992 Digiray, Inc.         | \n");
printf("|=== X-ray Parameters ================");
printf("==== Display Parameters =========|   \n");
printf("|  a) Resolution       =   %4d  Pix    ",xray.res);
printf("  p) Resolution   =  %3d  Pix   |   \n",disp.res);
printf("|  b) Speed            =   %4s  Sec    ",spd2str(xray.clock));
printf("  q) Frame        =  %1d          |   \n",disp.frame);
printf("|  c) High Voltage     =  %6.2f Kv    ",xray.hv);
printf("=== Data Parameters =============|   \n");
printf("|  d) Current          =  %5.2f mA    ",xray.current);
printf("  r) Gain         =%7.2f x   |   \n",xray.gain);
printf("|  e) Filament         =  %5.2f Volts ",xray.filament);
printf("  s) Offset       = %6.2f %%   |   \n",xray.offset);
printf("|  f) Focus            =  %5.2f Volts ",xray.focus);
printf("=== Protection Parameters =======|   \n");
printf("|=== Acquire Parameters ==============");
printf("|  t) Current/Zoom     =  %5.2f C:Z   |   \n",safe.zmcur);
printf("|  g) Scan Mode        = %-14s ",arastr);
printf("     -max current- <=  %5.2f mA    |   \n",xray.max_cur);
printf("|  h) Average Count    =  %5d        ",acq.avecnt);
printf("  u) Minimum Zoom =  %5.2f Inch |   \n",safe.minzoom);
printf("|  i) Loop    Count    =  %5d        ",acq.loopcnt);
printf("  v) Maximum  KV  =  %5.2f KV   |   \n",safe.maxkv);
printf("|  j) Zoom             =  %5.2f x     ",
        hex2zoom(zoom.x2-zoom.x1) );
printf("|  w) Simulation       =  %11s |     \n",simstr);
printf("|  k) Edit Zoom Table  =  %5d Zooms   ",zoommax);
printf("=== Commands ====================|   \n");
printf("|  l) Edit Area Table  =  %5d Areas   ",areamax);
printf("|  x) Acquire Image              |   \n");
printf("|  m) Histogram        =  %5s        ",hststr);
printf("|  y) Clear Display              |   \n");
printf("|  n) Aspect Ratio     =  %5.2f H:V   ",xray.aspect);
printf("|  z) Quit to DOS                |   \n");
printf("|  o) Display Dest     = %11s    ",dspstr);
printf("|  ?) Help                       |   \n");
printf("\\=======================================");
printf("=========================/ \n");
```

}

```
int main(int argc,char *argv[])
{       int     repeat;
        char    cmnd,str[40];
        float   temp;

printf("=================================================\n");
        printf(" Welcome to the Digiray.c program. Just select an acquire\n");
        printf(" method and practice image acquires. Use the help command\n");
        printf(" ('?') for information on any program command or feature.\n");
        printf(" Read the source code for more information regarding the \n");
        printf(" the image display, memory, and the trackball interface. \n");
        printf("                                                         \n");
        printf("    This is the assumed x-ray system environment :       \n");
        printf("                                                         \n");
        printf("    1)   Tube Area     :  64 sq. in. (8 by 8 inches)     \n");
        printf("    2)   High Voltage  : 100 Kv range                    \n");
        printf("    3)   Current       :   2 mA range                    \n");
        printf("    4)   Filament      :  10 V range                     \n");
        printf("    5)   Focus         :  10 V range                     \n");
        printf("    6)   Computer      : PC-AT, Monochrome, (512K EMM opt.)\n");
        printf("    7)   Simulation    :  Yes  Machine,Data,Noise        \n");
        printf("                                                         \n");
        printf("                       (C)opyright 1992 Digiray, Inc.    \n");
        printf("=================================================\n");
        printf("\nPress Any Key to Continue "); getcmnd();

disp_init();
        mem_init();
        track_init();
        table_init();
        sim_init();
        xray_init();

do      {
                printf("\n\n");
                display_main();
                printf("      Command ");
                cmnd = getcmnd();
                printf("\n");

switch (cmnd)
                    {case 'a' : printf("=== Xray Resolution =============\n");
                                printf("<A>  256 x  256\n");
                                printf("<B>  512 x  512\n");
                                printf("<?>  Help \n");
                                printf("<Q>  Quit \n");
                                cmnd = getcmnd();

switch (cmnd)
                                    {case 'a' : xray.res =  256; break;
                                     case 'b' : xray.res =  512; break;
                                     case '?' : help('a');       break;
                                    } xray_setup();
                                break;
                     case 'b' : printf("=== Xray Speed =========\n");
                                printf(" (Resolution = %d)\n",xray.res);
```

```c
            printf("<A>  %s\n",spd2str(0));
            printf("<B>  %s\n",spd2str(1));
            printf("<C>  %s\n",spd2str(2));
            printf("<D>  %s\n",spd2str(3));
            printf("<E>  %s\n",spd2str(4));
            printf("<F>  %s\n",spd2str(5));
            printf("<G>  %s\n",spd2str(6));
            printf("<H>  %s\n",spd2str(7));
            printf("<?>  Help \n");
            printf("<Q>  Quit \n");
            cmnd = getcmnd();

switch (cmnd)
                {case 'a' : xray.clock = 0x00; break;
                 case 'b' : xray.clock = 0x01; break;
                 case 'c' : xray.clock = 0x02; break;
                 case 'd' : xray.clock = 0x03; break;
                 case 'e' : xray.clock = 0x04; break;
                 case 'f' : xray.clock = 0x05; break;
                 case 'g' : xray.clock = 0x06; break;
                 case 'h' : xray.clock = 0x07; break;
                 case '?' : help('b');         break;
                 }
            xray_setup();
            break;
case 'c' : printf("== High Voltage 0.0 to %.2f KV ==\n",
                  safe.maxkv);
           printf("New value (%5.2f) : ",xray.hv);
           gets(str); temp = atof(str);
           if ((temp >= 0.0) && (temp <= safe.maxkv))
                  xray.hv = temp;
           break;
case 'd' : printf("== HV Current 0.0 to %.2f mA ==\n",
                  CUR_MAX);
           printf("New value (%5.2f) : ",xray.current);
           gets(str); temp = atof(str);
           if ((temp >= 0.0) && (temp <= CUR_MAX))
                  xray.current = temp;
           break;
case 'e' : printf("== Filament 0.0 to %.2f V ==\n",
                  FIL_MAX);
           printf("New value (%5.2f) : ",xray.filament);
           gets(str); temp = atof(str);
           if ((temp >= 0.0) && (temp <= FIL_MAX))
                  xray.filament = temp;
           break;
case 'f' : printf("== Focus 0.0 to %.2f V ==\n",
                  FOC_MAX);
           printf("New value (%5.2f) : ",xray.focus);
           gets(str); temp = atof(str);
           if ((temp >= 0.0) && (temp <= FOC_MAX))
                  xray.focus = temp;
           break;
case 'g' : printf("\n=== Acquire Scan Mode =========\n");
           printf("<A> Standard Zoom  Single Scan\n");
           printf("<B> Table of Zooms @ full res.\n");
           printf("<C> Table of Areas for Update \n");
           printf("<D> Tracking with Zooming\n");
           printf("<E> -the tracking value (%d)\n",
                   acq.trkval);
```

```c
                printf("<F> Range Data Amplifier \n");
                printf("<G> -the last histogram table\n");
                printf("<?> Help \n");
                printf("<Q> Quit \n");
                cmnd = getcmnd();

switch (cmnd)
                    {case 'a' : acq.mode = ACQMOD_ZOOM ;
                                dsp_table(0);
                                break;
                     case 'b' : acq.mode = ACQMOD_ZMTBL ;
                                break;
                     case 'c' : acq.mode = ACQMOD_ARATBL;
                                break;
                     case 'd' : acq.mode = ACQMOD_TRACK ;
                                break;
                     case 'e' : printf("Tracking Value (%d): "
                                       ,acq.trkval);
                                gets(str); temp = atoi(str);
                                if ((temp >= 0x01) &&
                                    (temp <= 0xff))
                                    acq.trkval= temp;
                                break;
                     case 'f' : acq.mode = ACQMOD_RANGE;
                                break;
                     case 'g' : hist_list();  break;
                     case '?' : help('g');    break;
                     }
                printf("<B> Quick Histogram of inage\n");
                printf("<C> No    Histogram \n");
                printf("<?> Help \n");
                printf("<Q> Quit \n");
                cmnd = getcmnd();

switch (cmnd)
                    {case 'a' : acq.hist_step = 1; break;
                     case 'b' : acq.hist_step = 4; break;
                     case 'c' : acq.hist_step = 0; break;
                     case '?' : help('m');         break;
                     }
                break;
    case 'n' : printf("Aspect ratio (%5.2f) : ",xray.aspect);
               gets(str); temp = atof(str);
               if ((temp >= 0.5) && (temp <= 2.0))
                     xray.aspect = temp;
               break;
    case 'o' : printf("==== Display Destination Mode ====\n");
               printf("<A> Acquires to Frame 1        \n");
               printf("<B> Acquires to each frame corner \n");
               printf("<?> Help \n");
               printf("<Q> Quit \n");
               cmnd = getcmnd();

switch (cmnd)
                   {case 'a' : acq.dest = DSPMOD_FRAME1; break;
                    case 'b' : acq.dest = DSPMOD_CORNER; break;
                    case '?' : help('o');                break;
                    }
               break;
    case 'p' :
```

```c
        case 'q' : printf("=== Display Resolution/Frame =====\n");
                   printf("<A> 512 x 512  frame 1,           \n");
                   printf("<B> 256 x 256, frame 1, up   left \n");
                   printf("<C> 256 x 256, frame 2, down left \n");
                   printf("<D> 256 x 256, frame 3, up   right\n");
                   printf("<E> 256 x 256, frame 4, down right\n");
                   printf("<?> Help \n");
                   printf("<Q> Quit \n");
                   cmnd = getcmnd();

switch (cmnd)
                      {case 'a' : disp.res = 512; disp.frame = 1;
                                  break;
                       case 'b' : disp.res = 256; disp.frame = 1;
                                  break;
                       case 'c' : disp.res = 256; disp.frame = 2;
                                  break;
                       case 'd' : disp.res = 256; disp.frame = 3;
                                  break;
                       case 'e' : disp.res = 256; disp.frame = 4;
                                  break;
                       case '?' : help('p'); help('q'); break;
                      }
                   disp_setup();
                   break;
        case 'r' : printf("== Data Gain (0.1 to 1000.0) ==\n");
                   printf("  Enter (%5.2f) : ",xray.gain);
                   gets(str); temp = atof(str);
                   if ((temp >= 0.1) && (temp <= 1000.0))
                         xray.gain = temp;
                   break;
        case 's' : printf("== Data offset (0.0 to 100.0%%) ==\n");
                   printf("  Enter (%5.2f) : ",xray.offset);
                   gets(str); temp = atof(str);
                   if ((temp >=  0.0) && strlen(str) &&
                       (temp <= 100.0)) xray.offset = temp;
                   break;
        case 't' : printf("==== Max Current vs Scan size ====\n");
                   printf("  Value Max Current \n");
                   printf(" ------ --------------------------\n");
                   printf("  0.0   No detenuation effect\n");
                   printf("  0.5   Half at full zoom\n");
                   printf("  1.0   Zero at full zoom\n");
                   printf("  2.0   Zero at x2 zoom\n");
                   printf(" ------ --------------------------\n");
                   printf("  Enter (%5.2f) : ",safe.zmcur);
                   gets(str); temp = atof(str);
                   if ((temp >=  0.0) && strlen(str) &&
                       (temp <= 100.0)) safe.zmcur = temp;
                   xray_setup();
                   break;
        case 'u' : printf("== Minimum Zoom Size (to 0.0\") ==\n");
                   printf(" New value (%5.2f inches) : ",
                          safe.minzoom);
                   gets(str); temp = atof(str);
                   if ((temp >= 0.0) && (temp <= TUBE_SIZE) &&
                       strlen(str)) safe.minzoom = temp;
                   break;
        case 'v' : printf("Maximum High Voltage (%5.2f KV) :",
                          safe.maxkv);
```

```c
                    gets(str); temp = atof(str);
                    if ((temp > 0.0) && (temp <= HV_MAX))
                          safe.maxkv = temp;

if (xray.hv > safe.maxkv)
                          xray.hv = safe.maxkv;
                    break;
         case 'w' : printf("=== Simulation Selection ========\n");
                    printf("<A> No simulation\n");
                    printf("<B> Simulate w/ Full Range Data\n");
                    printf("<C> Simulate w/ Half Range Data\n");
                    printf("<D> Simulate w/ Random Range Full \n");
                    printf("<E> Simulate w/ Random Range Fine \n");
                    printf("<F> Simulate Data Noise (%s)\n",
                              (sim.do_noise) ? "On":"Off");
                    printf("<G> Program Verbose Debug mode (%s)\n",
                              (verbose) ? "On":"Off");
                    printf("<?> Help \n");
                    printf("<Q> Quit \n");
                    cmnd = getcmnd();

switch (cmnd)
                         {case 'a' : sim.mode = SIM_OFF;      break;
                          case 'b' : sim.mode = SIM_DATAFULL;break;
                          case 'c' : sim.mode = SIM_DATAHALF;break;
                          case 'd' : sim.mode = SIM_DATARNDF;break;
                          case 'e' : sim.mode = SIM_DATARNDN;break;
                          case 'f' : sim.do_noise = !sim.do_noise;
                                     break;
                          case 'g' : verbose = !verbose; break;
                          case '?' : help('w');             break;
                         }
                    break;
         case 'x' : go_acquire();   break;
         case 'y' : disp_clear();   break;
         case 'z' : repeat = FALSE; break;
         case '?' : printf("HELP : Key of command in question,");
                    printf(" or '?' for technical information ");
                    help(getcmnd());
                    break;
         }
    } while (repeat);

xray_init();
    mem_uninit();
    return(0);
}

/***********************************************************
 ***                    Done                              ***
 ***********************************************************/
```

I claim:

1. X-ray imaging apparatus having an x-ray source which includes an anode plate, means for directing an electron beam to said plate to produce x-rays at an x-ray origin point on said plate and means for traveling said x-ray origin point in a raster scanning motion within a first raster scan area on said plate in response to an x-axis sweep frequency signal and a y-axis sweep frequency signal, said apparatus further having an x-ray detector which produces a detector signal that is indicative of variations of x-ray intensity at a detection point that is spaced apart from said anode plate, a monitor having an image display screen and means for moving a visible light origin point in a raster scanning motion within a second raster scan area at said screen, the intensity of said light origin point being modulated during the course of said raster scanning motion at said second raster scan area by the variations of said detector signal which occur during the course of said raster scanning motion at said first raster scan area, wherein the improvement comprises:
  means for producing a first sequence of digital data bytes which encode successive values indicative of variations in the magnitude of said x-sweep frequency signal that are to occur during the course of the raster scanning motion at said first raster area,
  means for producing a second sequence of digital data bytes which encode successive values indicative of variations in the magnitude of said y-sweep frequency signal that are to occur during the course of said raster scanning motion at said first raster area, and
  means for producing said x-sweep frequency signal and said y-sweep frequency signal during the course of said raster scanning at said first raster scan area by conversion of the values encoded by successive data bytes of said first and second sequences thereof into analog signals.

2. The apparatus of claim 1 further including scan speed controlling means for varying the repetition rate of said data bytes of said said first and second sequences thereof.

3. The apparatus of claim 1 further including resolution controlling means for varying the number of said data bytes in said first and second sequences thereof.

4. The apparatus of claim 1 further means for producing zoom signal data bytes which encode values indicative of a selected size for said first raster scan area, and means for varying the amplitude ranges of said x-sweep frequency signal and said y-sweep frequency signal in response to changes of said values encoded by said zoom signal data bytes.

5. The apparatus of claim 4 further including means for producing a pan signal data byte which encodes a value indicative of a selected displacement of said first raster scan area in the x axis direction from a centered position on said anode plate, means for producing a scroll signal data byte which encodes a value indicative of a selected displacement of said first raster scan area in the y axis direction from said centered position, and means for displacing said first raster scan area from said centered position in accordance with the values encoded by said pan signal data byte and said scroll signal data byte.

6. The apparatus of claim 1 further including means for varying the number of data bytes in said first and second sequences thereof whereby the aspect ratio of said first raster scan area may be varied.

7. The apparatus of claim 1 further including means for producing a third sequence of data bytes which encode values indicative of variations of said detector signal, means for producing a contrast control signal data byte which encodes a value indicative of a selected degree of contrast which is to be exhibited by said image, means for increasing and decreasing differences between the values encoded by successive ones of said data bytes of said third sequence thereof in response to changes in the value encoded by said contrast control signal data byte.

8. The apparatus of claim 7 further including means for producing a brightness signal data byte which encodes a value indicative of a selected degree of brightness that is to be exhibited by said image, and means for varying the magnitudes of the values encoded by said third sequence of data bytes in response to changes in the value encoded by said brightness signal data byte.

9. The apparatus of claim 1 wherein said means for directing an electron beam to said anode plate of said x-ray source includes an electron gun having a filament, an electron emissive cathode that is heated by said filament, a control grid and a focusing electrode disposed in spaced apart relationship to generate and control said electron beam and wherein a negative high voltage supply is connected to said cathode, further including:
  means for producing electron gun control signals in the form of digital data bytes which encode values for filament current, cathode voltage and control grid voltage and wherein each of said values may be varied, and
  electron gun control means for applying current to said filament and voltages to said cathode and control grid that are determined by said values which are encoded by said digital electron gun control signals.

10. The apparatus of claim 9 wherein said electron gun control means includes:
  first and second voltage amplifiers coupled to said cathode and said control grid respectively and which provide voltages thereto that are determined by first and second control voltages respectively,
  a power amplifier coupled to said filament and which provides a current thereto having a magnitude determined by a third control voltage, and
  digital to analog signal converter means for converting ones of said digital electron gun control signals that encode values for said cathode voltage and control grid voltage filament current into said first, second and third control voltages respectively.

11. The apparatus of claim 10 further including optical coupler means for transmitting said control voltages to said amplifiers.

12. The apparatus of claim 10 further including means for providing a monitor signal voltage having a magnitude which varies in accordance with variations of electron beam current in said x-ray source, a differential amplifier having an output coupled to said second amplifier and having a first input which receives said second control voltage and a second input which receives said monitor signal voltage whereby said electron beam current is maintained constant when the voltage at said cathode is varied.

13. The apparatus of claim 10 further including a third voltage amplifier having an output coupled to said focusing electrode and means for increasing the voltage which said third voltage amplifier applies to said electrode when the high voltage at said cathode increases and for decreasing the voltage which is applied to said electrode when said high voltage is decreases.

14. The apparatus of claim 9 wherein said means for producing electron gun control signals produces a digital data byte which encodes a value for cathode voltage which value may be varied, further including means for varying the voltage which said high voltage supply applies to said cathode in response to changes of the value encoded by the data byte.

15. The apparatus of claim 1 further including:
means for producing area of interest digital values which encode the location of a selected area of said image on said display screen,
means for reducing the size of said first raster scan area at said anode plate in response to a zoom signal, and
means for positioning the reduced first raster scan area at a location on said anode plate that corresponds to the location on said image display screen that is encoded by said area of interest digital values.

16. The apparatus of claim 15 further including operator actuated input means for initiating a visible marking of any selected area of said image on said display screen, for initiating digital storage of raster addresses of the marked area and for initiating said zoom signal.

17. The apparatus of claim 15 wherein said x-sweep frequency signal is a first voltage that repetitively increases and decreases and said y-axis sweep frequency signal is a second voltage that repetitively increases and decreases at a lower frequency rate, wherein said means for reducing the size of said first raster pattern reduces the amplitudes of each of said sweep frequency voltages in response to said zoom signal.

18. The apparatus of claim 17 wherein said means for positioning the reduced raster pattern responds to selection of an uncentered area of said image by adding a controllable constant voltage component to at least one of said sweep frequency voltages to displace the center of said reduced raster pattern from the center of said anode plate in at least one of two orthogonal directions for a distance determined by the encoding of said area of interest digital values.

19. The apparatus of claim 15 wherein said means for sweeping said electron beam through a first raster pattern on said anode plate includes an x-axis beam deflector that responds to a x-axis sweep frequency voltage that repetitively increases and decreases and a y-axis beam deflector that responds to a y-axis sweep frequency voltage that repetitively increases and decreases at a lower frequency rate, further including:
a source of repetitive clock pulses, and
wherein said means for producing a first sequence of digital data bytes includes a first pulse counter having an output which transmits a digitally encoded count of said clock pulses and which produces a reset signal and resets to a count of zero after each receipt of a predetermined number of clock pulses, and
wherein said means for producing a second sequence of digital data bytes includes a second pulse counter coupled to said first pulse counter to receive said reset signals therefrom and having an output which transmits a digitally encoded count of said reset signals and which resets to a count of zero after each receipt of a predetermined number of reset signals, and
wherein said means for producing said x-sweep frequency signal and said y-sweep frequency signal includes a first digital to analog signal converter having an input coupled to said output of said first pulse counter and having an output which transmits said x-axis sweep frequency voltage to said x-axis beam deflector, and a second digital to analog signal converter having an input coupled to said output of said second pulse counter and having an output which transmits said y-axis sweep frequency voltage to said y-axis beam deflector.

20. The apparatus of claim 19 wherein said first and second digital to analog signal converters are each of the multiplying form which have a reference input to which a control signal may be applied to vary the amplitude of the output voltage of the converter and wherein said means for reducing the size of said first raster pattern applies control signals to said first and second digital to analog signal converters in response to said zoom signal which control signals reduce the amplitudes of said output voltages.

21. The apparatus of claim 19 wherein said means for producing area of interest digital values includes a computer central processing unit programmed to generate a first set of digital signals that encode the location of said selected area of said image in the x-axis direction and to generate a second set of digital signals that encode the location of said selected area of said image in the y-axis direction, and
wherein said means for positioning the reduced raster pattern includes a first differential amplifier coupled between said first digital to analog signal converter and said x-axis beam deflector to transmit said x-axis sweep frequency voltage thereto, said first differential amplifier having a first reference signal input through which a constant direct current component can be added to said x-axis sweep frequency voltage, a second differential amplifier coupled between said second digital to analog signal converter and said y-axis beam deflector to transmit said y-axis sweep frequency voltage thereto, said second differential amplifier having a second reference signal input through which a constant direct current component can be added to said y-axis sweep frequency voltage, a third digital to analog signal converter which converts the value represented by said first set of digital signals to a corresponding analog voltage and which applies said analog voltage to said reference signal input of said first differential amplifier, and a fourth digital to analog signal converter which converts the value represented by said second set of digital signals to a corresponding analog voltage and applies the analog voltage to said reference signal input of said second differential amplifier.

22. The apparatus of claim 15 further including means for reducing the electron beam current in said scanning x-ray source in response to said zoom signal to protect said anode plate from heat damage.

23. The apparatus of claim 22 wherein said means for reducing the electron beam current reduces the current to an extent that is an inverse function of the size of said selected area of said image.

24. The apparatus of claim 15 further including means for at least temporarily suppressing said electron beam in said scanning x-ray source after a predetermined time period following said zoom signal.

25. The apparatus of claim 24 wherein the duration of said time period is an inverse function of the size of said selected area of said image.

26. The apparatus of claim 1 further including means for producing a sweep frequency voltage error signal in response to an absence of either or both of said x-axis and y-axis sweep frequency signals and means for suppressing application of said high voltage to said anode plate in response to said error signal.

27. The apparatus of claim 15 wherein said means for producing a first sequence of digital data bytes includes a source of repetitive clock pulses and produces the data bytes in response to successive clock pulses and wherein said means for producing area of interest digital values which encode the location of a selected area of said image on said display screen includes a computer central processing unit having means for tracking the position of said moving x-ray origin point by counting said digital data bytes.

28. The apparatus of claim 27 further including:
at least one operator actuated input device having means for selectively generating cursor positioning signals, means for selectively generating area selection signals and means for selectively generating said zoom signal and wherein said central processing unit includes:
means for generating a cursor in said image of said image display screen and for moving said cursor within said image in response to said cursor positioning signals,
memory means for storing digitized x and y axis raster addresses which identify the momentary position of said cursor on said display screen in response to said area selection signals,
and wherein said means for reducing the size of said first raster pattern determines one dimension of the reduced first raster pattern by subtracting the x-axis component of a first of said stored raster addresses from the x-axis component of a second of said stored raster addresses and determines the orthogonal dimension of said reduced first raster pattern by subtracting the y-axis component of said second stored raster address from the y-axis component of said first stored raster address.

29. The apparatus of claim 28 wherein said means for positioning the reduced first raster pattern offsets said reduced raster pattern from a centered position on said anode plate in said one direction by a distance proportional to the x-axis component of said first stored raster address and in said orthogonal direction by a distance proportional to the y-axis component of said second stored raster address.

30. The apparatus of claim 1 further including:
an analog to digital signal converter having an input which receives said detector signal and an output which transmits a sequence of digital data bytes indicative of changes in the magnitude of said detector signal,
a computer central processing unit,
means for transmitting said sequence of digital data bytes from said analog to digital signal converter output to said central processing unit for image processing therein,
a video board coupled to said central processing unit to receive the processed data bytes therefrom and having means for temporarily storing the processed data bytes, means for transmitting x and y sweep frequency signals to said monitor and means for modulating said intensity of said light origin point at said display screen in accordance with values encoded by successive ones of the processed data bytes.

31. The apparatus of claim 15 wherein said means for producing area of interest digital signals locates the area of interest by detecting changes in said detector signal which are of at least a predetermined magnitude, and wherein said means for positioning the reduced first raster scan area positions the reduced raster scan area at the locations on said anode plate at which said changes are detected whereby said apparatus identifies and images regions of a subject that produce predetermined gray levels in the imaging process.

32. The apparatus of claim 1 further including :
an analog to digital signal converter having an input which receives said detector signal and an output which transmits a sequence of digital data bytes encoding values indicative of changes in the magnitude of said detector signal and wherein said converter can produce a range of values that is bounded by a maximum value and a minimum value,
means for detecting highest and lowest values encoded by said sequence of data bytes during a first raster scan of said anode plate, and
means for adjusting the amplitude range of said detector signal to cause said highest value to produce said maximum value at said converter output during a rescanning of said anode plate and to cause said lowest value to produce said minimum value at said converter output during said rescanning whereby contrast in said image is automatically optimized.

33. X-ray imaging apparatus having an x-ray source which includes an anode plate, means for directing an electron beam to said plate to produce x-rays at an x-ray origin point on said plate and means for traveling said x-ray origin point in a raster scanning motion within a first raster scan area on said plate in response to an x-axis sweep frequency signal and a y-axis sweep frequency signal, said apparatus further having an x-ray detector which produces a detector signal that is indicative of variations of x-ray intensity at a detection point that is spaced apart from said anode plate, a monitor having an image display screen and means for moving a visible light origin point in a raster scanning motion within a second raster scan area at said screen, the intensity of said light origin point being modulated during the course of said raster scanning motion at said second raster scan area by the variations of said detector signal which occur during the course of said raster scanning motion at said first raster scan area, wherein the improvement comprises:
means for producing and storing digital signals which encode the location of a selected area of said image in response to area of interest selection signals,
means for reducing the size of said first raster pattern at said anode plate in response to a zoom signal, and
means for positioning the reduced first raster pattern at a location on said anode that corresponds to the selected location on said image display screen that is encoded by said digital signals.

34. In a method for creating a radiographic image of a subject which includes the steps of:
scanning an electron beam in a first raster pattern on an anode plate to produce a moving x-ray origin point,
detecting x-rays at a detection point situated at the opposite side of said subject from said anode plate and producing a detector output voltage in response to detection of x-rays at said detection point, sweeping a light origin point on a display screen in a second raster pattern that is similar to said first raster pattern, and varying the intensity of said light origin point at successive points in said second raster pattern in accordance with variations of said detector output voltage at corresponding points in said first raster pattern, the improvement comprising:

selecting an area of the image at said display screen for magnification, encoding the location of the selected area of said image in digital signals and initiating a zoom signal, reducing the size of said first raster pattern in response to said zoom signal, and positioning the reduced first raster pattern at a location on said anode plate that corresponds to the location in said image that is encoded in the digital signals.

35. The method of claim 34 including the further steps of:

generating a sequence of digital data bytes during said scanning of said electron beam in said first raster pattern, encoding successive ones of the data bytes with numerical values which identify the magnitude of said detector output voltage at successive times in the course of said scanning of said electron beam in said first raster pattern, generating a display input voltage that varies in accordance the numerical values encoded by successive ones of said data bytes, and utilizing said display input voltage to vary said intensity of said light origin point during said sweeping of said light origin point in said second raster pattern.

36. The method of claim 35 including the further step of altering said encoding of said data bytes to modify at least one characteristic of said image.

37. The method of claim 35 including the further steps of:

storing said sequence of data bytes in a digital data storage, suppressing said electron beam to stop x-ray generation, subsequently generating said display input voltage by reading said data bytes out of said data storage.

38. The method of claim 34 wherein said step of selecting an area of said image at said display screen for magnification and said step of encoding the location of the selected area are effected by:

generating a movable cursor mark on said screen moving said cursor mark to a first corner of said selected area and storing the x-axis and y-axis coordinates of said first corner in a digital data storage, and moving said cursor mark to the opposite corner of said selected area and storing the x-axis and y-axis coordinates of said second corner in said digital data storage.

39. The method of claim 38 wherein said step of positioning the reduced first raster pattern is effected by:

shifting said first raster pattern away from a centered position on said anode plate in the x-axis direction for a distance that is proportional to the stored x-axis coordinate of said first corner added to one half of the difference between the stored x-axis coordinates of said first corner and opposite corner, shifting said first raster pattern away from said centered position in the y-axis direction for a distance that is proportional to the stored y-axis coordinate of said opposite corner added to one half of the difference between said stored y-axis coordinates of said opposite corner and said first corner, wherein the origin point of said x and y axes is at the center of said anode plate.

40. The method of claim 38 wherein said step of reducing the size of said first raster pattern is effected by:

reducing the size of said first raster pattern in the x-axis direction by an amount proportional to the difference between said stored x-axis coordinates of said first corner and opposite corner, and reducing the size of said first raster pattern in the y-axis direction by an amount proportional to the difference between said stored y-axis coordinates of said first corner and opposite corner.

41. The method of claim 34 including the further step of reducing the intensity of said electron beam while the size of said first raster pattern is reduced.

42. The method of claim 34 wherein a digital computer is used to encode said location of said selected area of said image in digital signals and wherein said computer includes at least one operator actuated input device, including the further steps of generating a sequence of digital data bytes that encode variations of said detector output voltage during the course of said first raster scan and storing said data bytes in a data storage, reading said data bytes out of said storage and generating a display input voltage that varies in accordance with the encoding of successive data bytes, utilizing said display input voltage to modulate the intensity of said light origin point during said second raster scan, and utilizing said computer to control at least the energy of said electron beam, the scanning speed of said electron beam, line resolution in said first raster pattern and the brightness and contrast in said image.

43. In a method of obtaining a radiographic image of a subject which includes the steps of:

producing x-rays at an x-ray origin point on an anode plate of an x-ray tube by directing an electron beam to said anode plate, traveling said x-ray origin point in a raster scanning motion within a first raster scan area on said anode plate by applying an x-axis sweep frequency signal and a y-axis sweep frequency signal to said x-ray tube, detecting x-rays at a detection point situated at the opposite side of said subject from said x-ray origin point and producing a detector signal that is indicative of variations of x-ray intensity at said detection point as said x-ray origin point moves to successive locations in said first raster scan area, producing a radiographic image by moving a visible light origin point at a display screen in a raster scanning motion within a second raster scan area that is located at said screen and using said detector signal to produce variations of the intensity of said light origin point at succesive locations in said second raster scan area, the improvement comprising:

producing a first sequence of digital data bytes which encode successive values indicative of variations in the magnitude of said x-sweep frequency signal that are to occur during the course of said raster scanning motion at said first raster scan area, producing a second sequence of digital data bytes which encode successive values indicative of variations in the magnitude of said y-sweep frequency signal that are to occur during the course of said raster scanning motion at said first raster scan area, and modulating the magnitudes of said x-sweep frequency signal and said y-sweep frequency signal during the course of said raster scanning at said first raster scan area by reference to the values encoded by successive data bytes of said first and second sequences thereof.

* * * * *

UNITED STATES PATENT AND TRADEMARK OFFICE
CERTIFICATE OF CORRECTION

PATENT NO. : 5,267,296
DATED : November 30, 1993
INVENTOR(S) : Richard D. Albert It is certified that error appears in the above-indentified patent and that said Letters Patent is hereby corrected as shown below:

On the title page, Item [75] Inventor:"Richard D. Albert, San Ramon, Calif." to read Richard D. Albert, Danville, Calif. and David L. Reyna, San Ramon, Calif.--

Signed and Sealed this

Thirty-first Day of May, 1994

Attest:

BRUCE LEHMAN

Attesting Officer    Commissioner of Patents and Trademarks